United States Patent [19]

Skeirik

[11] Patent Number: 5,142,612
[45] Date of Patent: Aug. 25, 1992

[54] COMPUTER NEURAL NETWORK SUPERVISORY PROCESS CONTROL SYSTEM AND METHOD

[75] Inventor: Richard D. Skeirik, Newark, Del.

[73] Assignee: E. I. du Pont de Nemours & Co. (Inc.), Wilmington, Del.

[21] Appl. No.: 562,268

[22] Filed: Aug. 3, 1990

[51] Int. Cl.$^5$ .......................................... G06F 15/18
[52] U.S. Cl. ...................................... 395/11; 395/22; 395/23; 395/906; 395/68; 364/149
[58] Field of Search ............... 364/513, 148, 149, 150, 364/151, 164, 165, 807, 200, 474.15, 500, 501, 502, 503; 395/11, 906, 22, 23, 68, 27, 26

[56] References Cited

FOREIGN PATENT DOCUMENTS 1224804 9/1989 Japan .

OTHER PUBLICATIONS

Sanner et al., "Neuromorphic Pitch Attitude Regulation of An Underwater Telerobot", *IEEE Control Systems Magazine*, Apr. 1990, pp. 62-67.
Lippmann, "An Introduction to Computing with Neural Nets", *IEEE ASSP Magazine*, Apr. 1987, pp. 4-21.
Guez et al., "Neuromorphic Controller with a Human Teacher", *IEEE Internat. Conf. of Neural Networks*, 1988, vol. II, pp. 595-602.
Liv, "Building A General Architecture for Robot Handy Control", *IEEE Internat. Conf. on Neural Networks*, 1988, vol. 11, pp. 567-574.
Narendra et al., "Identification and Control of Dynamical Systems Using Neural Networks", *IEEE Trans. on Neural Networks*, vol. 1, No. 1 Mar. 1990, pp. 4-27.
Guez et al., "Neural Network Architecture for Control", *IEEE Control Systems Magazine*, Apr. 1988, pp. 22-25.
Chen, "Back-Propagation Neural Networks for Nonlinear Self-Tuning Adaptive Control", *IEEE Control Systems Magazine*, Apr. 1990, pp. 44-48.
Elsley, "A Learning Architecture for Control Based on Back-Propagation Neural Networks", *Proc. IEEE Int'l Conf. on Neural Networks*, pp. II-587-594.
Bhat et al., "Use of Neural Nets for Dynamic Modeling and Control of Chemical Process Systems", 1989 American Control Conf., pp. 1342-1347.
Hoskins et al., "Fault Diagnosis in Complex Chemical Plants Using Artifical Neural Networks", *AICLE Journal*, Jan. 1991, vol. 37, No. 1, pp. 137-141.
Astrom, "Toward Intelligent Control", *IEEE Control Systems Magazine*, Apr. 1989, pp. 60-64.
Bavarian, "Introduction to Neural Networks for Intelligent Control", *IEEE Control Systems Magazine*, Apr. 1988, pp. 3-7.
Psaltis et al., "A Multilayered Neural Network Controller", *IEEE Control Systems Magazine*, Apr. 1988, pp. 17-21.
Kraft et al. "A Comparison Between CMAC Neural Network Control and Two Adaptive Control Systems", *IEEE Control Systems Magazine*, Apr. 1990, pp. 36∝43.

(List continued on next page.)

*Primary Examiner*—Allen R. MacDonald
*Attorney, Agent, or Firm*—Sterne, Kessler, Goldstein & Fox

[57] ABSTRACT

A neural network for adjusting a setpoint in process control replaces a human operator. The neural network operates in three modes: training, operation, and retraining. In operation, the neural network is trained using training input data along with input data. The input data is from the sensor(s) monitoring the process. The input data is used by the neural network to develop output data. The training input data are the setpoint adjustments made by a human operator. The output data is compared with the training input data to produce error data, which is used to adjust the weights of the neural network so as to train it. After training has been completed, the neural network enters the operation mode. In this mode, the present invention uses the input data to predict output data used to adjust the setpoint supplied to the regulatory controller. Thus, the operator is effectively replaced. The present invention in the retraining mode utilizes new training input data to retrain the neural network by adjusting the weight(s).

50 Claims, 36 Drawing Sheets

OTHER PUBLICATIONS

Josin et al., "Robot Control Using Neural Networks", *IEEE Internat. Conf. on Neural Networks*, 1988, vol. II, pp. 625–631.

Liu et al. "Neural Network Architecture for Robot Hand Control", *IEEE Control Systems Magazine*, Apr. 1989, pp. 38–43.

Kuperstein et al., "Implementation of an Adaptive Neural Controller for Sensory–Motor Coordination", *IEEE Control Sys. Mag.*, Apr. 1989, pp. 25–30.

Kuperstein et al., "Neural Controller for Adaptive Movements with Unforseen Payloads", *IEEE Trans. on Neural Networks*, vol. 1, No. 1, Mar. 1990, pp. 137–142.

Kung et al., "Neural Network Architectures for Robotic Applications", *IEEE Trans. on Robotics and Automation*, vol. 5, No. 5, Oct. 1989, pp. 641–657.

*Parallel Distributed Processing, Explorations in the Microstructure of Cognition,* by David E. Rumelhart and James L. McClelland, the MIT Press, Cambridge, Mass., USA, 1986.

*Explorations In Parallel Distributed Processing, A Handbook of Models, Programs, and Exercises,* by James L. McClelland and David E. Rumelhart, the MIT Press, Cambridge, MA, 1988.

Bhaget, *An Introduction to Neural Nets,* Aug. 1990.

Ballou, *Technological Mix to Fuel Neural Network growth,* Aug. 13, 1990.

Samdani, *Neural Nets They Learn From Example,* Aug. 1990.

Venkatasubrananian et al., *Process Fault Detection And Diagnosis Using Neural Networks—I. Steady-State Processes,* Feb. 15, 1990.

Ungar et al., *Adaptive Networks For Fault Diagnosis And Process Control,* Jan. 15, 1990.

Bhat et al., *Use of Neural Nets For Dynamic Modeling And Control of Chemical Process Systems,* Nov. 29, 1989.

Ydstie, *Foresting And Control Using Adaptive Connectionist Networks,* 1990.

Venkatasubramanian et al., *A Neural Network Methodology For Process Fault Diagnosis,* Dec. 1989.

Watanabe et al., *Incipient Fault Diagnosis of Chemical Process via Artifical Neural Networks,* 1989.

Hoskins et al., *Artificial Neural Network Models of Knowledge Representation in Chemical Engineering,* 1988.

Graft et al., *A Neural Controller for Collison–Free Movement of General Robot Manipulators,* Apr. 1988.

Sobajic et al., Robust Control of Nonlinear Systems Using Pattern Recognition, IEEE International Conference on Systems, Man, and Cybernetics, vol. 1, pp. 315–320, (1989).

Lant et al., *A Comparison of Adaptive Estimation with Neural Based Techniques for Bioprocess Application,* Proceedings of the 1990 American Control Conference, vol. 3, pp. 2173–2178, (1990).

Bhat et al., Use of Neural Nets for Dynamic Modeling and Control of Chemical Process Systems, 1989 American Control Conference, Pittsburgh (Jun. 21–23, 1989).

Sobajic et al., *Intelligent Control of the Intelledex 605T Robot Manipulator, pp. 633–640, IEEE Internatiional Conference, San Diego (Jul. 24–27, 1988).*

Guez et al., Neuromorphic Controller with a Human Teacher, pp. 595–602, IEEE International Conference San Diego (Jul. 24–27, 1988).

Guez et al., Neuromorphic Architectures for Fast Adaptive Robot Control, pp. 145–149, 1988 IEEE Int'l Conference (Apr. 24–29, 1988).

Shepanski et al., Teaching Artifical Neural Systems to Drive: Manual Training Techniques, pp. 231–238 Annual Workshop of SOA and Robotics (Aug. 5–7, 1987).

NEURAL NETWORK BLOCK PAGE 2 — NETWORK INPUTS AND OUTPUTS

— NETWORK INPUTS (SCROLLABLE) —————————————— 2702
1 DMT VANTAGE    TIME WT AVERAGE    VAR #  1105  XYLENE COL FEED MPPH
OLDEST TIME  0 01:00:00   NEWEST TIME  0 00:10:00
HIGH LIMIT   150.0  LOW LIMIT: 50.   MAX CHANGE   25.0

— NETWORK TRAINING INPUTS (SCROLLABLE) ——————————— 2704
1 DMT VANTAGE    CURRENT VALUE    VAR #  2081  XYL COL BTMS MFB PPM
HIGH LIMIT  2500.0  LOW LIMIT: 1500.0   MAX CHANGE   250.0

— NETWORK OUTPUTS (SCROLLABLE) ——————————————— 2706
1 DMT VANTAGE    CUR VALUE UNCOMPRSD   VAR #  9055  NN PRED XYL BTM MFB PPM
HIGH LIMIT  2500.0  LOW LIMIT: 1000.0   MAX CHANGE   250.0

— SUMMED ERROR OUTPUT (NOT SCROLLABLE) ———————————— 2708
DMT VANTAGE    CUR VALUE UNCOMPRSD   VAR #  9056  NN XYL COL MODEL ERROR
HIGH LIMIT  1.0   LOW LIMIT: 0.00   MAX CHANGE  1.0

USE UP/DOWN ARROW TO SCROLL THRU INPUTS.           KEYPAD — PREV PAGE
USE GOLD UP/DOWN ARROW TO MOVE BETWEEN BOXES.

FIG. 27

COMPUTER NEURAL NETWORK SUPERVISORY PROCESS CONTROL SYSTEM AND METHOD

INCORPORATED BY REFERENCE

Incorporated by reference in their entirety herein are the following U.S. patents and patent applications (naming Richard D. Skeirik as the sole or one of the inventors):

U.S. Pat. No. 4,920,499, issued Apr. 24, 1990;
U.S. Pat. No. 4,884,217, issued Nov. 28, 1989;
U.S. Pat. No. 4,907,167, issued Mar. 6, 1990;
U.S. Pat. No. 4,910,691, issued May 20, 1990;
U.S. Pat. No. 5,006,992;
U.S. Pat. No. 5,058,043;
U.S. Pat. No. 4,965,742.

BACKGROUND OF THE INVENTION

I. Field of the Invention

The present invention relates generally to monitoring and control of manufacturing processes, particularly chemical processes, and more specifically, to neural networks used in process control of such processes.

II. Related Art

Quality of products is increasingly important. The control of quality and the reproducibility of quality are the focus of many efforts. For example, in Europe, quality is the focus of the ISO (International Standards Organization, Geneva, Switzerland) 9000 standards. These rigorous standards provide for quality assurance in production, installation, final inspection, and testing. They also provide guidelines for quality assurance between a supplier and customer. These standards are expected to become an effective requirement for participation in the EC (European Community) after the removal of trade barriers in 1992.

The quality of a manufactured product is a combination of all of the properties of the product which affect its usefulness to its user. Process control is the collection of methods used to produce the best possible product properties in a manufacturing process.

Process control is very important in the manufacture of products. Improper process control can result in a product which is totally useless to the user, or in a product which has a lower value to the user. When either of these situations occur, the manufacturer suffers (1) by paying the cost of manufacturing useless products, (2) by losing the opportunity to profitably make a product during that time, and (3) by lost revenue from reduced selling price of poor products. In the final analysis, the effectiveness of the process control used by a manufacturer can determine whether the manufacturer's business survives or fails.

A. Quality and Process Conditions

FIG. 19 shows, in block diagram form, key concepts concerning products made in a manufacturing process. Referring now to FIG. 19, raw materials 1222 are processed under (controlled) process conditions 1906 in a process 1212 to produce a product 1216 having product properties 1904. Examples of raw materials 1222, process conditions 1906, and product properties 1904 are shown in FIG. 19. It should be understood that these are merely examples for purposes of illustration.

Product 1216 is defined by a product property aim value 2006 of its product properties 1904. The product property aim values 2006 of the product properties 1904 are those which the product 1216 needs to have in order for it to be ideal for its intended end use. The objective in running process 1212 is to manufacture products 1216 having product properties 1904 which are exactly at the product property aim value(s) 2006.

The following simple example of a process 1212 is presented merely for purposes of illustration. The example process 1212 is the baking of a cake. Raw materials 1222 (such as flour, milk, baking powder, lemon flavoring, etc.) are processed in a baking process 1212 under (controlled) process conditions 1906. Examples of the (controlled) process conditions 1906 are: mix batter until uniform, bake batter in a pan at a preset oven temperature for a preset time, remove baked cake from pan, and allow removed cake to cool to room temperature.

The product 1216 produced in this example is a cake having desired properties 1904. For example, these desired product properties 1904 can be a cake that is fully cooked but not burned, brown on the outside, yellow on the inside, having a suitable lemon flavoring, etc.

Returning now to the general case, the actual product properties 1904 that are in the product 1216 produced in a process 1212 are determined by the combination of all of the process conditions 1906 of process 1212 and the raw materials 1222 that are utilized. Process conditions 1906 can be, for example, the properties of the raw materials 1222, the speed at which process 1212 runs (also called the production rate of the process 1212), the process conditions 1906 in each step or stage of the process 1212 (such as temperature, pressure, etc.), the duration of each step or stage, and so on.

B. Controlling Process Conditions

FIG. 20 shows a more detailed block diagram of the various aspects of the manufacturing of products 1216 using process 1212. FIGS. 19 and 20 should be referred to in connection with the following description.

To effectively operate process 1212, the process conditions 1906 must be maintained at a regulatory controller setpoint(s) 1404 so that the product 1216 produced will have the product properties 1904 matching the desired product property aim values 2006. This task can be divided into three parts or aspects for purposes of explanation.

In the first part or aspect, the manufacturer must set (step 2008) initial settings of the regulatory controller setpoints 1404 in order for the process 1212 to produce a product 1216 having the desired product property aim values 2006. Referring back to the example set forth above, this would be analogous to deciding to set the temperature of the oven to a particular setting before beginning the baking of the cake batter.

The second step or aspect involves measurement and adjustment of the process 1212. Specifically, process conditions 1906 must be measured to produce process condition measurement(s) 1224. The measured process conditions 1906 must be used to generate adjustments a controllable process state(s) 2002 so as to hold the process conditions 1906 as close as possible to regulatory controller setpoint 1404. Referring again to the example above, this is analogous to the way the oven measures the temperature and turns the heating element on or off so as to maintain the temperature of the oven at the desired temperature value.

The third stage or aspect involves holding the measurements of the product properties 1904 as close as possible to the product property aim values 2006. This involves producing product property measurements 1304 based on the product properties 1904 of the product 1216. From these measurements, adjustments 1402 to a process condition setpoint(s) 1404 must be made so as to change the regulatory controller setpoint 1404. Referring again to the example above, this would be analogous to measuring how well the cake is baked. This could be done, for example, by sticking a toothpick into the cake and adjusting the temperature at a predetermined baking time so that the toothpick eventually comes out clean.

It should be understood that the previous description is intended only to show the general conditions of process control and the problems associated with it in terms of producing products of predetermined quality and properties. It can be readily understood that there are many variations and combinations of tasks that are encountered in a given process situation. Often, process control problems can be very complex.

In recent years, there has been a great push towards the automation of process control. The motivation for this is that such automation results in the manufacture of products of desired product properties where the manufacturing process that is used is too complex, too time-consuming, or both, for people to deal with manually.

Thus, the process control task can be generalized as being made up of five basic steps or stages as follows:
(1) the initial setting of process condition setpoint step 2008;
(2) producing process condition measurements 1224 of the process conditions 1906;
(3) adjusting a controllable process state 2002 in response to the process condition measurements 1224;
(4) producing product property measurements 1304 based on product properties 1904 of the manufactured product 1216; and
(5) adjustment to process condition setpoint 1404 in response to the product property measurements 1304.

The explanation which follows explains the problems associated with meeting and optimizing some of these five steps.

C. The Control Response Problem

The steps 1402, 2008, 1208 all involve making adjustments to the process in response to what is known (measured) about the process or the product.

In step 2008, to properly set process condition setpoint values 1404 to initial values needed to produce the desired product properties 1904, the manufacturer must know how process conditions affect product properties. This can be very difficult. Many commercial products require that a number of different properties of the product meet specific aim values. An adjustment made in one process condition setpoint value 1404 to achieve an aim 2006 on one product property 1904 may interact to affect all of the other properties 1904 which have aim values. Even though a manufacturer may know from experience (or from research and development) the approximate process condition setpoint values that must be set to achieve a given set of product property aim values 2006, there can always be demands from customers for new and untried product property aim values 2006. To meet these product property aim values 2006, the manufacturer may have to resort to additional expensive research and development (R and D) or run expensive trials in the manufacturing process. An inexpensive way of predicting the process condition setpoint values 1404 needed to produce a given set of product property aim values 2006 would be very valuable.

Using classical process control techniques, the adjustments 1402 to process condition setpoints 1404 to achieve product property aim values 2006 are typically implemented using simple single-input single-output control relationships. However, these adjustments may require more complex approaches to properly achieve the product property aim values 2006 desired. For example, often a number of process condition setpoint values 1404 could be adjusted to respond to deviations in measured product properties 1904 from the product property aim values 2006. The selection of which process condition setpoint value to adjust may have a significant impact on the overall set of product properties 1904 which are desired. Also, as in the case of the initial setting of process condition setpoints 2008, there may be interactions in which changes in one process condition setpoint value 1404 may affect several product properties 1904. Thus simple single-input single-output control relationships may not be adequate for this kind of control ask.

In some manufacturing processes, a human operator may be able to make adjustments 1402 to one or more process condition setpoint values 1404 in response to one or more product property measurements 1304, possibly also using process condition measurements 1224. Because human operators often do not have extensive theoretical training in the underlying physical principles of the manufacturing process, it may be impossible for them to describe the methods they use to make these adjustments. Their methods may actually implement a relationship which uses product property measurements 1304 and process condition measurements 1224 as inputs, and creates adjustments 1402 to process condition setpoint values 1404 as outputs. This relationship could be reproduced if it was known. However, since human operators cannot describe this relationship it is impossible to automate this using classical control methods.

In this situation, the ultimate conformance of product properties 1904 to product property aim values 2006 is totally dependent upon the behavior of the human operators controlling the process. Since the methods used by the human operators may not be readily explainable, the performance in controlling product properties 1904 from one operator to another may vary widely. Moreover since the methods used by the best operators are not readily described, it may be difficult to transfer these techniques from one operator to another. Thus, a method of reproducing the control methods of the best operators would be very helpful.

D. Conventional Controllers for Adjusting Process Condition Setpoints

As stated above, the adjustments 1402 of process condition setpoint values 1404 can sometimes only be carried out by human operators using a number of product property measurements 1304 and process condition measurements 1224. Because human operators may not be able to define the relationships between the measurements 1304, 1224 and the adjustments 1402, the performance of these human operators is difficult, if not impossible, to perform effectively using classical controllers.

In a classical controller, the relationship between adjustment 1402, 1208 and measurement 1304, 1224 is typically defined by an algorithm which implements a single-input single-output relationship. That is, the algorithm uses a single measurement 1304, 1224 as input, and produces a single adjustment 1402, 1208 as output. Obviously such single-input single-output control relationships would be inadequate to reproduce human operators behavior which used multiple measurements as input.

Classical controllers are also algorithmic. That is, they use a fixed algorithm or equation to relate the adjustment 1402, 1208 to the measurement 1304, 1224. This algorithm is a simple mathematical equation. It may use the current value of the measurement, the derivative of the measurement, the integral of the error (that is the difference between the measurement and the aim value 2006 or setpoint value 1404), or it may use other aspects of the measurement. However in all cases the control relationship between the measurement and the adjustment is defined beforehand by an equation. These types of controllers are difficult, if not impossible, to apply in situations where the relationship between the adjustment and the measurement is not well understood.

Thus it can be seen that conventional controllers are very difficult to apply in situations where process adjustments 1402, 1208 are properly carried out by people but not based on explicitly known algorithmic relationships.

E. Deficiencies in the Related Art

As the discussion of process control given above illustrates, it is important to correctly adjust setpoints for process conditions to properly maintain product properties at their aim values. For some processes, the control techniques or methodologies needed to make such adjustments are not understood in a way that is easily amenable to implementation using standard types of controllers. Most standard control methods use a single input and a single output to make adjustments in the process.

In contrast, a skilled process operator may use information (inputs) from a number of sensors and/or quality (laboratory) measurements to determine the nature and amount of an adjustment to make to keep product properties at their aim values. Such human expert adjustments may be very difficult to reproduce in classical automated control system because the method of computing the adjustment uses many inputs and may also potentially consider adjusting many outputs. Such adjustments may not easily translate or be automated using classical controls because the relationship between the input data used by the human operator and the selection and amount of the adjustments made by the human operator are not well defined or known. Classical control techniques require a well defined mathematical control relationship between the inputs and the outputs. This control relationship must be well known before the control using classical techniques can be implemented.

Expert systems are a different approach to control which are not based on predefined algorithmic functions. They can be beneficial in automating process control under certain circumstances. However like algorithmic controls, expert systems require a complete understanding of the nature of the task to be automated before the expert system can be implemented.

Thus it can be seen that both algorithmic control methods and expert system based control methods have significant limitations when applied to problems where the adjustment methodology can be performed by an operator but is not well understood.

SUMMARY OF THE INVENTION

The present invention is a neural network system and method for adjusting a setpoint in process control.

A neural network is trained by being provided with the setpoint changes made by a human operator in controlling a chemical process (or other), and with the sensor data that was supplied to the human operator. The neural network uses sensor data to predict an output for adjusting the setpoint supplied to a regulatory controller which is controlling the chemical process. An error data is generated indicating the difference between the predicted output and the actual setpoint value. This error signal is used to determine whether the network has been trained sufficiently to allow it to be used to replace the human operator in providing the setpoint to the regulatory controller.

Once the neural network has been trained, the present invention uses the neural network to replace the human operator. The trained neural network provides a predicted value based on sensor input data. The predicted value is used to adjust the setpoint of the regulatory controller.

BRIEF DESCRIPTION OF THE DRAWINGS

The present invention as defined by the claims is better understood with the text read in conjunction with the following drawings:

FIG. 27 is a representative computer display or "screen" of a preferred embodiment of the present invention showing part of the data specification of the neural network block 1206.

DETAILED DESCRIPTION OF THE PREFERRED EMBODIMENTS

Table of Contents

Figure 1:
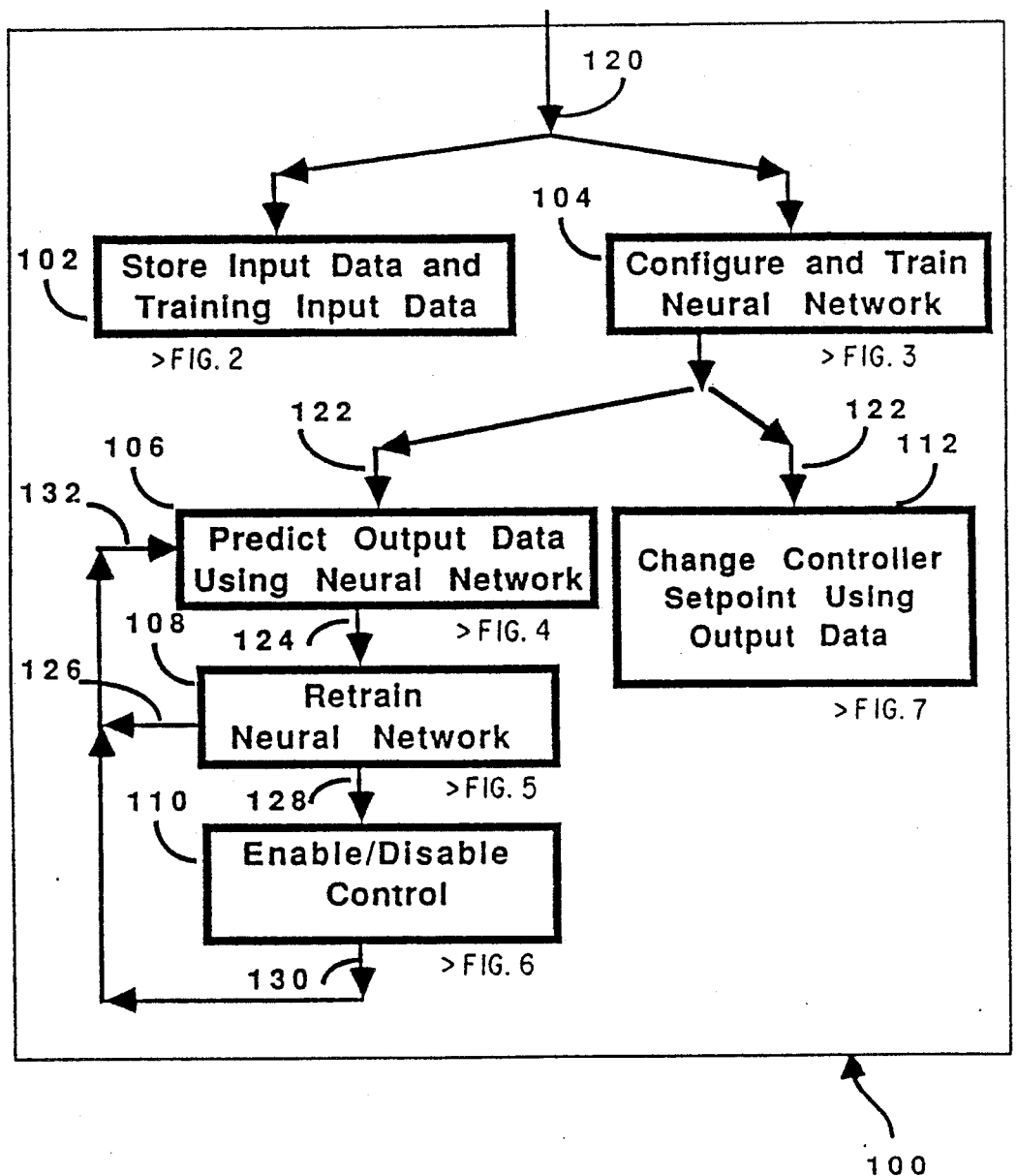
FIG. 1 is a high level block diagram of the six broad steps which make up the computer neural network supervisory process control system and method of the present invention.

I. Brief Overview
II. Overview of Neural Networks
  A. Construction of Neural Networks
  B. Prediction
  C. Neural Network Training
  D. Advantages of Neural Networks
III. Brief Overview
IV. Preferred Method of Operation
  A. Store Input Data and Training Input Data Step and Module 102
  B. Configure and Train Neural Network Step and Module 104
    1. Configure Neural Network Step and Module 302
    2. Wait Training Input Data Interval Step and Module 304
    3. New Training Input Data ? Step and Module 306
    4. Train Neural Network Step and Module 308
    5. Error Acceptable ? Step and Module 310
  C. Predict Output Data Using Neural Network Step and Module 106
  D. Retain Neural Network Step or Module
  E. Enable/Disable Control Module or Step 110
  F. Change Controller Setpoint Using Output Data Step or Module 112
V. Preferred Structure (Architecture)
VI. User Interface

I. Brief Overview

The present invention is a neural network system and method for adjusting a setpoint in process control.

In conventional process control, a human operator monitors the outputs of sensors used to indicate the conditions of the process being controlled. The sensor data is also provided to a regulatory controller(s), which controls one or more actuators in the process.

The human operator adjusts a setpoint(s) supplied to the regulatory controller. By adjusting this setpoint, the human operator is able to effectively control the process, since the adjusted setpoint is used by the regulatory controller to adjust the actuator(s).

The present invention essentially mimics the operation of the human operator so as to allow the human operator to be taken out of the process control situation. However, it should be understood that the present invention can be used in conjunction with an operator where the present invention is assuming the active role in the process control situation.

The present invention operates in three modes: (1) training; (2) operation; and (3) retraining. The third mode is used whenever an operator makes an adjustment supplementing the present invention so as to continually optimize the control of the process by the present invention.

Referring now to the first mode, which is called the training mode, the present invention monitors the changes in the setpoint made by the human operator and the sensor data which is supplied to the human operator who is making the adjustments in the setpoint. It should be understood that other types of data may be provided to the present invention, such as laboratory data. This additional input data is typically available in a process control situation since several types of data cannot be directly obtained from sensors on a real-time basis.

The changes in the setpoint are called training input data. The sensor data associated with this training input data is called input data. The training input data and the input data are supplied by the present invention to the neural network of the present invention that is being trained. Any neural network architecture can be employed by the present invention.

During the training mode, the neural network of the present invention produces a predicted output, called output data, based on the input data. The predicted output is compared during the training mode with the training input data. Error data is generated in this comparison stage or step. The error data is used to adjust the weight(s) of the neural network so as to train the neural network. By train, we mean that the predicted output of the neural network is as close as possible to the actual output that would be present if the training input data existed.

When the error data is less than an acceptable metric, the present invention is deemed to have been trained. Thereafter, the present invention enters into the second mode, called the operation mode.

In the operation mode, the present invention uses the input data to provide predicted output data. The predicted output data is supplied to the regulatory controller to adjust the setpoint value(s) in the regulatory controller(s). Thus, the present invention replaces or supplements the human operator who adjusts the setpoint values in regulatory control systems based on sensor data.

Whenever an operator makes an additional adjustment in the setpoint being controlled, the present invention enters the third mode, which is called the retraining mode. In the retraining mode, the present invention again produces a predicted output based on input data. This predicted output is compared with new training input data. The comparison is used to produce error data, which is used to adjust the weight(s) of the neural network. In this way, the adjustment of the weight(s) is used to retrain the neural network so that the predicted output data value is closer to the actual value indicated by the new training data.

Figure 33:
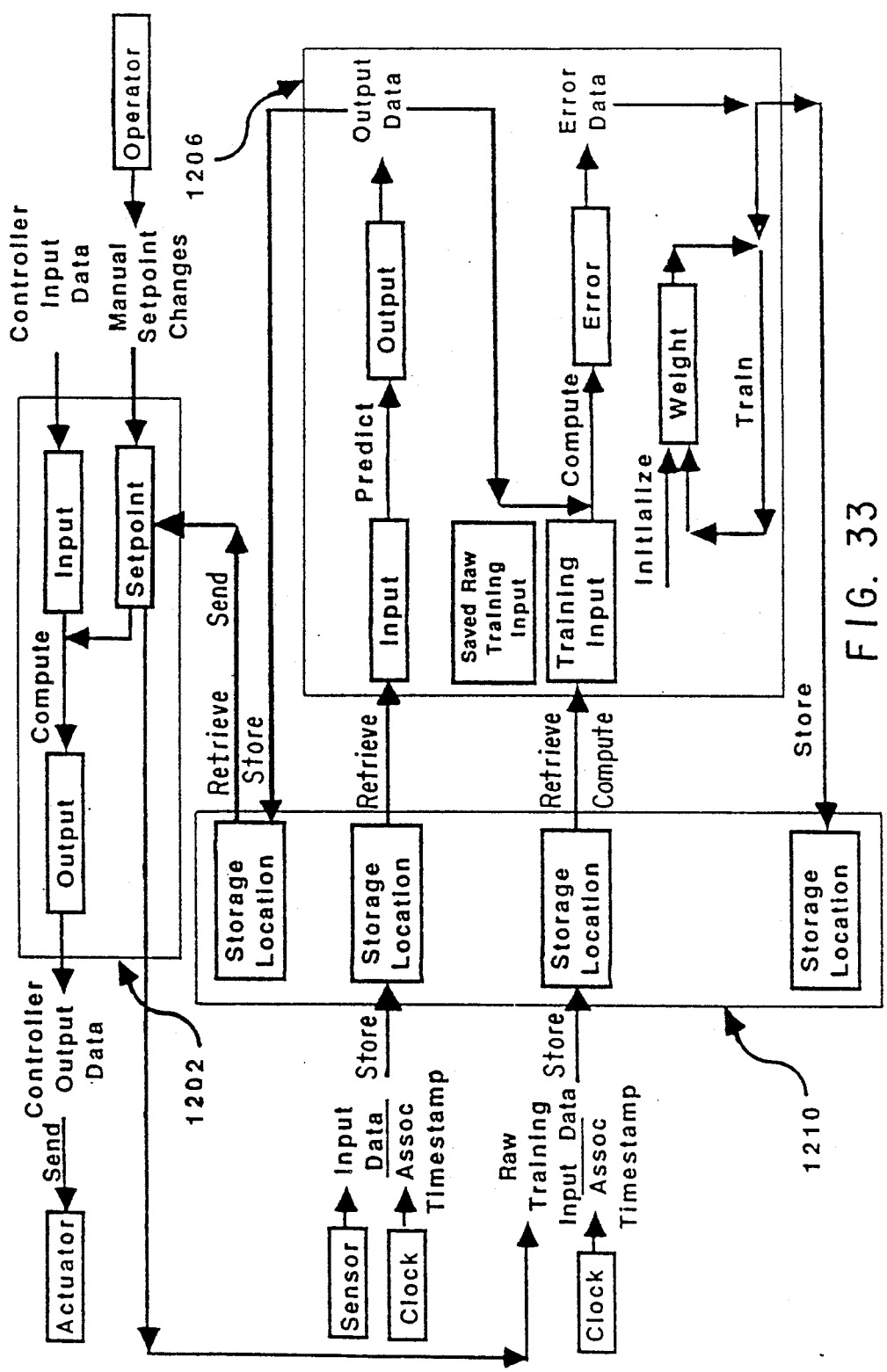
FIG. 33 is a nomenclature diagram showing the present invention at a high level.

In describing the preferred embodiment of the present invention, reference will be made to FIG. 33. This figure is a nomenclature diagram which shows the various names for elements and actions used in describing the present invention. FIG. 33 is not necessarily intended to represent the method of the present invention, nor does it necessarily depict the architecture of the present invention. However, it does provide a reference point by which consistent terms can be used in describing the present invention.

In referring to FIG. 33, the boxes indicate elements in the architecture and the labeled arrows indicate actions that are carried out. In addition, words that do not appear in boxes which break arrows represent information or data which is being transmitted from one element in the present invention to another.

Figure 12:
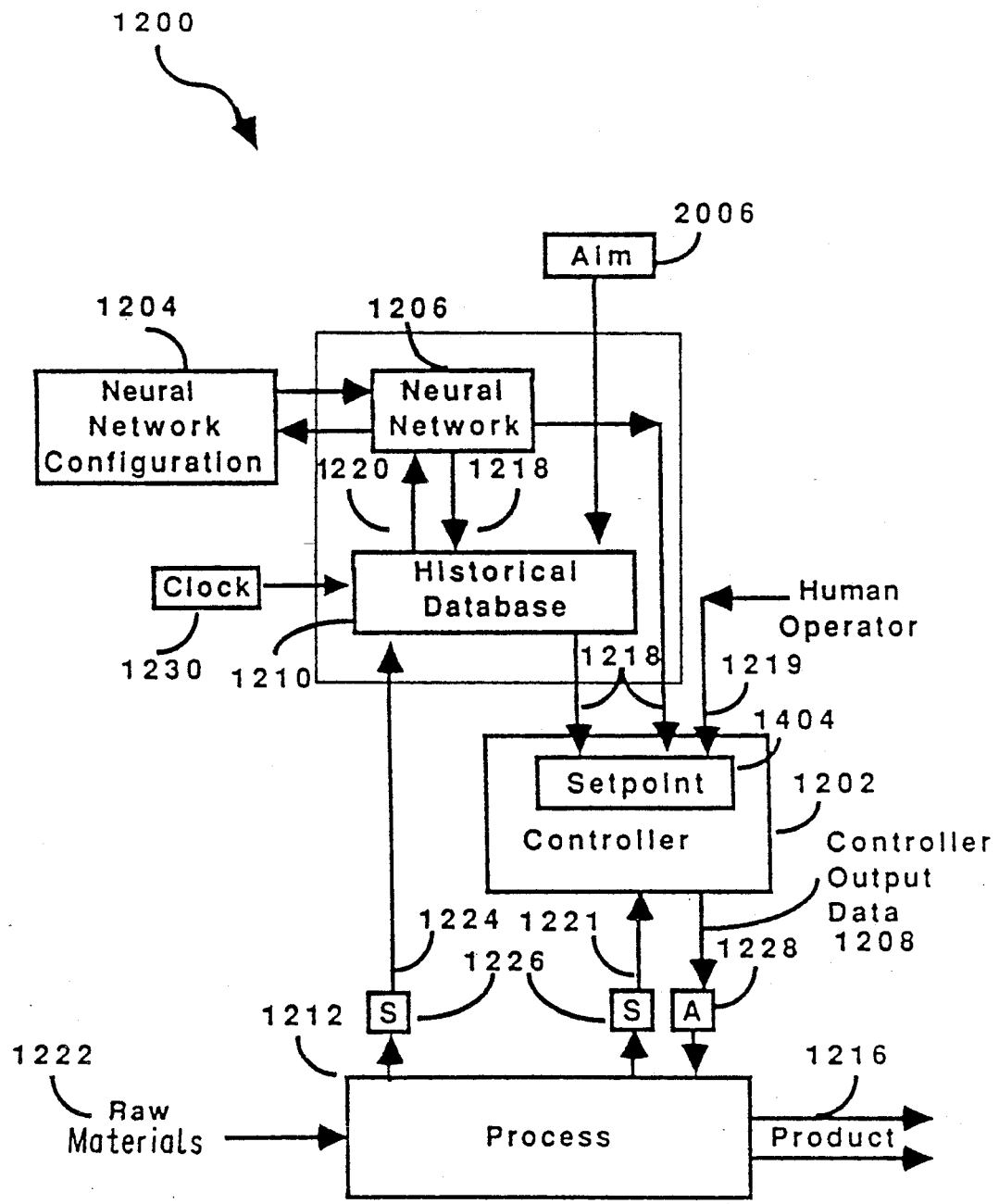
FIG. 12 is a representation of the architecture of an embodiment of the present invention.

As discussed below in greater detail, the present invention essentially utilizes neural networks to provide predicted values of adjustments 1402, 1219 to regulatory controller setpoint(s), as would be made by a skilled human operator, in a controller 1202 producing controller output data 1208 used to control the process 1212. As shown in FIG. 12, a neural network 1206 may operate in conjunction with an historical database 1210 which provides input sensor(s) data 1220.

Referring now to FIGS. 1 and 12, input data (and optionally raw training input data) are stored in a historical database with associated timestamps as indicated by a step or module 102. In parallel, the neural network 1206 is configured and trained in a step or module 104. The neural network 1206 is used to predict output data 1218 using input data 1220, as indicated by a step or module 106. The neural network 1206 is then retrained in a step or module 108, and control using the output data is enabled or disabled in a step or module 110. In parallel, control of the process using the output data is performed in a step or module 112. Thus, the present invention collects and stores the appropriate data, configures and trains the neural network, uses the neural network to predict output data, and enables control of the process using the predicted output data.

Central to the present invention is the neural network 1206. Various embodiments of the neural network 1206 can be utilized, and are described in detail below.

II. Overview of Neural Networks

In order to fully appreciate the various aspects and benefits produced by the present invention, a good understanding of neural network technology is required. For this reason, the following section discusses neural network technology as applicable to the neural network 1206 of the system and method of the present invention.

Artificial or computer neural networks are computer simulations of a network of interconnected neurons. A biological example of interconnected neurons is the human brain. Neural networks are computer representations of architectures which model the working of the brain. It should be understood that the analogy to the human brain is important and useful in understanding the present invention.

However, neural networks used in neural network 1206 of the present invention are computer simulations (or possibly analog devices) which provide useful predicted values based on input data provided at specified intervals.

Essentially, a neural network 1206 is a hierarchical collection of elements, each of which computes the results of an equation (transfer function or activation function). The equation may include a threshold. Each element equation uses multiple input values, but produces only one output value. The outputs of elements in a lower level (that is, closer to the input data) are provided as inputs to the elements of higher layers. The highest layer produces the output(s).

Figure 21:
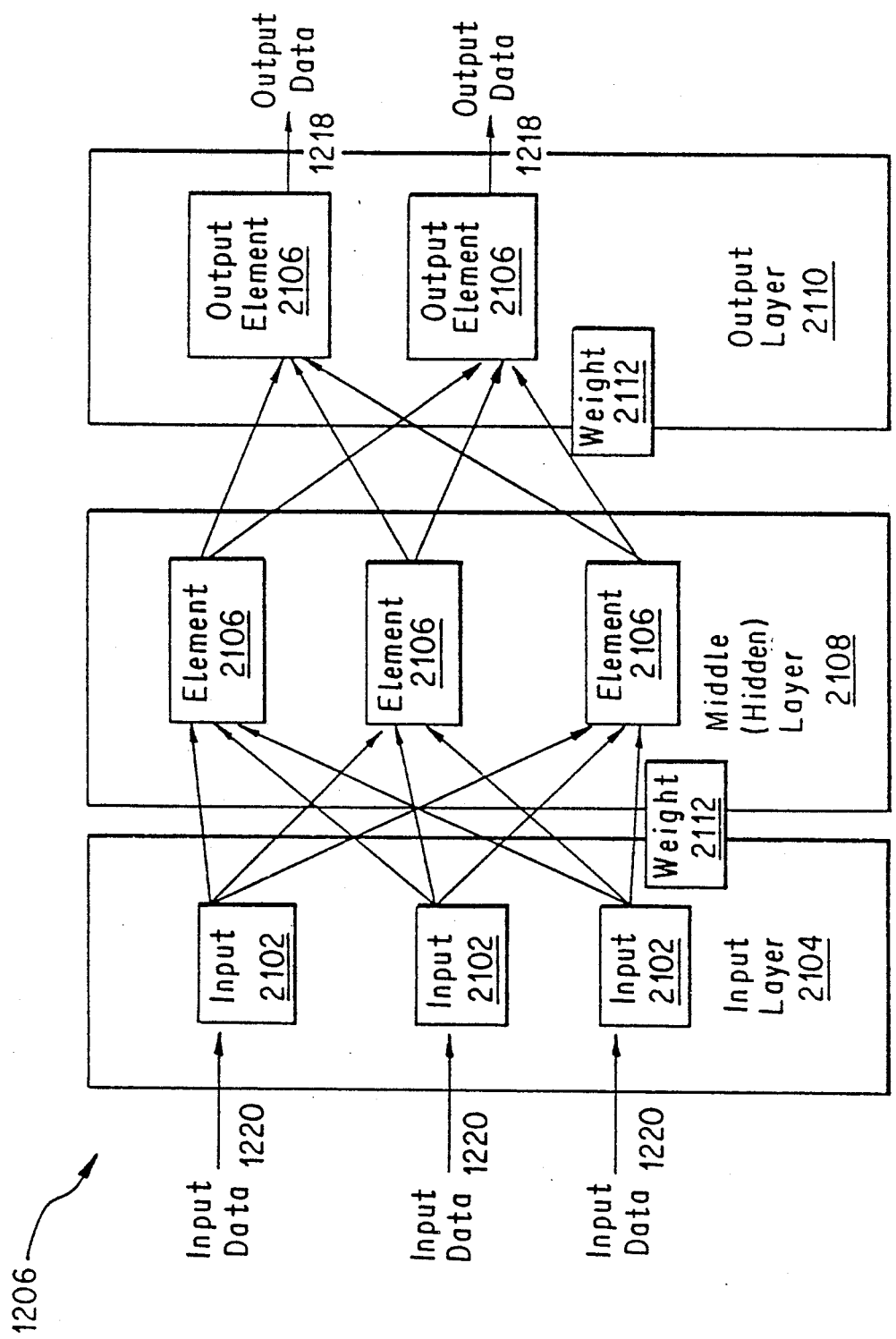
FIG. 21 shows a representative example of a fully connected feedforward neural network 1206 having an input layer 2104, a middle (hidden) layer 2108, an output layer 2110, and weights 2112 with each connection.

Referring now to FIG. 21, a representative example of the neural network 1206 is shown. It should be noted that the example shown in FIG. 21 is merely illustrative of an embodiment of neural network 1206. As discussed below, other embodiments for neural network 1206 can be used.

The embodiment of FIG. 21 has an input layer 2104, a middle (hidden) layer 2108, and an output layer 2110. Input layer 2104 includes a layer of input elements 2102 which take their input values from the external input data 1220. This is the known information used to produce the predicted values (output data) at outputs 1218. Even though input layer 2104 is referred to as a layer in the neural network 1206, input layer 2104 does not contain any processing elements; instead, it is a set of storage locations for input values on lines 2120.

The next layer is called the middle or hidden layer 2108. Such a middle layer 2108 is not required, but is usually used. It includes a set of elements 2106. The outputs from inputs 2102 of input layer 2104 are used as inputs by each element 2106. Thus, it can be appreciated that the outputs of the previous layer are used to feed the inputs of the next layer.

Additional middle layers 2108 can be used. Again, they would take the outputs from the previous layer as their inputs. Any number of middle layers 2108 can be utilized.

Output layer 2110 has a set of elements 2106. As their input values, they take the output of elements 2106 of the middle layer 2108. The outputs 1218 of elements 2106 of output layer 2110 are the predicted values (called output data) produced by the neural network 1206 using the input data 1220.

For each input value for each element of each of the layers 2108 and 2110, an adjustable constant called a weight 2112 is defined. For purposes of illustration only, only two weights 2112 are shown. However, each connection between the layers 2104, 2108 and 2110 has an associated weight. Weights determine how much relative effect an input value has on the output value of the element in question.

When each middle element connects to all of the outputs from the previous layer, and each output element connects to all of the outputs from the previous layer, the network is called fully connected. Note that if all elements use output values from elements of a previous layer, the network is a feedforward network. The network of FIG. 21 is such a fully connected, feedforward network. Note that if any element uses output values from an element in a later layer, the network is said to have feedback. Most neural networks used for neural network 1206 use the same equation in every element in the network.

A. Construction of Neural Networks

Neural network 1206 is built by specifying the number, arrangement and connection of the elements of which it is made up. In a highly structured embodiment of neural network 1206, the configuration is fairly simple. For example, in a fully connected network with one middle layer (and of course including one input and one output layer), and no feedback, the number of connections and consequently the number of weights is fixed by the number of elements in each layer. Such is the case in the example shown in FIG. 21.

Since the same equation is usually used in all elements, for this type of network we need to know the number of elements in each layer. This determines the number of weights and hence total storage needed to build the network. The modular aspect of the present invention of FIG. 16 takes advantage of this way of simplifying the specification of a neural network. Note that more complex networks require more configuration information, and therefore more storage.

The present invention contemplates other types of neural network configurations for use with neural network 1206. All that is required for neural network 1206 is that the neural network be able to be trained and retrained so as to provide the needed predicted values utilized in the process control.

B. Prediction

Referring now to FIG. 21, a representative embodiment of a feed forward neural network will now be described. This is only illustrative of one way in which a neural network can function.

Input data 1220 is provided to input storage locations called inputs 2102. Middle layer elements 2106 each retrieve the input values from all of the inputs 2102 in the input layer 2104. Each element has a weight 2112 associated with each input value. Each element 2106 multiplies each input value 2102 times its associated weight 2112, and sums these values for all of the inputs. This sum is then used as input to an equation (also called a transfer function or activation function) to produce an output or activation for that element. The processing for elements 2106 in the middle or hidden layer 2108 can be performed in parallel, or they can be performed sequentially.

In the neural network with only one middle layer as shown in FIG. 21, the output values or activations would then be computed. For each output element 2106, the output values or activations from each of the middle elements 2106 is retrieved. Each output or activation is multiplied by its associated weight 2112, and these values are summed. This sum is then used as input to an equation which produces as its result the output data 1218. Thus using input data 1220, a neural network 1206 produces predicted values of output data 1218.

Equivalent function can be achieved using analog means.

C. Neural Network Training

The weights 2112 used in neural network 1206 are adjustable constants which determine (for any given neural network configuration) the values of the predicted output data for given input data. Neural networks are superior to conventional statistical models because neural networks can adjust these weights automatically. Thus, neural networks are capable of building the structure of the relationship (or model) between the input data 1220 and the output data 1218 by adjusting the weights 2112. While a conventional statistical model requires the developer to define the equation(s) in which adjustable constant(s) will be used, the neural network 1206 builds the equivalent of the equation(s) automatically.

Figure 34:
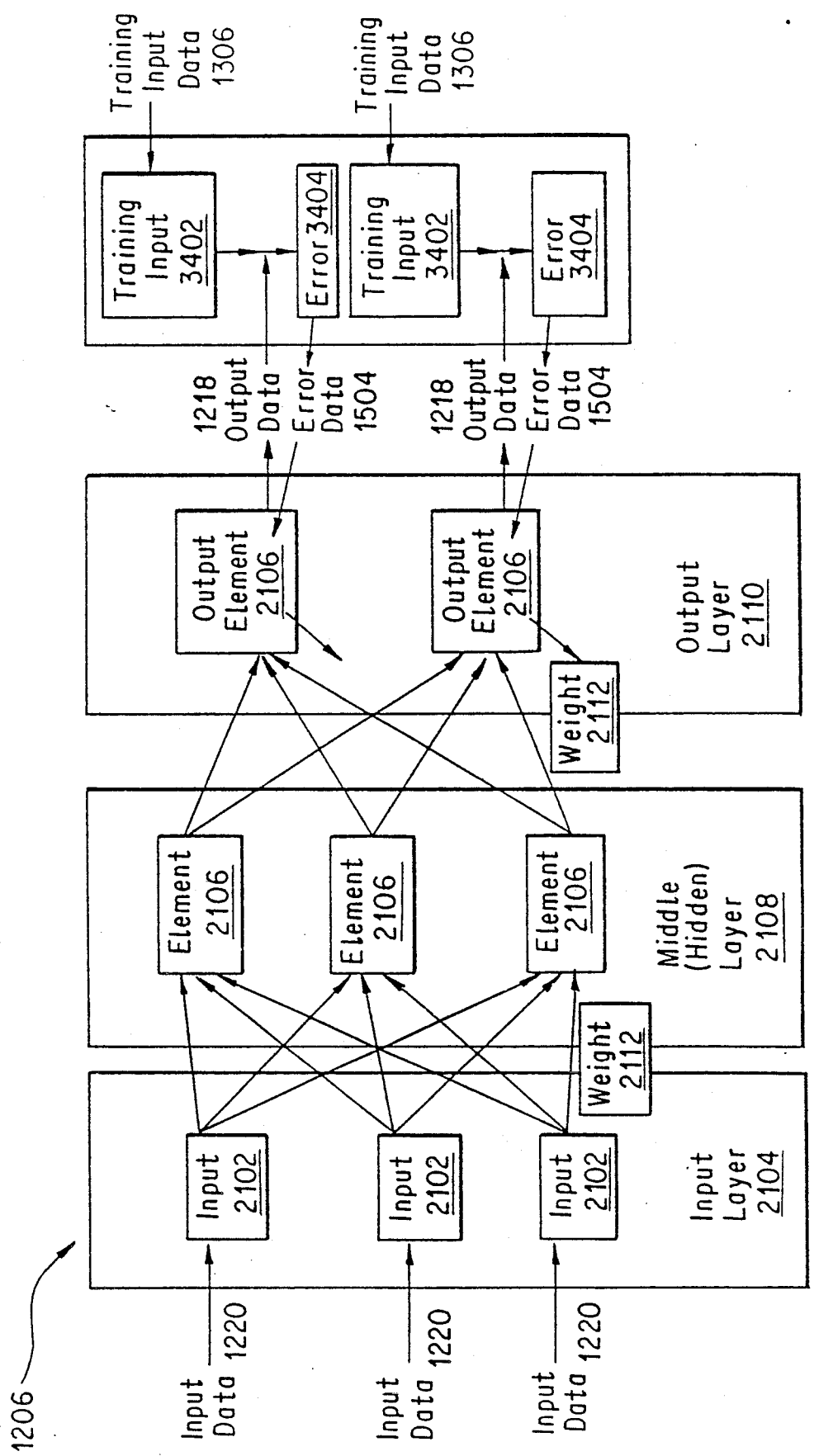
FIG. 34 shows a representative example of the neural network 1206 of FIG. 21 with training capability.

Referring now to FIG. 34, the present invention contemplates various approaches for training neural network 1206. One suitable approach is back propagation. Back propagation uses the error between the predicted output data 1218 and the associated training input data 1306 as provided by the training set (not shown) to determine how much to adjust the weights 2112 in the network 1206. In effect, the error between the predicted output data values and the associated training input data values is propagated back through the output layer 2110 and through the middle layer 2108. This accounts for the name back propagation.

The neural network 1204 is trained by presenting it with a training set(s), which is the actual history of known input data values and the associated correct output data values. As described below, the present invention uses the historical database with its associated timestamps to automatically create a training set(s).

To train the network, the newly configured neural network is usually initialized by assigning random values to all of its weights 2112. Referring now to FIG. 34, a representative embodiment of a neural network 1206 as configured for training purposes is shown. During training, the neural network 1206 uses its input data 1220 to produce predicted output data 1218 as described above under Section I.B. Prediction.

These predicted output data values 1218 are used in combination with training input data 1306 to produce error data 3404. These error data values 3404 are then propagated back through the network through the output elements 2106 and used in accordance with the equations or functions present in those elements to adjust the weights 2112 between the output layer 2110 and the middle or hidden layer 2108.

According to the back propagation method, which is illustrative of training methods that can be used for the neural network 1206, an error value for each element 2106 in the middle or hidden layer 2108 is computed by summing the errors of the output elements 2106 each multiplied by its associated weight 2112 on the connection between the middle element 2106 in the middle layer 2108 and the corresponding output elements in the output layer 2110. This estimate of the error for each middle (hidden) layer element is then used in the same manner to adjust the weights 2112 between the input layer 2104 and the middle (hidden) layer 2108.

It can thus be seen that the error between the output data 1218 and the training input data 1306 is propagated back through the network 1206 to adjust the weights 2112 so that the error is reduced. More detail can be found in *Parallel Distributed Processing, Explorations in the Microstructure of Cognition*, by David E. Rumelhart and James L. McClelland, The MIT Press, Cambridge, Mass., USA, 1986, and *Explorations In Parallel Distributed Processing, A Handbook of Models, Programs, and Exercises*, by James L. McClelland and David E. Rumelhart, The MIT Press, Cambridge, Mass., 1988, which are incorporated herein by reference.

D. Advantages of Neural Networks

Neural networks are superior to computer statistical models because neural networks do not require the developer of the neural network model to create the equations which relate the known input data and training values to the desired predicted values (output data). In other words, neural network 1206 learns the relationships automatically in the training step 104.

However, it should be noted that neural network 1206 requires the collection of training input data with its associated input data, also called a training set. The training set must be collected and properly formatted. The conventional approach for doing this is to create a disk file on a computer on which the neural network runs.

In the present invention, in contrast, this can be done automatically using an historical database 1210 (FIG. 12). This eliminates the errors and the time associated with the conventional approach. This also significantly improves the effectiveness of the training function since it can be performed much more frequently.

III. Brief Overview

Figure 19:
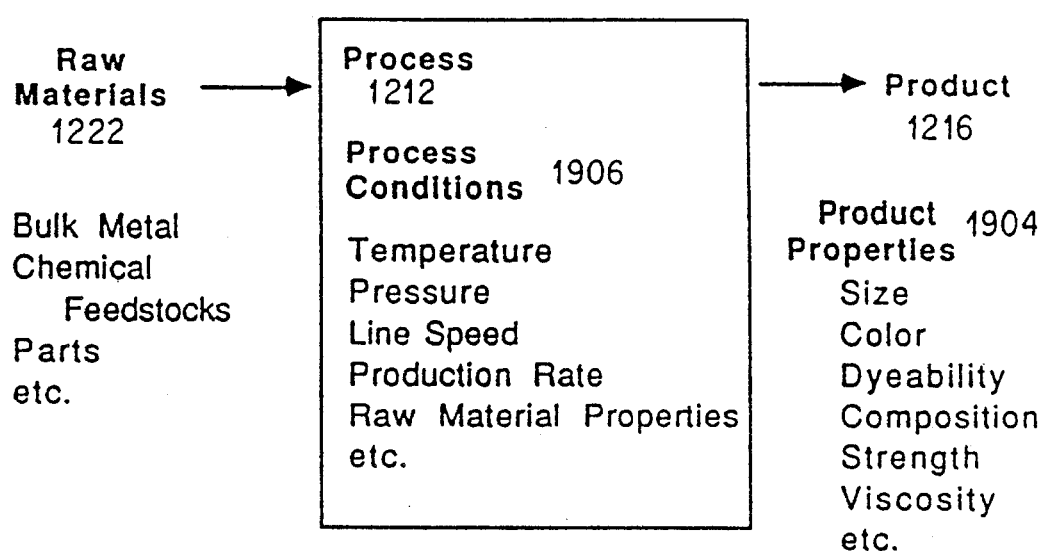
FIG. 19 is a high level block diagram showing the key aspects of a process 1212 having process conditions 1906 used to produce a product 1216 having product properties 1904 from raw materials 1222.
Figure 20:
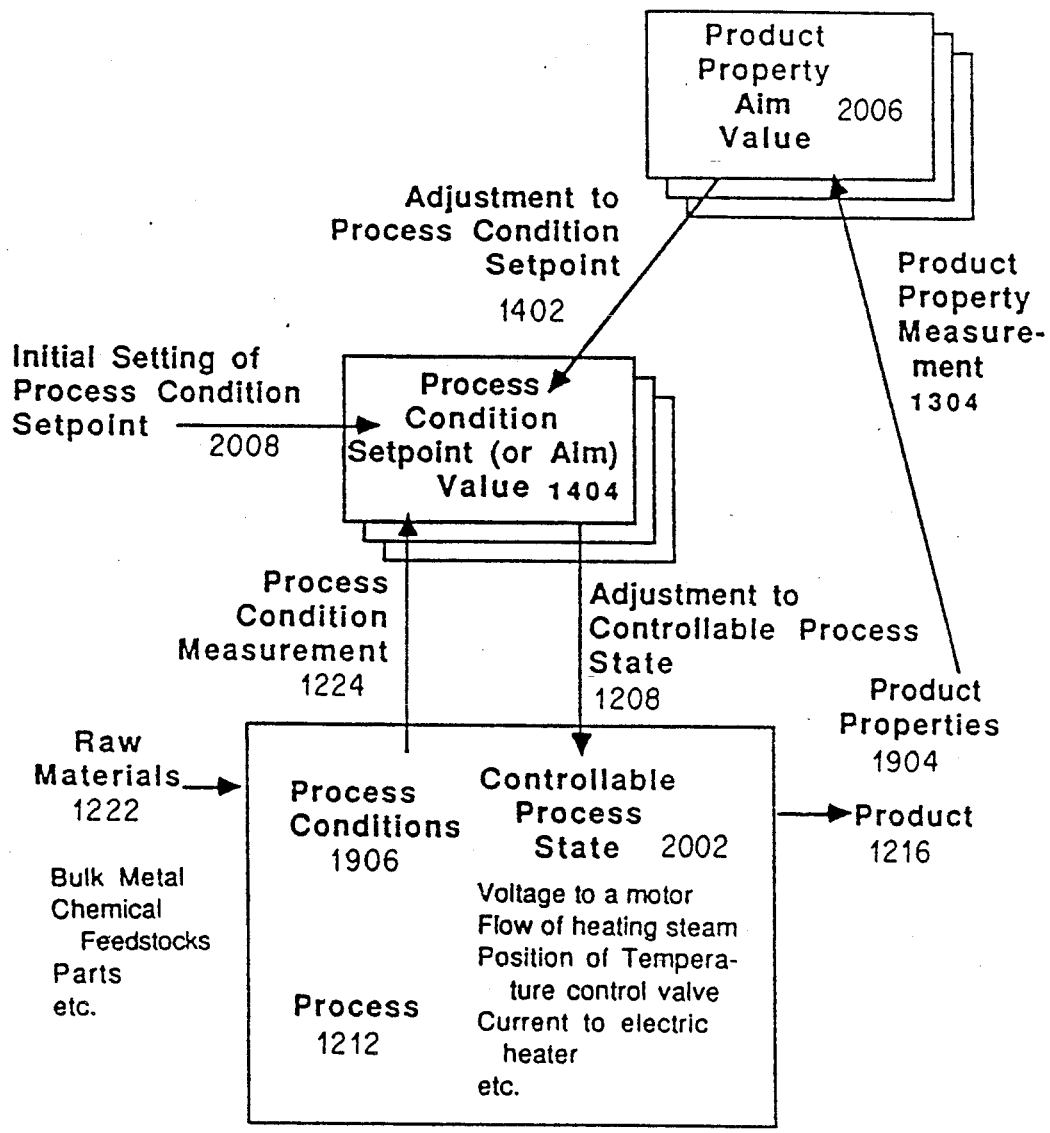
FIG. 20 shows the various steps and parameters which may be used to perform the control of process 1212 to produce products 1216 from raw materials 1222.

Referring to FIGS. 1 and 12, the present invention is a computer neural network system and method which produces predicted output data values 1218 using a trained network supplied with input data 1220 at a specified interval. The predicted data 1218 is used to change a setpoint in a controller 1202, which controls a process 1212 which produces a product 1216. In this way, the process conditions 1906 and product properties 1904 (FIGS. 19 and 20) are maintained at a desired quality level, even though the method of adjusting the setpoint(s) is not known in a way that can be implemented using classical supervisory controls.

The present invention can be configured by a developer using a neural network configuration and module 104 step. Various parameters of the neural network can be specified by the developer by using natural language without knowledge of specialized computer syntax and training. In this way, the present invention allows an expert in the process being measured to configure the present invention without the use of a neural network expert.

Referring also to FIG. 34, the neural network is automatically trained on-line using input data 1220 and associated training input data 1306 having timestamps (for example, from clock 1230). The training input data is computed by monitoring for changes in raw training input data in a controller or a historical database. The input data are stored in an historical database 1210, which supplies this data 1220, 1306 to the neural network 1206 at specified intervals.

The (predicted) output data value 1218 produced by the neural network is either stored in the historical database and then supplied to the controller, or is directly supplied to the controller 1202 for controlling the process as long as the error data 1504 between the output data 1218 and the training input data 1306 is below an acceptable metric.

The error data 1504 is also used for automatically retraining the neural network. This retraining typically occurs while the neural network is providing the controller with the output data. The retraining of the neural network results in the output data approaching the training input data as much as possible. In this way, the present invention can effectively adapt to changes in the operator's control of the process, which can occur in a commercial application.

Figure 16:
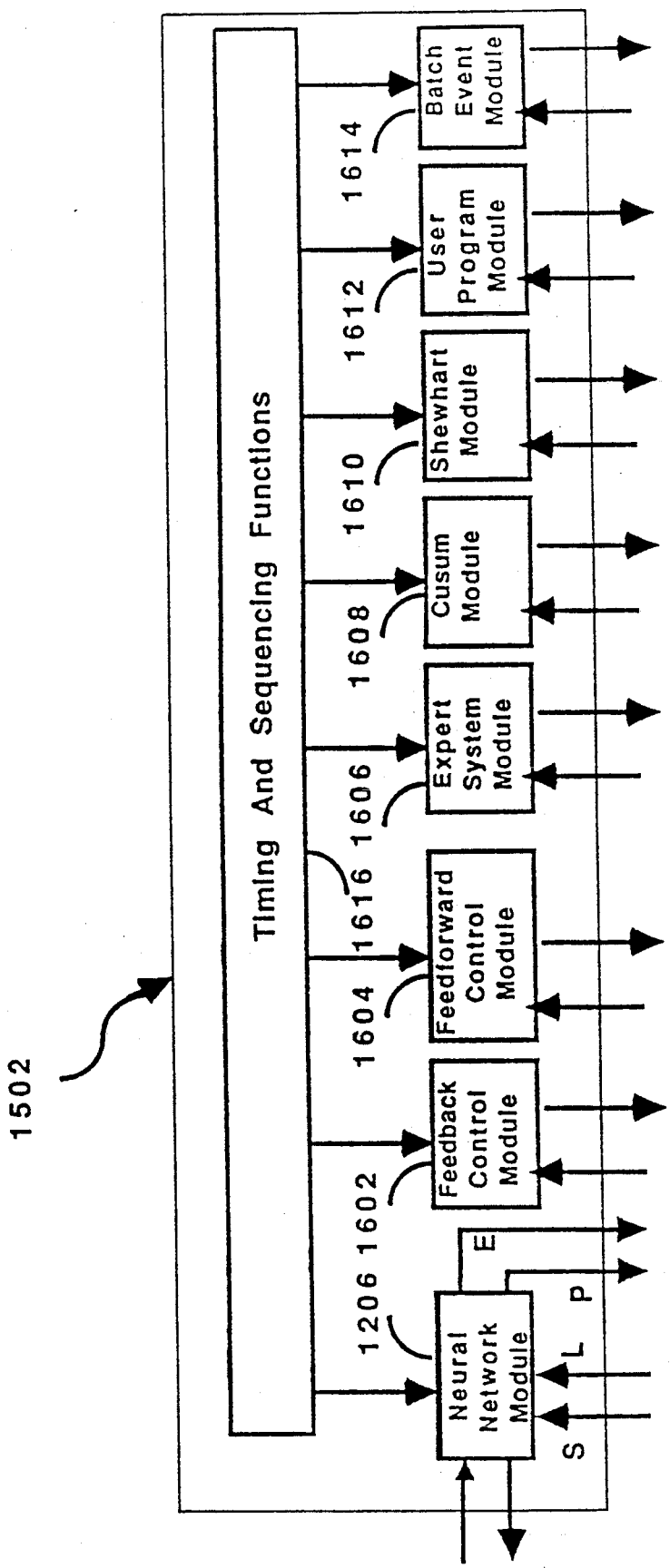
FIG. 16 is a modular version of block 1502 of FIG. 15 showing the various different types of modules that can be utilized with a modular neural network 1206.

A modular approach for the neural network, as shown in FIG. 16, is utilized to simplify configuration and to produce greater robustness. In essence, the modularity is broken out into specifying data and calling subroutines using pointers.

Figure 22:
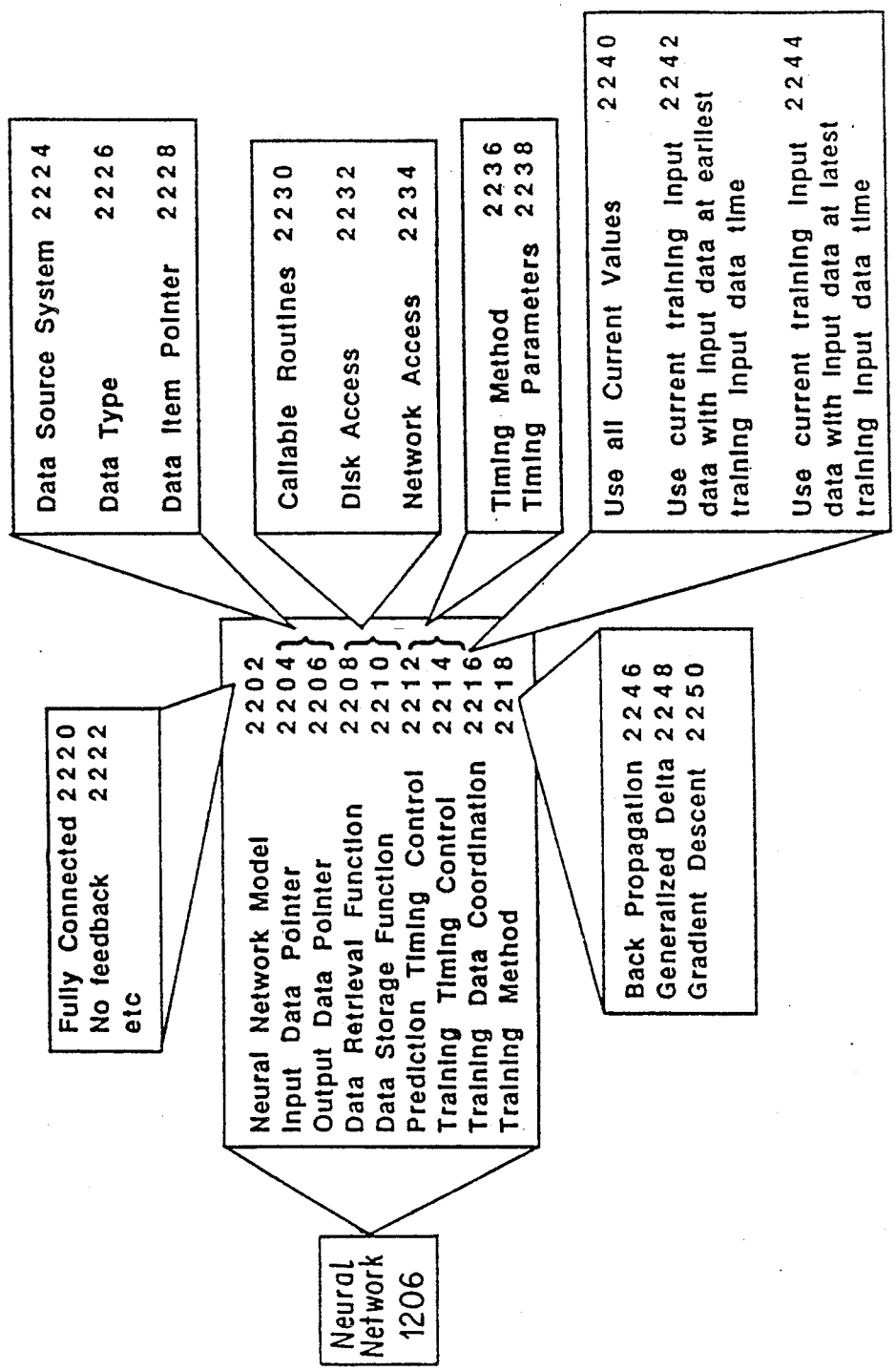
FIG. 22 is an exploded block diagram showing the various parameters and aspects that can make up the neural network 1206.
Figure 26:
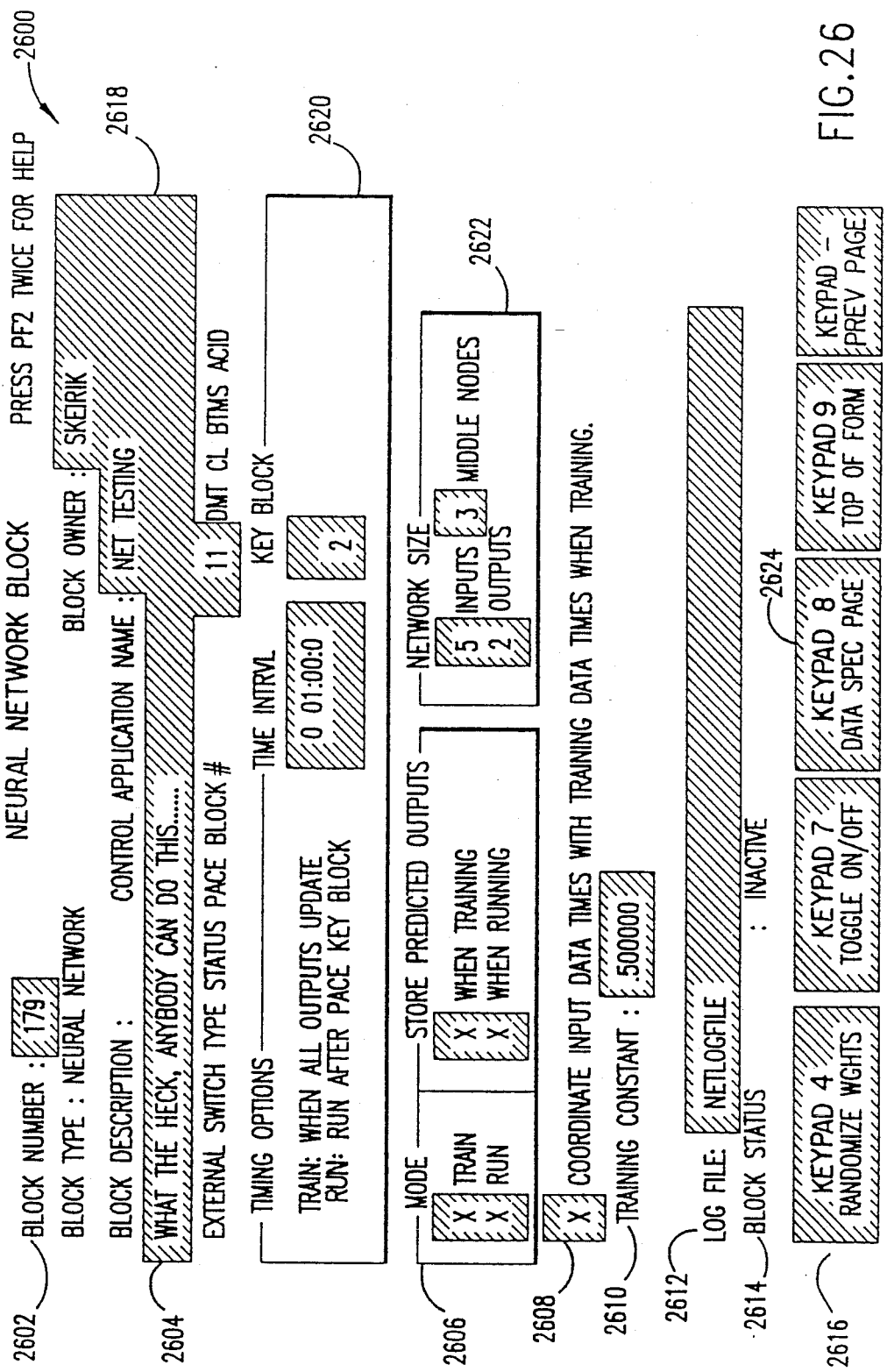
FIG. 26 is a representative computer display or "screen" of a preferred embodiment of the present invention showing part of the configuration specification of the neural network block 1206.

In configuring the neural network, as shown in FIG. 22, data pointers 2204, 2206 are specified. A template approach, as shown in FIGS. 26 and 27, is used to assist the developer in configuring the neural network without having to perform any actual programming.

The present invention is an on-line process control system and method. The term "on-line" indicates that the data used in the present invention is collected directly from the data acquisition systems which generate this data. An on-line system may have several characteristics. One characteristic is the processing of data as the data is generated. This may also be called real-time operation. Real-time operation in general demands that data be detected, processed and acted upon fast enough to effectively respond to the situation. In a process control context, real-time means that the data can be responded to fast enough to keep the process in the desired control state.

In contrast, off-line methods can also be used. In off-line methods, the data being used was generated at some point in the past and there is no attempt to respond in a way that can effect the situation. It should be understood that while the preferred embodiment of the present invention uses an on-line approach, alternate embodiments can substitute off-line approaches in various steps or modules.

IV. Preferred Method of Operation

The preferred method of operation of the present invention stores input data and training data, configures and trains a neural network, predicts output data using the neural network, retrains the neural network, enables or disables control using the output data, and controls the process using output data. As shown in FIG. 1, more than one step or module is carried out in parallel in the method of the present invention. As indicated by the divergent order pointer 120, the first two steps or modules in the present invention are carried out in parallel. First in a step or module 102, input data and training input data are stored in the historical database with associated timestamps. In parallel, the neural network is configured and trained in a step 104. Next, two series of steps or modules are carried out in parallel as indicated by the order pointer 122. First, in a step or module 106, the neural network is used to predict output data using input data stored in the historical database. Next, in a step or module 108, the neural network is retrained using training input data stored in the historical database. Next, in a step or module 110, control using the output data is enabled or disabled in parallel in a step or module 112, control of the process using the output data is carried out when enabled by step or module 110.

A. Store Input Data and Training Input Data Step and Module 102

Figure 2:
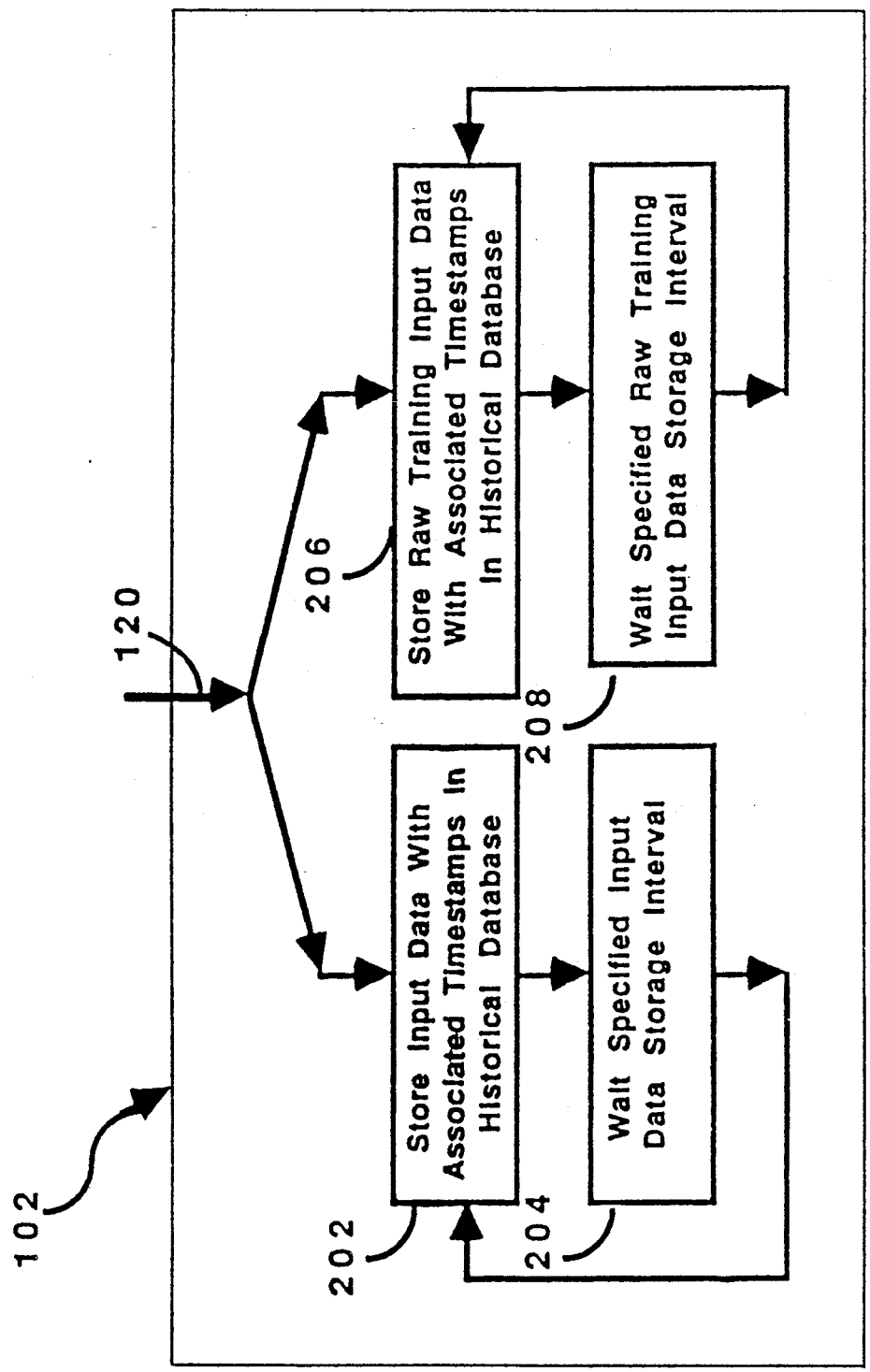
FIG. 2 is an intermediate block diagram of important steps and modules which make up the store input data and training input data step and module 102 of FIG. 1.

As shown in FIG. 1, an order pointer 120 indicates that a step 102 and a step 104 are performed in parallel. Referring now to step 102, it is denominated as the store input data and training input data step and module. FIG. 2 shows step and module 102 in more detail.

Referring now to FIGS. 1 and 2, step and module 102 has the function of storing input data 1220 and storing raw training input data 1306. Both types of data are stored in an historical database 1210 (see FIG. 12 and related structure diagrams), for example. Each stored input data and training input data entry in historical database 1210 utilizes an associated timestamp. The associated timestamp allows the system and method of the present invention to determine the relative time that the particular measurement or predicted value or measured value was taken, produced or derived.

A representative example of step and module 102 is shown in FIG. 2, which is described as follows. The order pointer 120, as shown in FIG. 2, indicates that input data 1220 and raw training input data 1306 are stored in parallel in the historical database 1210. Specifically, input data from sensors 1226 (see FIGS. 12 and 13) are produced by sampling at specific time intervals the sensor signal 1224 provided at the output of the sensor 1226. This sampling produces an input data value or number or signal. Each of these is called an input data 1220 as used in this application. The input data is stored with an associated timestamp in the historical database 1210, as indicated by a step and module 202. The associated timestamp that is stored in the historical database with the input data indicates the time at which the input data was produced, derived, calculated, etc.

A step or module 204 shows that the next input data value is stored by step 202 after a specified input data storage interval has lapsed or timed out. This input data storage interval realized by step and module 204 can be set at any specific value. Typically, it is selected based on the characteristics of the process being controlled.

As shown in FIG. 2, in addition to the sampling and storing of input data at specified input data storage intervals, raw training input data 1306 is also being stored. Specifically, as shown by step and module 206, raw training input data is stored with associated timestamps in the historical database 1210. Again, the associated timestamps utilized with the stored raw training input data indicate the relative time at which the raw training input data was derived, produced or obtained. The training input data is stored in the historical database 1210 in accordance with a specified raw training input data storage interval, as indicated by a step and module 208.

As can be seen, step and module 102 thus results in the historical database 1210 receiving values of input data and raw training input data with associated timestamps. These values are stored for use by the system and method of the present invention in accordance with the steps and modules discussed in detail below.

B. Configure and Train Neural Network Step and Module 104

As shown in FIG. 1, the order pointer 120 shows that a configure and train neural network step and module 104 is performed in parallel with the store input data and training input data step and module 102. The purpose of step and module 104 is to configure and train the neural network 1206 (see FIG. 12).

Specifically, the order pointer 120 indicates that the step and module 104 plus all of its subsequent steps and modules are performed in parallel to the step and module 102.

Figure 3:
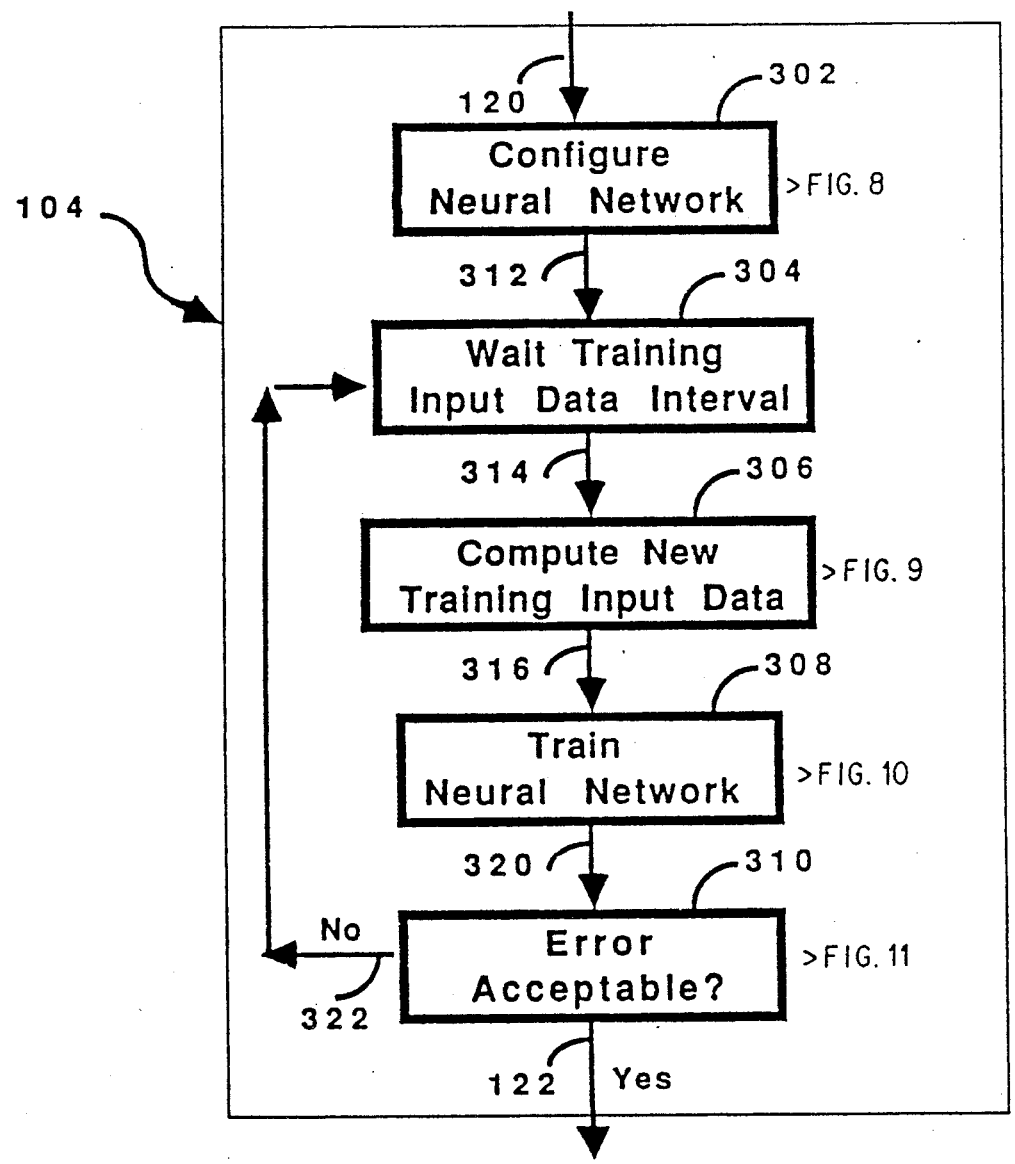
FIG. 3 is an intermediate block diagram of the important steps and modules which make up the configure and train neural network step and module 104 of FIG. 1.

FIG. 3 shows a representative example of the step and module 104. As shown in FIG. 3, this representative embodiment is made up of five steps and modules 302, 304, 306, 308 and 310.

Figure 8:
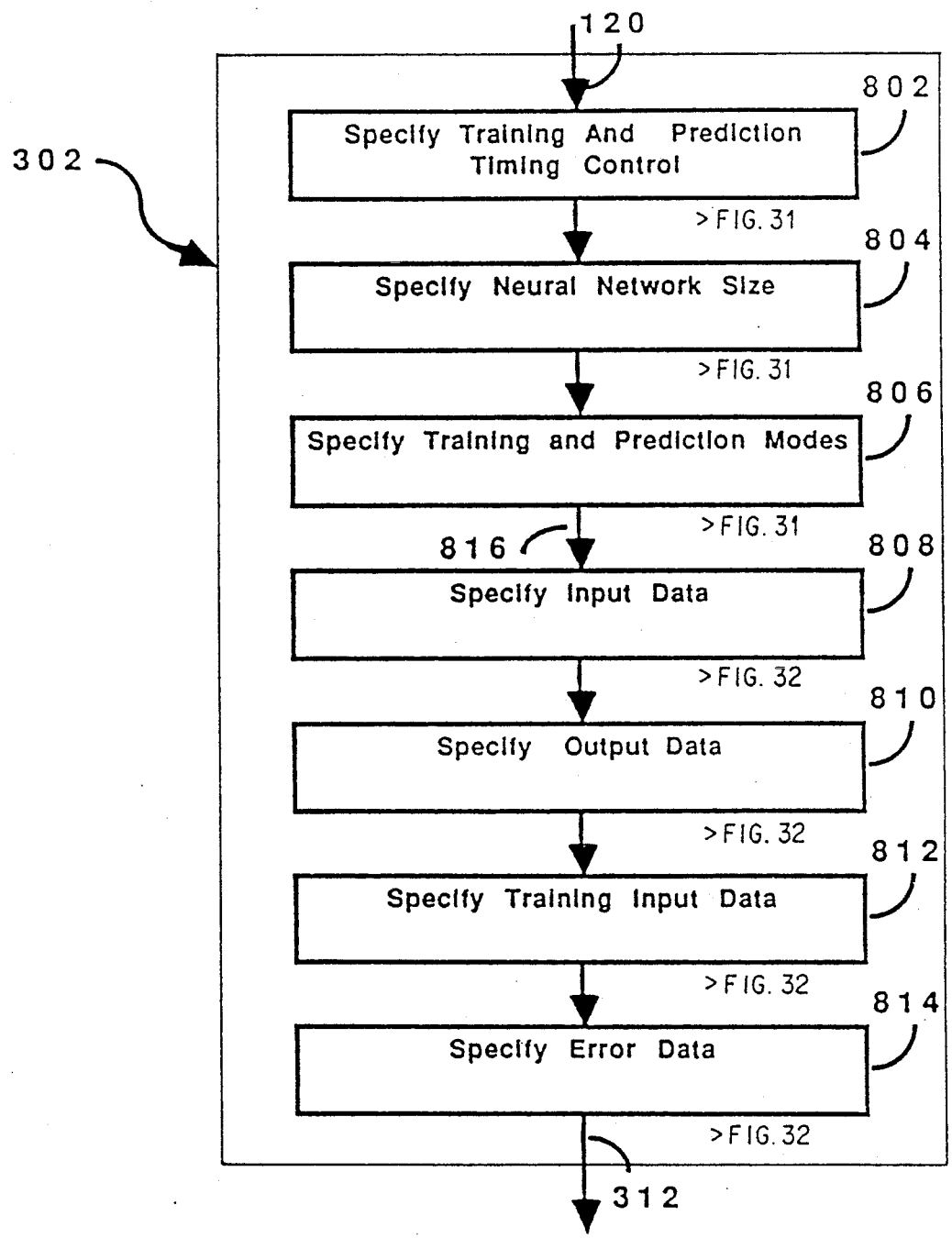
FIG. 8 is a detailed block diagram of the configure neural network step and module 302 of FIG. 3.

Referring now to FIG. 3, an order pointer 120 shows that the first step and module of this representative embodiment is a configure neural network step and module 302. Configure neural network step and module 302 is used to set up the structure and parameters of the neural network 1206 that is utilized by the system and method of the present invention. As discussed below in detail, the actual steps and modules utilized to set up the structure and perameters of neural network 1206 are shown in FIG. 8.

After the neural network 1206 has been configured in step and module 302, an order pointer 312 indicates that a wait training data interval step and module 304 occurs or is utilized. The wait training data interval step and module 304 specifies how frequently new training data will be calculated to be utilized for training of the neural network 1206. It should be noted that the training data interval of step and module 304 is not the same as the specified raw training input data storage interval of step and module 206 of FIG. 2. Any desired value for the training data interval can be utilized for step and module 304.

Figure 9:
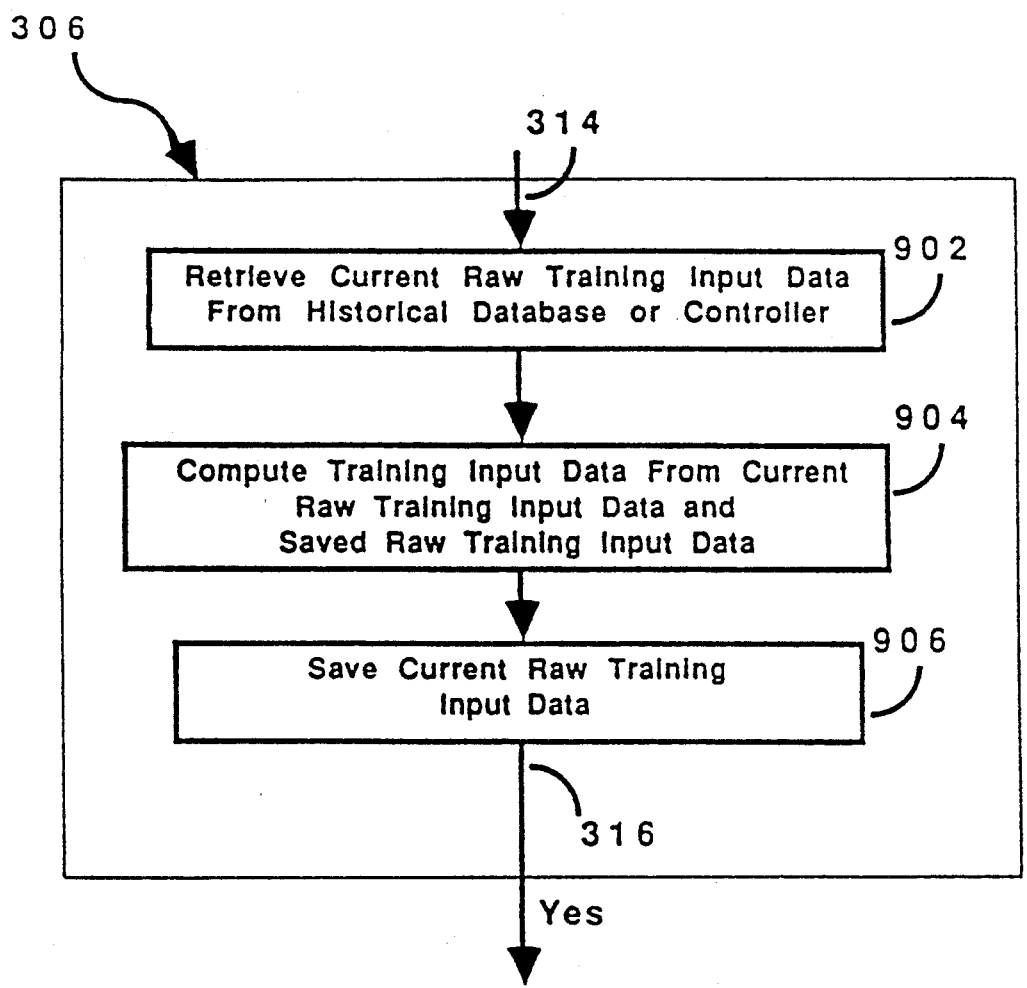
FIG. 9 is a detailed block diagram of the new training input data step and module 306 of FIG. 3.

An order pointer 314 indicates that the next step and module is a compute new training input data step and module 306. This step and module 306 is utilized after the lapse of the training data interval specified by step and module 304. The purpose of step and module 306 is to compute the change in the raw training input data since the last time step and module 306 was carried out. The amount of change is the new training data which permits the system and method of the present invention to train the neural network 1206 if other parameters/conditions are met. FIG. 9 discussed below shows a specific embodiment for the step and module 306.

Figure 10:
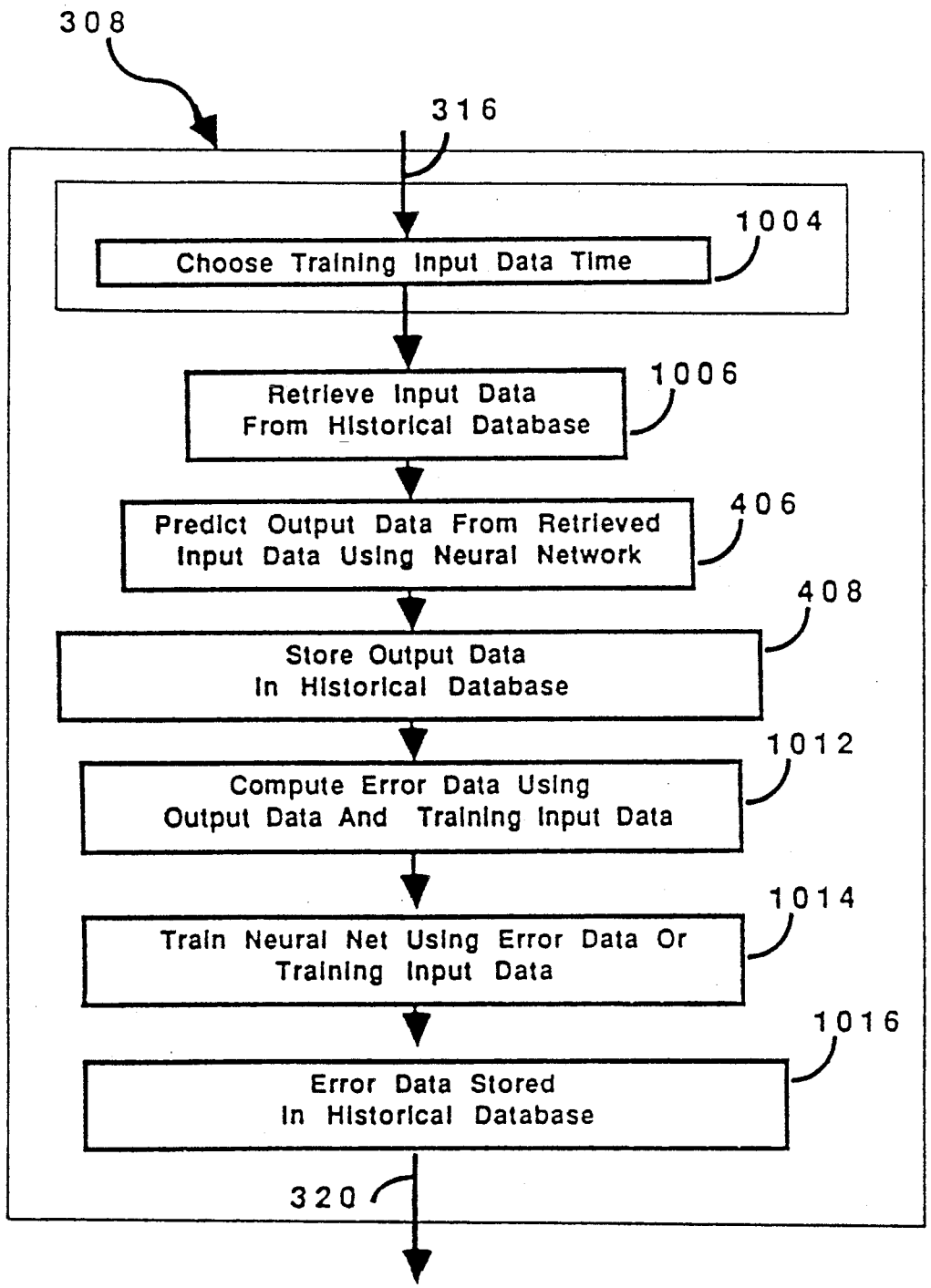
FIG. 10 is a detailed block diagram of the train neural network step and module 308 of FIG. 3.

Next, the system and method of the present invention moves to a train neural network step and module 308. Train neural network step and module 308 is the actual training of the neural network 1206 using the new training data. FIG. 10, discussed below in detail, shows a representative embodiment of the train neural network step and module 308.

Figure 11:
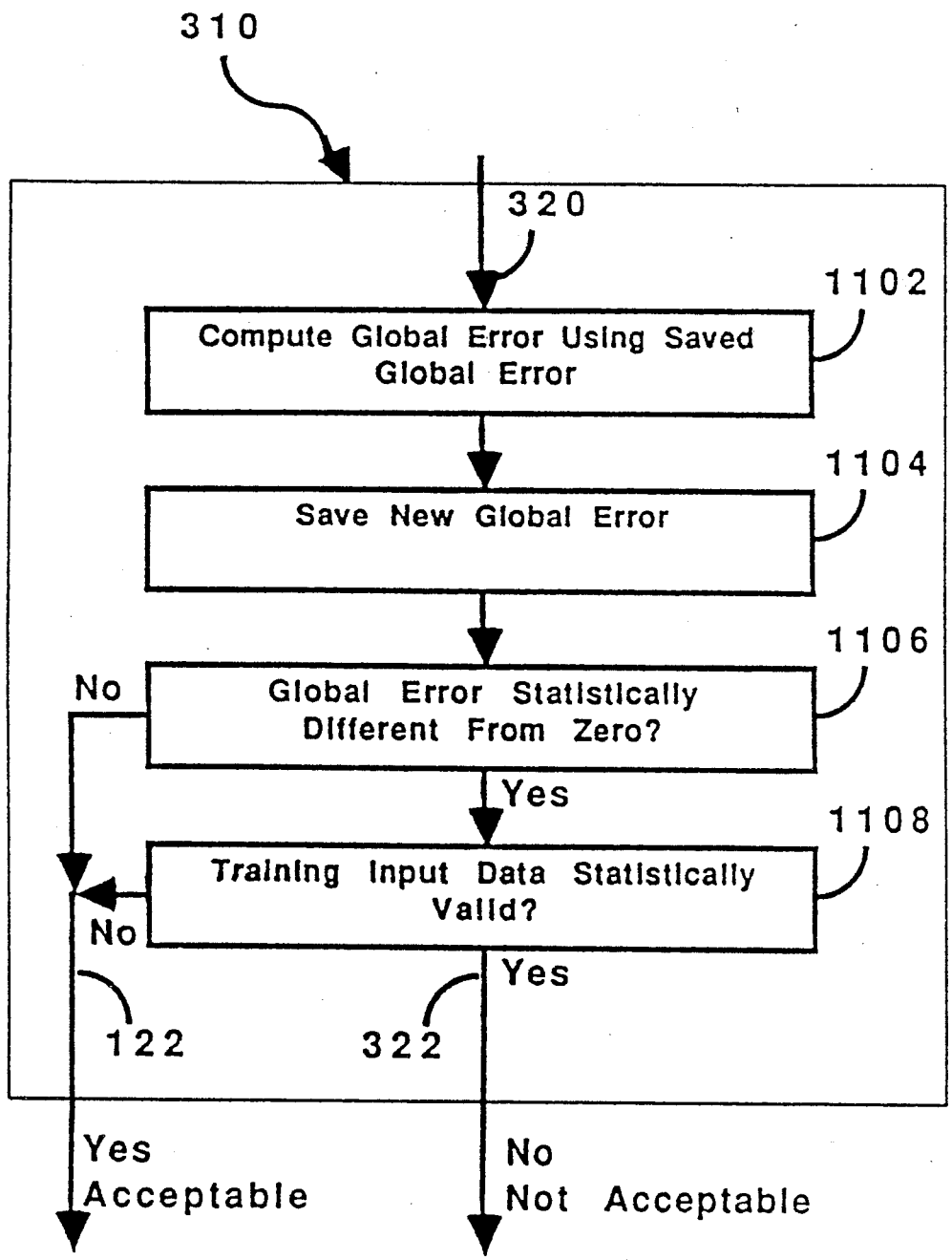
FIG. 11 is a detailed block diagram of the error acceptable step and module 310 of FIG. 3.

After the neural network has been trained, in step and module 308, the step and module 104 as indicated by an order pointer 320 moves to an error acceptable? step and module 310. Error acceptable? step and module 310 determines whether the error data 1504 produced by the neural network 1206 is within an acceptable metric, indicating that the neural network 1206 is providing output data 1218 that is close enough to the training input data 1306 to permit the use of the output data 1218 from the neural network 1206. In other words, an acceptable error indicates that the neural network 1206 has been "trained" as training is specified by the user of the system and method of the present invention. A representative example of the error acceptable? step and module 310 is shown in FIG. 11, which is discussed in detail below.

If an unacceptable error is determined by error acceptable? step and module 310, an order pointer 322 indicates that the step and module 104 returns to the wait training data interval step and module 304. In other words, this means that the step and module 104 has not completed training the neural network 1206. Because the neural network 1206 has not yet been trained, training must continue before the system and method of the present invention can move to a step and module 106 discussed below.

In contrast, if the error acceptable? step and module 310 determines that an acceptable error from the neural network 1206 has been obtained, then the step and module 104 has trained neural network 1206. Since the neural network 1206 has now been trained, step 104 allows the system and method of the present invention to move to the steps and methods 106 and 112 discussed below.

The specific embodiments for step and module 104 are now discussed.

1. Configure Neural Network Step and Module 302

Referring now to FIG. 8, a representative embodiment of the configure neural network step and module 302 is shown. Referring now to FIG. 8, the order pointer 120 indicates that the first step and module is a specify training and prediction timing control step and module 802. Step and module 802 allow the person configuring the system and method of the present invention to specify the training interval(s) and the prediction timing interval(s) of the neural network 1206.

Figure 31:
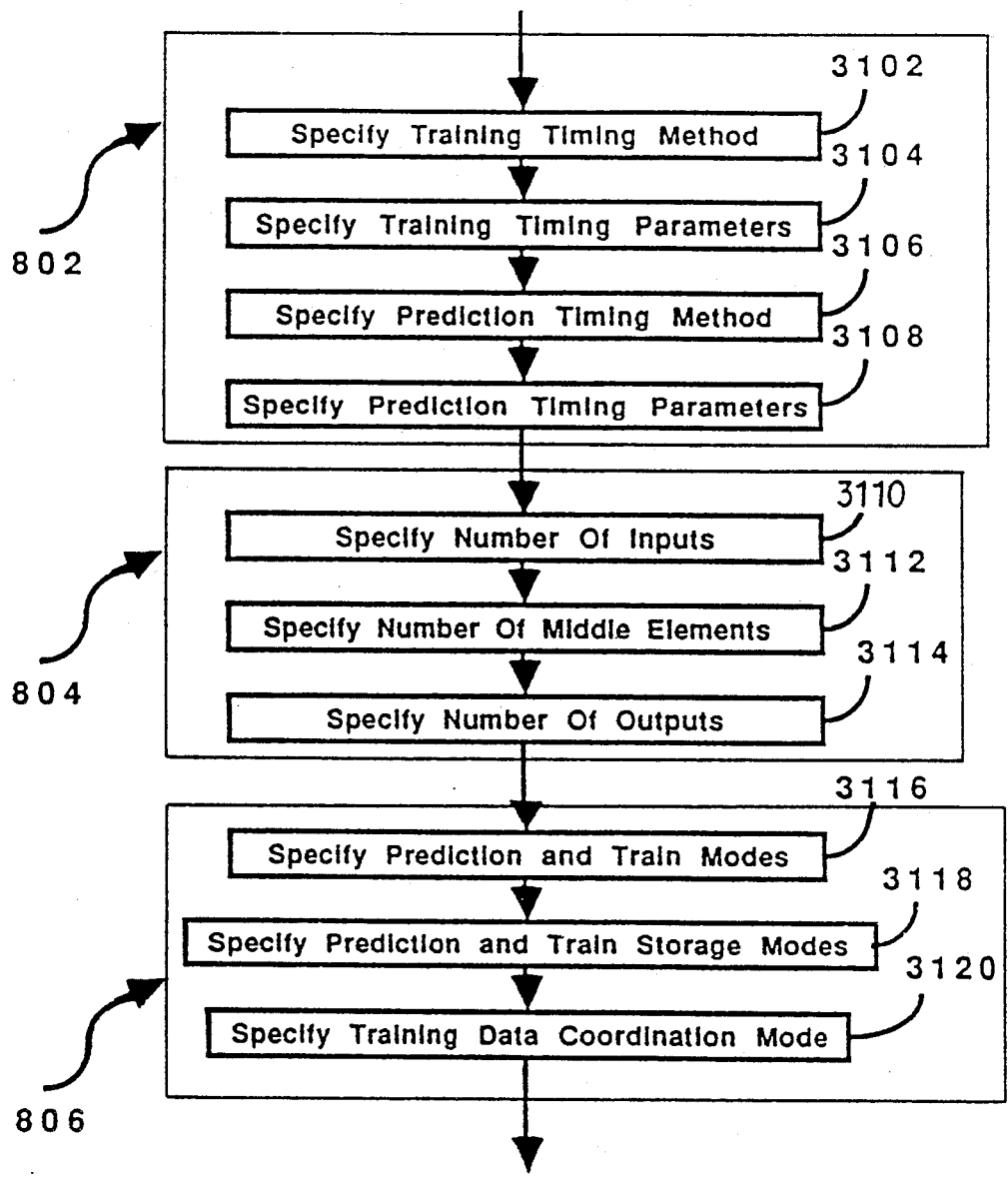
FIG. 31 is a very detailed block diagram of embodiments of steps and modules 802, 804 and 806 of FIG. 8.

FIG. 31 shows a representative embodiment of the step and module 802. Referring now to FIG. 31, step and module 802 can be made up of four steps and modules 3102, 3104, 3106, and 3108. Step and module 3102 is a specify training timing method step and module. The specify training timing method step and module 3102 allows the user configuring the present invention to specify the method or procedure that will be followed to determine when the neural network 1206 will be trained. A representative example of this is when all of the training data has been updated. Another example is the lapse of a fixed time interval. Other methods and procedures can be utilized.

An order pointer indicates that a specify training timing parameters step and module 3104 is then carried out by the user of the present invention. This step and module 3104 allows for any needed training timing parameters to be specified. It should be realized that the method or procedure of step and module 3102 can result in zero or more training timing parameters, each of which has a value. This value could be a time value, a module number (in the modular embodiment of the present invention of FIG. 16), or a data pointer. In other words, the user can configure the present invention so that considerable flexibility can be obtained in how training of the neural network 1206 occurs based on the method or procedure of step and module 3102.

An order pointer indicates that once the training timing parameter(s) 3104 has been specified, a specify prediction timing method step and module 3106 is configured by the user of the present invention. This step and module 3106 specifies the method or procedure that will be used by the neural network 1206 to determine when to predict output data values 1218 after it has been trained. This is in contrast to the actual training of the neural network 1206. Representative examples of methods or procedures for step and module 3106 are execute at a fixed time interval, execute after the execution of a specific module, or execute after a specific data value is updated. Other methods and procedures can be used.

An order indicator in FIG. 31 shows that a specify prediction timing parameters step and module 3108 is then carried out by the user of the present invention. Any needed prediction timing parameters for the method or procedure of step or module 3106 can be specified. For example, the time interval can be specified as a parameter for the execute at a specific time interval method or procedure. Another example is the specification of a module identifier when the execute after the execution of a particular module method or procedure is specified. Another example is a data pointer when the updating of a data value method or procedure is used. Other operation timing parameters can be used.

Referring again to FIG. 8, after the specify training and prediction timing control step and module 802 has been specified, a specify neural network size step and module 804 is carried out. This step and module 804 allows the user to specify the size and structure of the neural network 1206 that is used by the present invention.

Specifically, referring to FIG. 31 again, a representative example of how the neural network size can be specified by step and module 804 is shown. An order pointer indicates that a specific number of inputs step and module 3110 allows the user to indicate the number of inputs that the neural network 1206 will have. Note that the source of the input data for the specified number of inputs has not yet been fixed by the user in the step and module 3110. Only the actual number of inputs have been specified in the step and module 3110.

Once the number of inputs have been specified in step and module 3110, the user can specify the number of middle (hidden) layer elements in the neural network 1206 by using a step or method 3112. By middle elements it is meant that one or more internal layers 2108 of the neural network can be specified by the user. The present invention contemplates a neural network having zero or more middle layers 2108. Typically, one middle layer is used; however, two or more middle layers are contemplated.

An order pointer indicates that once the number of middle elements have been specified in step and module 3112, the number of output data from 2106 the outputs of the neural network 1206 can be specified as indicated by a step or module 3114. Note that where the outputs of the neural network 1206 are to be stored is not specified in step or module 3114. Instead, only the number of outputs are specified in this step of the present invention.

As discussed herein, the present invention contemplates any form of presently known or future developed configuration for the structure of the neural network 1206. Thus, steps or modules 3110, 3112, and 3114 can be modified so as to allow the user to specify these different configurations for the neural network 1206.

Referring again to FIG. 8, once the neural network size has been specified in step and module 804, the user can specify the training and prediction modes in a step and module 806. Step and module 806 allows both the training and prediction modes to be specified. It also allows for controlling the storage of the data produced in the training and prediction modes. It also allows for data coordination to be used in training mode.

A representative example of the specific training and prediction modes step and module 806 is shown in FIG. 31. It is made up of step and modules 3116, 3118, and 3120.

As shown, an order pointer indicates that the user can specify prediction and train modes in a step and module 3116. These are yes/no or on/off settings. Since the system and method of the present invention is in the train mode at this stage in its operation, step and 3116 typically goes to its default setting of train mode only. However, it should be understood that the present invention contemplates allowing the user to independently control the prediction or train modes.

When prediction mode is enabled or "on," the neural network 1206 will predict output data values 1218 using retrieved input data values 1220, as described below. When training mode is enabled or "on," the neural network 1206 will monitor the historical database 1210 for new training data and will train using the training data, as described below.

An order pointer indicates that once the prediction and train modes have been specified in the step and module 3116, the user can specify prediction and train storage modes in a step and module 3118. These are on/off, yes/no values. They allow the user to specify whether the output data produced in the prediction and/or modes will be stored for possible later use. In some situations, the user will specify that they will not be stored, and in such a situation they will be discarded after the prediction or train mode has occurred. Examples of situations where storage may not be needed are as follows. First, if the error acceptable metric value in the train mode indicates that the output data is poor and retraining is necessary, there may be no reason to keep the output data. Another example is in the prediction mode, where the output data is not stored but is only used. Other situations may arise where no storage is warranted.

An order pointer indicates that a specify training data coordination mode step and module 3120 is then specified by the user. Oftentimes, training input data 1306 must be correlated in some manner with input data 1220. This step and module 3120 allows the user to deal with the relatively long time period required to produce training input data 1306 from when the measured state(s) existed in the process. First, the user can specify whether the most recent input data will be used with the training data, or whether prior input data will be used with the training data. If the user specifies that prior input data is to be used, the method of determining the time of the prior input data can be specified in this step and module 3120.

Referring again to FIG. 8, once the specify training and prediction modes step and module 806 has been completed by the user, steps and modules 808, 810, 812 and 814 are carried out. Specifically, the user follows a specify input data step and module 808, a specify output data step and module 810, a specify training input data step and module 812, and a specify error data step and module 814. Essentially, these four steps and modules 808-814 allow the user to specify the source and destination of input and output data for both the (run) prediction and training modes, and the storage location of the error data determined in the training mode.

Figure 32:
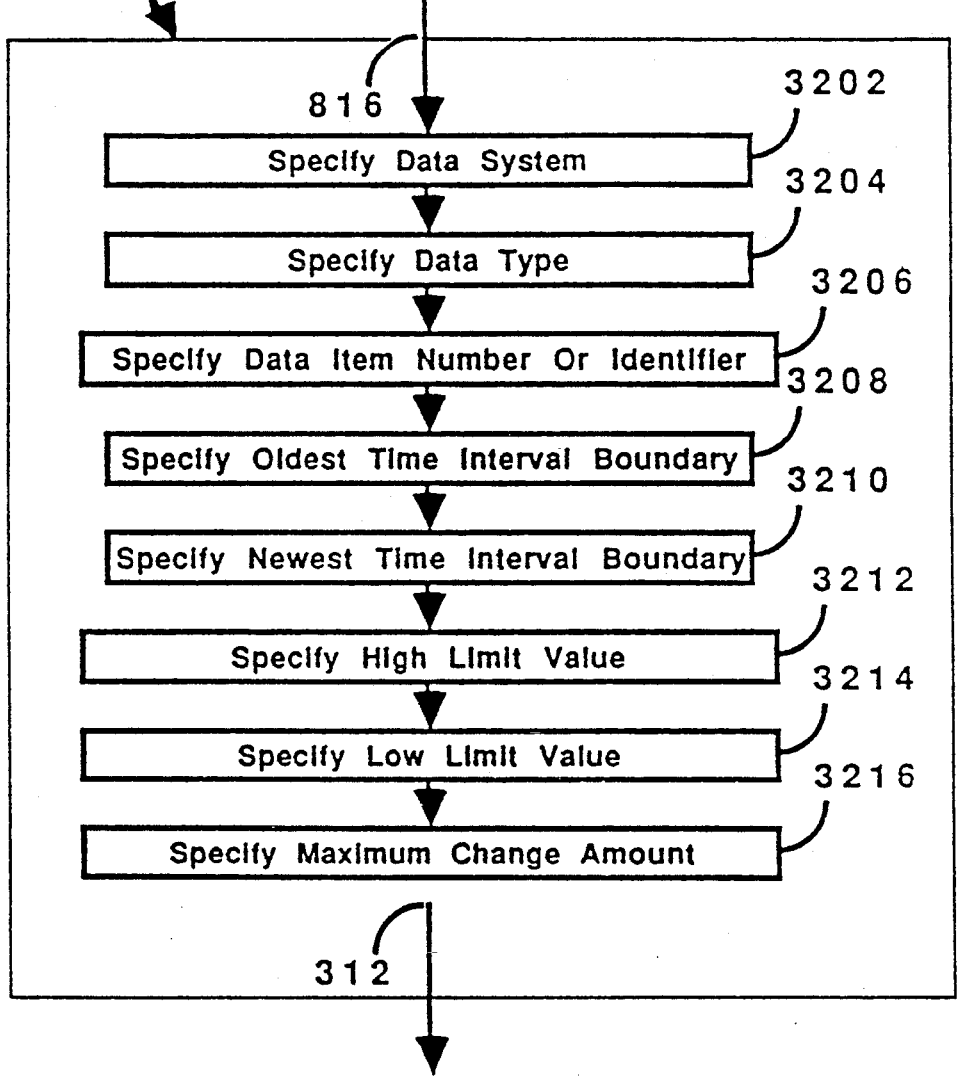
FIG. 32 is a very detailed block diagram of embodiments of steps and modules 808, 810, 812 and 814 of FIG. 8.

FIG. 32 shows a representative embodiment used for all of the steps and modules 808-814 as follows.

Steps and modules 3202, 3204 and 3206 essentially are directed to specifying the data location for the data being specified by the user. In contrast, steps and modules 3208-3216 may be optional in that they allow the user to specify certain options or sanity checks that can be performed on the data as discussed below in more detail.

Turning first to specifying the storage location of the data being specified, a step or module 3202 is called specify data system. Typically, in a chemical plant, there is more than one computer system utilized with a process being controlled. Step or module 3202 allows for the user to specify which computer system(s) contains the data or storage location that is being specified.

Once the data system has been specified, the user can specify the data type using a specify data type step and module 3204. The data type indicates which of the many types of data and/or storage modes are desired. Examples are current (most recent) values of measurements, historical values, time averaged values, setpoint values, limits, etc. After the data type has been specified, the user can specify a data item number or identifier using a step or module 3206. The data item number or identifier indicates which of the many instances of the specify data type in the specified data system is desired. Examples are the measurement number, the control loop number, the control tag name, etc. These three steps and modules 3202-3206 thus allow the user to specify the source or destination of the data (used/produced by the neural network) being specified.

Once this has been specified, the user can specify the following additional parameters. Specifically, where data is being specified which is time varying, the user can specify the oldest time interval boundary using a step and module 3208, and can specify the newest time interval boundary using a step and module 3210. For example, these boundaries can be utilized where a time weighted average of a specified data value is needed. Alternatively, the user can specify one particular time when the data value being specified is an historical data point value.

Sanity checks on the data being specified can be specified by the user using steps and modules 3212, 3214 and 3216 as follows. Specifically, the user can specify a high limit value using a step and module 3212, and can specify a low limit value using a step and module 3214. Since sensors, for example, sometimes fail, this sanity check allows the user to prevent the system and method of the present invention from using false data from a failed sensor. Other examples of faulty data can also be detected by setting these limits.

The high and low limit value can be used for scaling the input data. Neural networks are typically trained and operated using input, output and training input data scaled within a fixed range. Using the high and low limit values allows this scaling to be accomplished so that the scaled values use most of the range. Typical ranges are 0 to 1 and −1 to 1.

In addition, the user often knows that certain values will normally change a certain amount over a specific time interval. Thus, changes which exceed these limits can be used as an additional sanity check. This can be accomplished by the user specifying a maximum change amount in step and module 3216.

Sanity checks can be used in the method of the present invention to prevent erroneous training, prediction, and control. Whenever any data value fails to pass the sanity checks, the data may be clamped at the limit(s), or the operation/control may be disabled. These tests significantly increase the robustness of the present invention.

It should be noted that these steps and modules in FIG. 32 apply to the input, output, training input, and error data steps and modules 808, 810, 812 and 814.

When the neural network is fully configured, the weights are normally set to random values in their allowed range (−1 to 1 is commonly used as a weight range). This can be done automatically, or it can be performed on demand by the user (for example, using softkey 2616 in FIG. 26).

Now the neural network 1206 is ready to be trained.

2. Wait Training Input Data Interval Step and Module 304

Referring again to FIG. 3, the wait training data interval step and module 304 is now described in greater detail.

Typically, the wait training input data interval is much shorter than the time period (interval) when training input data becomes available. This wait training input data interval determines how often new training input data will be computed from the raw training input data. Obviously, the more frequently the training input data is checked, the shorter the time interval will be from when a setpoint change is made by a human operator to when retraining has occurred.

It should be noted that the configuration for the neural network 1206 and specifying its wait training input data interval is done by the user. This interval may be inherent in the software system and method which contains the neural network of the present invention. Preferably, it is specifically defined by the user of the system and method of the present invention.

In choosing the training input data interval used in step and module 304, it is important to consider how the neural network will be used to predict recommended setpoint changes. Since the prediction of setpoint changes must be done with no knowledge beforehand of whether or not a setpoint change is needed, these predictions will often result in recommended changes of zero or nearly zero. Thus it is important to train the neural network during periods where no adjustment has been made by a human operator. This is accomplished, for example, by using a fixed time interval for the training input data interval in step and module 304. Using this approach, the training sets would be created at regular intervals, including a number of training sets in which the operator adjustment was zero. This will allow the neural network to properly predict the setpoint changes.

3. New Training Input Data? Step and Module 306

Once the neural network is configured in step and module 302, the neural network must now be trained. Referring now to FIG. 3, the steps and modules needed to perform the training of the neural network are shown in more detail. First the neural network must compute new training data. In the present invention, the training input data (that is, the information which we want to be able to predict using the neural network) are the setpoint adjustments made by the human operator of the process. Setpoint adjustments are detected using the method shown in FIG. 9. First the current value of the raw training input data is retrieved in a step and module 902. Then the current raw training input data and the saved raw training input data are used to compute new training input data in a step and module 904. If the current raw training input data is not different from the saved raw training input data, this means that no change has been made in the training input data (that is, no setpoint adjustment has been made by the human operator, for example) and the training input data has a value of zero. However, if the current raw training input data is different from the saved raw training input data, then an adjustment (change) has been made to the training input data.

The method of the present invention then moves to a save current raw training input data step and module 906. This step and module computes (calculates or estimates) the change (adjustment) that has been made in the training input data. This change is the actual training input data which will be used to train the neural network. It should be noted that an initialization must be performed for the saved raw training input data as referenced above.

Thus it can be seen that the method of the present invention computes training input data, which is made up of adjustments (changes) to setpoint(s) in an on-line fashion. That is, the setpoint changes are detected in real time as they occur, by monitoring the setpoint at the training input data interval.

The training input data is normally scaled. This scaling can use the high and low limit values specified in the configure and train neural network step 104.

In a variation of the present invention, the training input data can be created by using a historical database. This is accomplished by searching through the historical database over a time period which is of interest in training the neural network. The database is searched from the oldest (that is, the earliest) time forward in time looking for changes in a setpoint value which is being stored in the historical data base. Two methods can be used for this. First, the database may simply be read by stepping through at time intervals which may be approximately equal to the training input data interval. This would give roughly equivalent performance to monitoring the setpoint in real time. The other approach is to use the facilities of the database retrieval functions to simply pick the next significant change in the setpoint value stored in historical database. Since the database may have the capability of giving this value directly it may be unnecessary to search for it. However, either method can be used.

4. Train Neural Network Step and Module 308

Once new training input data has been computed in step and module 306, the neural network must be trained using the computed training input data. This is performed in the train neural network step and module 308. This step and module is shown in more detail in FIG. 10. First input data is retrieved in a retrieve input data from historical database step and module 1006. The input data is normally scaled. This scaling can use the high and low limit values specified in the configure and train neural network step 104. The input data corresponds to the measurements/data which the human operator uses in deciding to make a setpoint adjustment and in determining the amount and type of adjustment to make. In many cases, the input data will consist only of current values, that is the latest available measurements/data. In this case the input data may be retrieved from any of the process monitoring and/or control system which is able to provide current readings.

However, it may be helpful to the human operator in deciding what adjustment to make, to have available additional historical information from the process. For example, the human operator may use trends in data over a past time interval, or he may use the results of statistical tests which might be applied to a number of sample measurements taken over some time interval. Also, a history of the output data (setpoint changes) made by the neural network could be used. This would allow the neural network to take its previous adjustments into account. These are examples of historical types of information which might be of value to the human operator. This kind of information can beneficially be provided as input data to the neural network for use in predicting the setpoint changes. In this case an historical data base of process measurements can be used to provide this type of input data.

Thus as seen here, and as seen above in the discussion of the compute new training data step and module, the historical database can optionally be used in several ways in the present invention to give superior and/or different performance. This use of historical data, requires that the input data be stored in the historical data base with the associated timestamps as described above.

Thereafter, the neural network 1206 predicts output data from the retrieved input data, as indicated by a step and module 406.

The predicted output data from the neural network 1206 is then stored in the historical database 1210, as indicated by a step and module 408. The output data is normally produced in a scaled form, since all the input and training input data is scaled. In this case, the output data must be de-scaled. This de-scaling can use the high and low limit values specified in the configure and train neural network step 104. Thereafter, error data is computed using the output data from the neural network 1206 and the training input data, as indicated by a step and module 1012. It should be noted that the term error data 1504 as used in step and module 1012 is a set of error data values for all of the predicted outputs 2106 from the neural network 1206. However, the present invention also contemplates using a global or cumulative error data for evaluating whether the predicted output data values are acceptable.

After the error data 1504 has been computed (calculated) in the step and module 1012, the neural network 1206 is trained using the error data 1504 and/or the training input data 1306. The present invention contemplates any method of training the neural network 1306.

After the training step and module 1014 has been completed, the error data 1504 is stored in the historical database 1210 in a step and module 1016. It should be noted that the error data 1504 shown here is the individual data for each output 2106. These stored error data 1504 provide a historical record of the error performance for each output 2106 of the neural network 1206.

The sequence of steps described above is the preferred embodiment used when the neural network 1206 can be effectively trained using a single presentation of the training set created for each new training input data 1306.

However, in using certain training methods or for certain applications, the neural network 1206 may require many presentations of training sets to be adequately (acceptable metric) trained. In this case, two alternate approaches can be used to train the neural network 1206.

In the first approach, the neural network 1206 can save the training sets (that is, the training input data and the associated input data which is retrieved in step and module 308) in a database of training sets, which can then be repeatedly presented to the neural network 1206 to train the neural network. A second approach which can be used is to maintain a time history of input data and training input data in the historical database 1210, and to search the historical database 1210, computing training input data and constructing the corresponding training set by retrieving the associated input data.

It should be understood that the combination of the neural network 1206 and the historical database 1210 containing both the input data and the training input data with their associated timestamps provides a very powerful platform for building, training and using the neural network 1206. The present invention contemplates various other modes of using the data in the historical database 1210 and the neural network 1206 to prepare training sets for training the neural network 1206.

5. Error Acceptable ? Step and Module 310

Referring again to FIG. 3, once the neural network 1206 has been trained in step and module 308, a step and module 310 of determining whether an acceptable error? occurs. FIG. 11 shows a representative embodiment of the error acceptable? step and module 310.

Referring now to FIG. 11, an order pointer 320 indicates that an compute global error using saved global error step and module 1102 occurs. The term global error as used herein means the error over all the outputs 2106 and/or over two or more training sets (cycles) of the neural network 1206. The global error reduces the effects of variation in the error from one training set (cycle) to the next. One cause for the variation is the inherent variation in lab data tests used to generate the training input data.

Once the global error has been computed (estimated) in the step and module 1102, it is saved in a step and module 1104. The global error may be saved internally in the neural network 1206, or it may be stored in the historical database 1210. Storing the global error in the historical database 1210 provides an historical record of the overall performance of the neural network 1206.

Thereafter, if an appropriate history of global error is available (as would be the case in retraining), a step and module 1106 can be used to determine if the global error is statistically different from zero. This step and module 1106 determines whether a sequence of global error values falls within the expected range of variation around the expected (desired) value of zero, or whether the global error is statistically significantly different from zero. This step and module 1106 can be important when the training input data used to compute the global error has significant random variability. If the neural network 1206 is making accurate predictions, the random variability in the training input data (for example, caused by lab variation) will cause random variation of the global error around zero. This step and module 1106 reduces the tendency to incorrectly classify as not acceptable the predicted outputs of the neural network 1206.

If the global error is not statistically different from zero, then the global error is acceptable, and the present invention moves to an order pointer 122. An acceptable error indicated by order pointer 122 means that the neural network 1206 is trained. This completes step and module 104.

However, if the global error is statistically different from zero, the present invention in the retrain mode moves to a step and module 1108, which is called training input data statistically valid?. (Note that step and module 1108 is not needed in the training mode of step and module 104. In the training mode, a global error statistically different from zero moves directly to an order pointer 322.)

If the training input data in the retraining mode is not statistically valid, this indicates that the acceptability of the global error cannot be determined, and the present invention moves to the order pointer 122. However, if the training input data is statistically valid, this indicates that the error is not acceptable, and the present invention moves back to the wait training input data interval step and module 304, as indicated in FIG. 3.

The steps and modules described here for determining whether the global error is acceptable constitute one example of implementing a global error acceptable metric. It should be understood that different process characteristics, and different sampling frequencies, and different measurement techniques (for process conditions and product properties) may indicate alternate methods of determining whether the error is acceptable. The present invention contemplates any method of creating an error acceptable metric.

Thus, it has been seen that the present invention in step and module 104 configures and trains the neural network 1206 for use in the present invention.

C. Predict Output Data Using Neural Network Step and Module 106

Referring again to FIG. 1, the order pointer 122 indicates that there are two parallel paths that the present invention uses after the configure and train neural network step and module 104. One of the paths, of which the predict output data using neural network step and module 106 described below is part, is used for predicting output data using the neural network 1206, for retraining the neural network 1206 using these predicted output data, and for disabling control of the controlled process when the (global) error from the neural network 1206 exceeds a specified error acceptable metric (criterion). The other path is the actual control of the process using the predicted output data from the neural network 1206.

Figure 4:
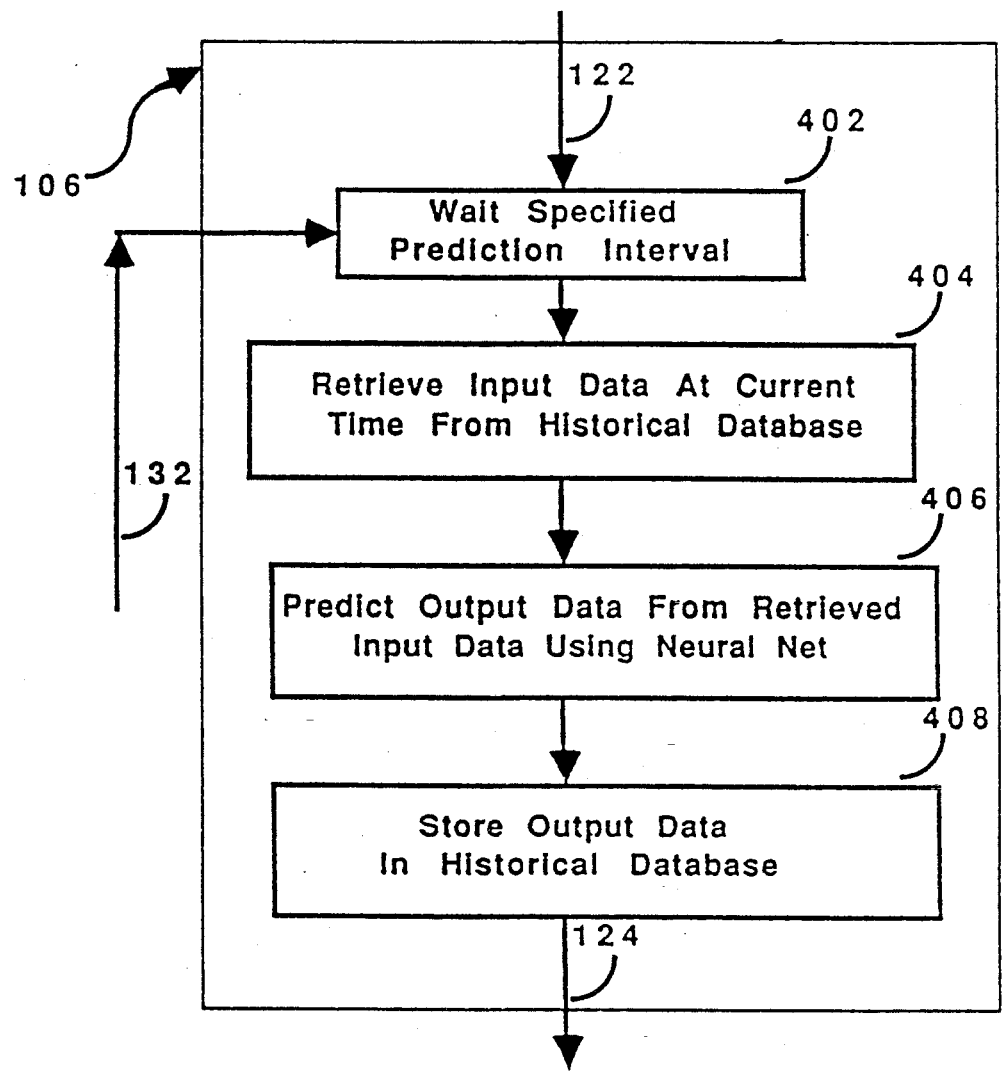
FIG. 4 is an intermediate block diagram of the important steps and modules which make up the predict output data using neural network step and module 106 of FIG. 1.

Turning now to the predict output data using neural network step and module 106, this step and module 106 uses the neural network 1206 to produce output data for use in control of the process and for retraining the neural network 1206. FIG. 4 shows a representative embodiment of the step and module 106.

Turning now to FIG. 4, a wait specified prediction interval step or module 402 utilizes the method or procedure specified by the user in steps or modules 3106 and 3108 for determining when to retrieve input data. Once the specified prediction interval has elapsed, the present invention moves to a retrieve input data at current time from historical database step or module 404. The input data is retrieved at the current time. That is, the most recent value available for each input data value is retrieved from the historical database 1210.

The neural network 1206 then predicts output data from the retrieved input data, as indicated by a step and module 406. This output data is used for process control, retraining and control purposes as discussed below in subsequent sections. Prediction is done using any presently known or future developed approach. For example, prediction can be done as specified above in Section I.B.

D. Retrain Neural Network Step or Module

Referring again to FIG. 1, once the predicted output data has been produced by the neural network 1206, a retrain neural network step or module 108 is used.

Figure 5:
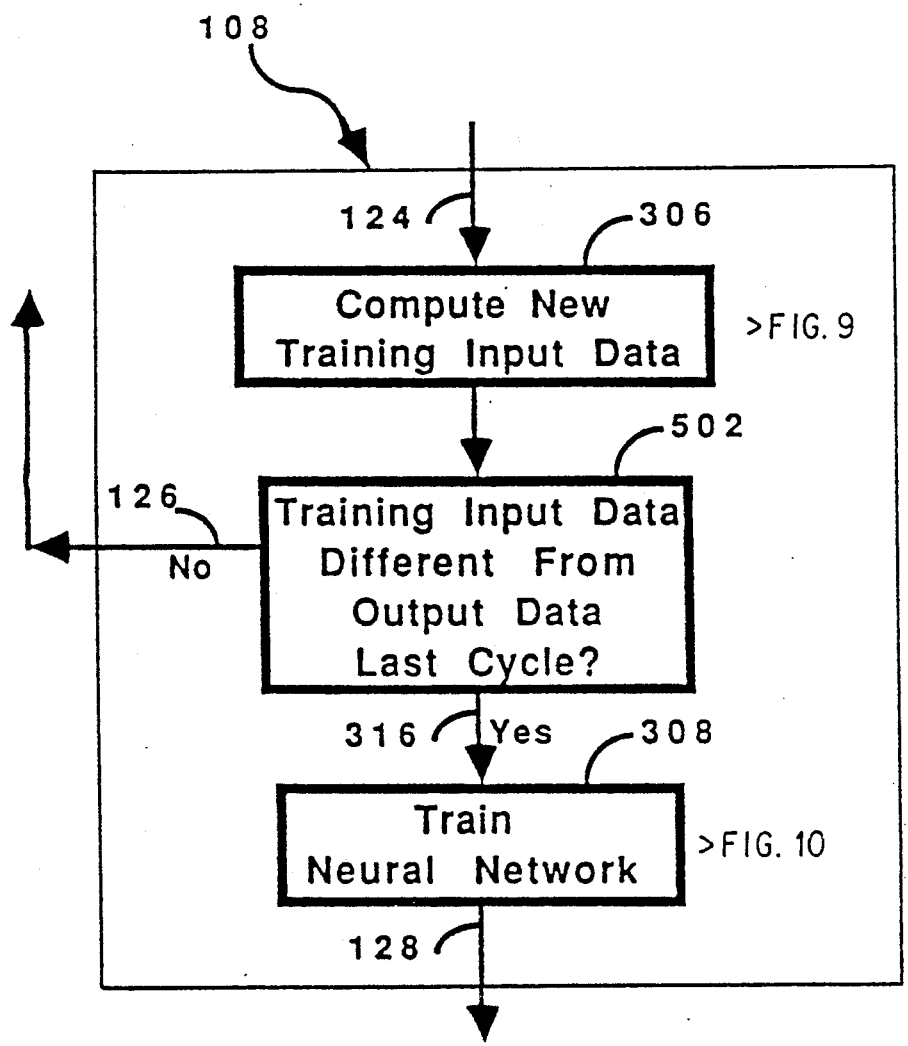
FIG. 5 is an intermediate block diagram of the important steps and modules which make up the "retrain neural network" step and module 108 of FIG. 1.

Retraining of the neural network 1206 occurs when new training input data becomes available. FIG. 5 shows a representative embodiment of the retrain neural network step or module 108.

Referring now to FIG. 5, an order pointer 124 shows that the first step and module in retraining the neural network 1206 is a compute new training input data step and module 306. FIG. 9 shows a representative embodiment of the compute new training input data step and module 306. Since this was described above in connection with FIG. 3, it is not described again here.

As indicated by the order pointer, the present invention then moves to a training input data different from output data? step and module 502. In this step and module, the new training input data computed in step and module 306 is compared to the output data which was produced in the last cycle of step and module 106. If a human operator has not made an adjustment to the setpoint, the new training input data will simply reflect the change that was made in response to the last cycle output data produced in step and module 106. In this case the new training input data will not be different from the last cycle output data and the method of the present invention returns following the order pointer 126 to step and module 106.

If the training input data is different from the output data then a human operator has made an adjustment to the setpoint. In this case, the proper or correct adjustment that should be predicted by the neural network is the actual new training input data value computed in step and module 306. That is, the new training input data is the sum of the change made in accordance with the output data produced in step and module 106 plus the change made by the human operator. Since the new training data is computed by comparing the current setpoint value to the setpoint value the last time that the training input data was examined in step and module 306 of step and module 108, this training input data actually reflects the proper amount of setpoint adjustment needed.

Once the neural network 1206 has been retrained, an order pointer 128 causes the present invention to move to an enable/disable control step or module 110 discussed below.

E. Enable/Disable Control Module or Step 110

Referring again to FIG. 1, once the neural network 1206 has been retrained, as indicated by the step or module 108, the present invention moves to an enable/disable control step or module 110. The purpose of the enable/disable control step or module 110 is to prevent the control of the process using output data (predicted values) produced by the neural network 1206 when the error is not acceptable ("poor").

Figure 6:
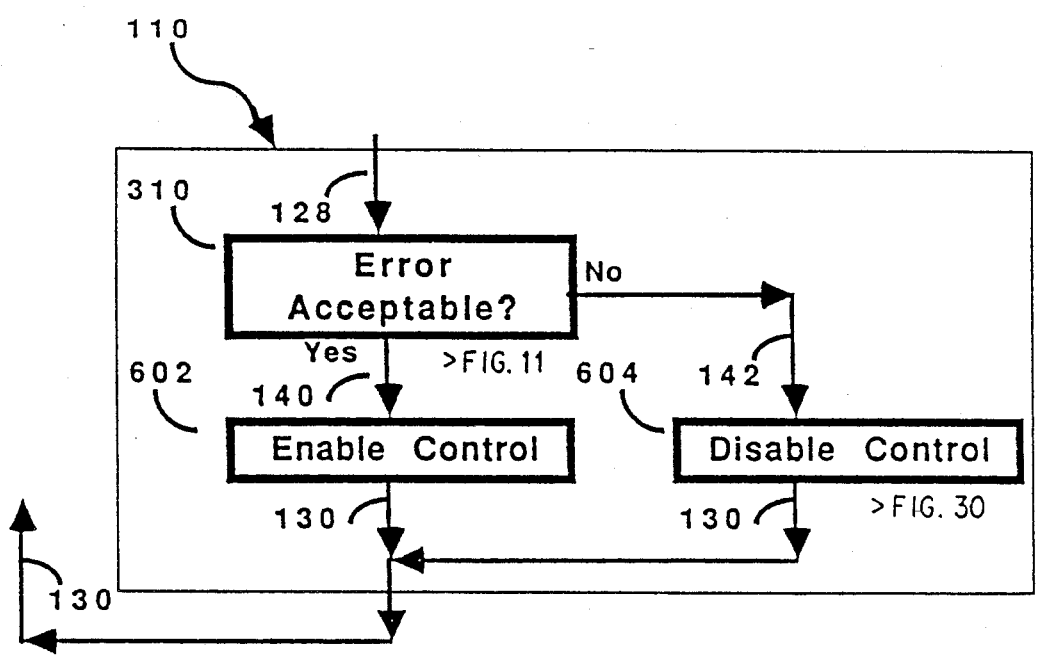
FIG. 6 is an intermediate block diagram of the important steps and modules which make up the enable/disable control step and module 110 of FIG. 1.

A representative example of the enable/disable control step or module 110 is shown in FIG. 6. Referring now to FIG. 6, the function of module 110 is to enable control of the controlled process if the error is acceptable, and to disable control if the error is unacceptable. As shown in FIG. 6, an order pointer 128 moves the present invention to an error acceptable? step or module 310. If the error between the training input data and the predicted output data is unacceptable, control of the controlled process is disabled by a disable control step and module 604. The disable control step and module 604 sets a flag (indicator) which can be examined by the control process using output data step and module 112 indicating that the output data should not be used for control.

Figure 30:
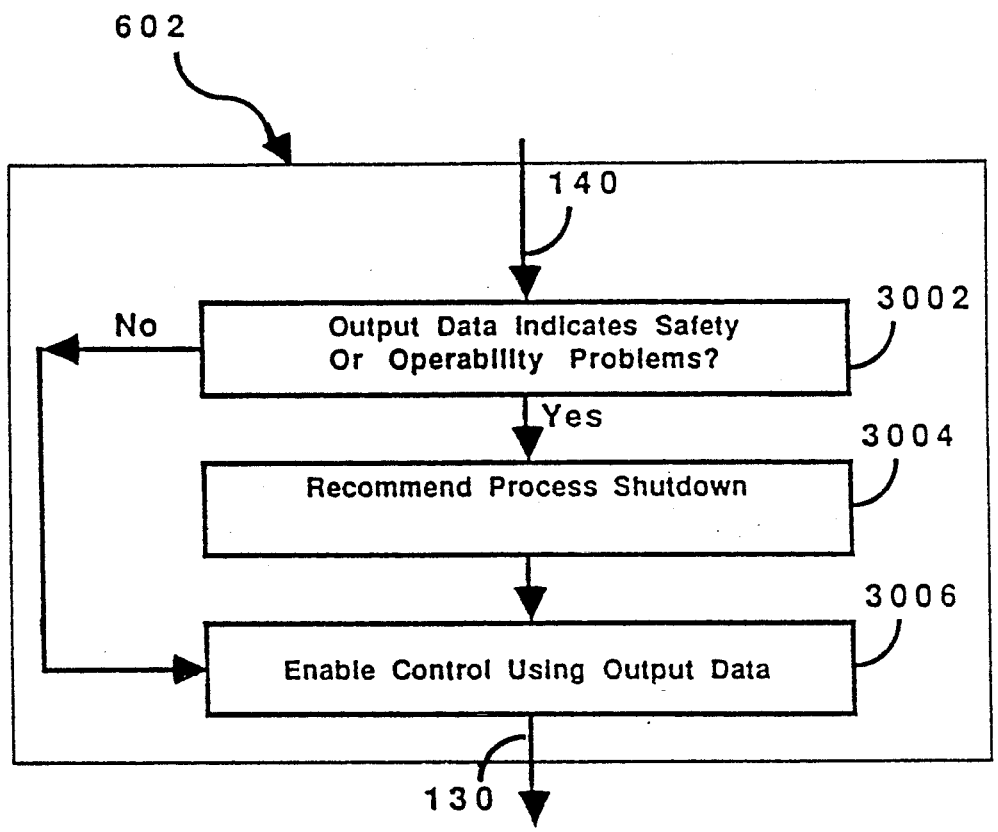
FIG. 30 is a detailed block diagram of an embodiment of the enable control step and module 602 of FIG. 6.

FIG. 30 shows a representative embodiment of the enable control step and module 602. Referring now to FIG. 30, an order pointer 142 causes the present invention first to move to an output data indicates safety or operability problems? step or module 3002. If the output data does not indicate a safety or operability problem, this indicates that the process 1212 can continue to operate safely. This is indicated by the fact that the present invention moves to the enable control using output data step or module 3006.

In contrast, if the output data does indicate a safety or operability problem, the present invention recommends that the process being controlled be shut down, as indicated by a recommend process shutdown step and module 3004. This recommendation to the operator of the process 1212 can be made using any suitable approach. An example is a screen display or an alarm indicator. This safety feature allows the present invention to prevent the controlled process 1212 from reaching a critical situation.

If the output data does not indicate safety or operability problems in step and module 3002, or after the recommendation to shut down the process has been made in step and module 3004, the present invention moves to the enable control using output data step and module 3006. This step and module 3006 sets a flag (indicator) which can be examined by step and module 112, indicating that the output data should be used to control the process.

Thus, it can be appreciated that the enable/disable control step or module 110 provides the function to the present invention of (1) allowing control of the process 1212 using the output data in step or module 112, (2) preventing the use of the output data in controlling the process 1212, but allowing the process 1212 to continue to operate, or (3) shutting down the process 1212 for safety reasons.

F. Change Controller Setpoint Using Output Data Step or Module 112

Referring again to FIG. 1, the order pointer 122 indicates that the control of the process using the output data from the neural network 1206 runs in parallel with the prediction of output data using the neural network 1206, the retraining of the neural network 1206, and the enable/disable control of the process 1212.

Figure 7:
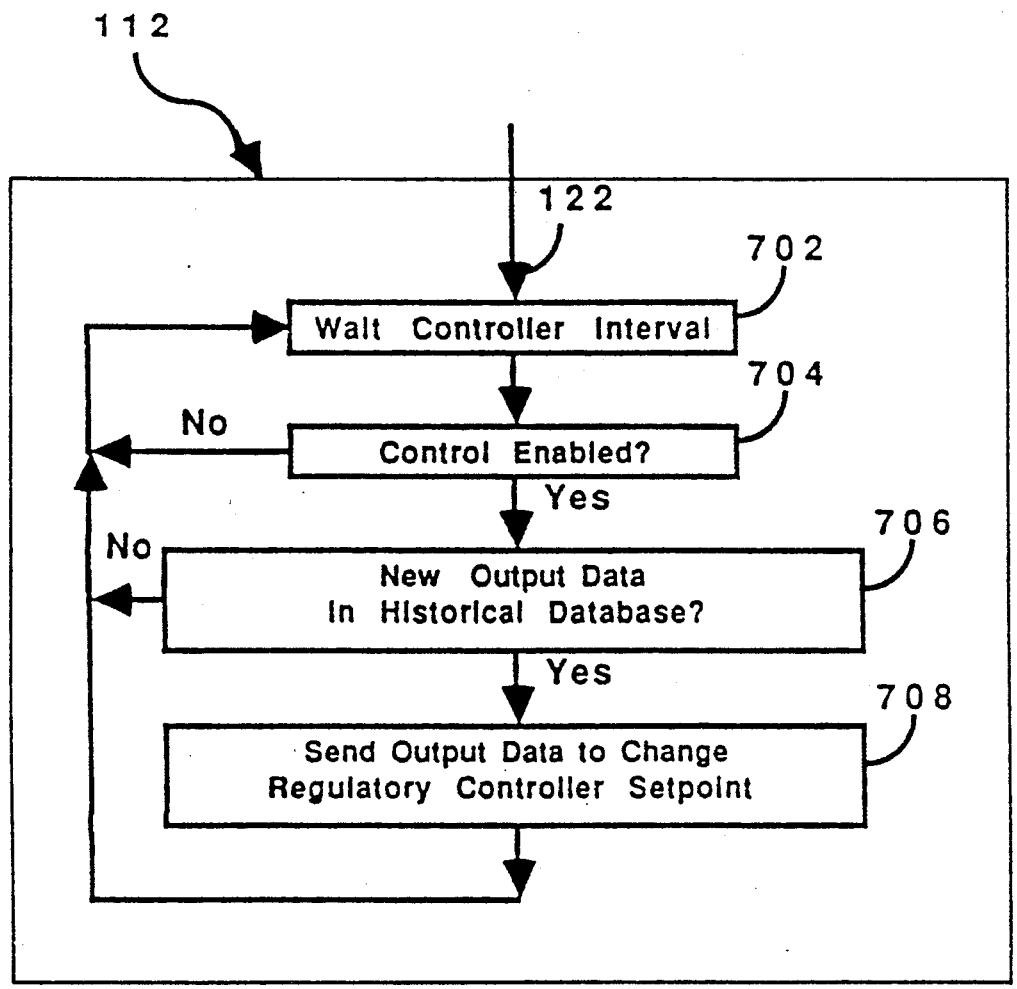
FIG. 7 is an intermediate block diagram of the important steps and modules which make up the change controller setpoint using output data step and module 112 of FIG. 1.

FIG. 7 shows a representative embodiment of the change controller setpoint using output data step and module 112. Referring now to FIG. 7, the order pointer 122 indicates that the present invention first moves to a wait controller interval step or module 702. The interval at which the controller operates can be any preselected value. This interval can be a time value, an event, or the occurrence of a data value. Other interval control methods or procedures can be used.

Once the controller interval has occurred, as indicated by the order pointer, the present invention moves to a control enabled? step or module 704. If control has been disabled by the enable/disable control step or module 110, the present invention does not control the process 1212 using the output data. This is indicated by the order pointer marked "NO" from the control enabled ? step or module 704.

If control is enabled the method of the present invention moves to a new output data in historical database? step and module 706. In this step the historical database is examined to determine if new output data has been created by the neural network indicating a setpoint adjustment should be made. If no new output data is found, the method moves back to the wait controller interval step and module 702 as indicated by the arrow labelled "no."

If new output data is found in the historical database, then the present invention moves to a send output data to change regulatory controller setpoint step and module 708 according to the order pointer labeled yes in FIG. 7. In this step and module, the output data, which is the amount of adjustment to be made to the setpoint, is transmitted or sent to the regulatory controller setpoint. When this step and module is complete, the present invention returns to the wait controller interval step and module 702.

The control of the process using the output data from the neural network 1206 can also be accomplished in other ways. One alternate way is to generate setpoint adjustments to be made to a supervisory controller setpoint. The present invention contemplates any combination of controllers and setpoints in implementing the present invention.

Also, the present invention may be combined with expert system control functions. Expert systems can be effectively used to provide decision making capability in process control. This decision making capability can be used to complement the predictive capabilities of neural networks.

Thus, it can be appreciated that the present invention effectively controls the process using the output data from the neural network 1206. It should be understood that the control of the process 1212 can be any presently known or future developed approach, including the architecture shown in FIGS. 15 and 16.

Alternatively, when the output data from the neural network 1206 is determined to be unacceptable, the process 1212 can continue to be controlled 1202 by the controller without the use of the output data.

V. Preferred Structure (Architecture)

Discussed above in Section III has been the preferred method of operation of the present invention. Discussed in this Section are the preferred structures (architecture) of the present invention. However, it should be understood that in the description set forth above, the modular structure (architecture) of the present invention was also discussed in connection with the operation. Thus, certain portions of the structure of the present invention have inherently been described in connection with the description set forth above in Section III.

The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function, which can be added to an existing computer system to provide new function to that computer system.

Software systems generally are constructed in a layered fashion. In a layered system, a lowest level software system is usually the computer operating system which enables the hardware to execute software instructions. Additional layers of software systems may provide, for example, historical database capability. This historical database system provides a foundation layer on which additional software systems can be built. For example, a neural network software system can be layered on top of the historical database. Also, a supervisory control software system can be layered on top of the historical database system.

A software system is thus understood to be a software implementation of a function which can be assembled in a layered fashion to produce a computer system providing new functionality. Also, in general, the interface provided by one software system to another software system is well-defined. It should be understood in the context of the present invention that delineations between software systems are representative of the preferred implementation. However, the present invention may be implemented using any combination or separation of software systems.

FIG. 12 shows a preferred embodiment of the structure of the present invention. Referring now to FIG. 12, the process 1212 being controlled receives the raw materials 1222 and produces the product 1216. Sensors 1226 (of any suitable type) provide sensor signals 1221, 1224, which are supplied to the historical database 1210 for storage with associated timestamps. It should be noted that any suitable type of sensor 1226 can be employed which provides sensor signals 1221, 1224.

The historical database 1210 stores the sensor signals 1224 that are supplied to it with associated timestamps as provided by a clock 1230. In addition, as described below, the historical database 1210 also stores output data 1218 from the neural network 1206. This output data 1218 also has associated timestamps provided by the neural network 1206.

Any suitable type of historical database 1210 can be employed. A historical database is generally discussed in Hale and Sellars, "Historical Data Recording for Process Computers," 77 *Chem. Eng'g Progress* 38 A.I.Ch.E., New York, (1981) (which is hereby incorporated by reference).

The historical database 1210 that is used must be capable of storing the sensor input data 1224 with associated timestamps, and the predicted output data 1218 from the neural network 1206 with associated timestamps. Typically, the historical database 1210 will store the sensor data 1224 in a compressed fashion to reduce storage space requirements, and will store sampled (lab) data 1304 in uncompressed form.

Often, the historical database 1210 will be present in a chemical plant in the existing process control system. The present invention can utilize this historical database to achieve the improved process control obtained by the present invention.

The historical database 1210 can be implemented as a stand-alone software system which forms a foundation layer on which other software systems, such as the neural network 1206, can be layered. Such a foundation layer historical database system can support many functions in a process control environment. For example, the historical database can serve as a foundation for software which provides graphical displays of historical process data for use by a plant operator. An historical database can also provide data to data analysis and display software which can be used by engineers for analyzing the operation of the process 1212. Such a foundation layer historical database system will often contain a large number of sensor data inputs, possibly a large number of laboratory data inputs, and may also contain a fairly long time history for these inputs.

It should be understood, however, that the present invention requires a very limited subset of the functions of the historical database 1210. Specifically, the present invention requires the ability to store at least one training input data value with the timestamp which indicates an associated input data value, and the ability to store such an associated input data value. In certain circumstances where, for example, a historical database foundation layer system does not exist, it may be desirable to implement the essential historical database functions as part of the neural network software. By integrating the essential historical database capabilities into the neural network software, the present invention can be implemented in a single software system. It should be understood that the various divisions among software systems used to describe the present invention are only illustrative in describing the best mode as currently practiced. Any division or combination among various software systems of the steps and elements of the present invention may be used.

The historical database 1210, as used in the present invention, can be implemented using a number of methods. For example, the historical database can be built as a random access memory (RAM) database. The historical database 1210 can also be implemented as a disk-based database, or as a combination of RAM and disk databases. If an analog neural network 1206 is used in the present invention, the historical database 1210 could be implemented using a physical storage device. The present invention contemplates any computer or analog means of performing the functions of the historical database 1210.

The neural network 1206 retrieves input data 1220 with associated timestamps. The neural network 1206 uses this retrieved input data 1220 to predict output data 1218. The output data 1218 with associated timestamps is supplied to the historical database 1210 for storage.

A representative embodiment of the neural network 1206 is described above in Section I. It should be understood that neural networks, as used in the present invention, can be implemented in any way. For example, the preferred embodiment uses a software implementation of a neural network 1206. It should be understood, however, that any form of implementing a neural network 1206 can be used in the present invention, including physical analog forms. Specifically, as described below, the neural network may be implemented as a software module in a modular neural network control system.

It should also be understood with regard to the present invention that software and computer embodiments are only one possible way of implementing the various elements in the systems and methods. As mentioned above, the neural network 1206 may be implemented in analog or digital form and also, for example, the controller 1202 may also be implemented in analog or digital form. It should be understood, with respect to the method steps as described above for the functioning of the systems as described in this section, that operations such as computing (which imply the operation of a digital computer) may also be carried out in analog equivalents or by other methods.

Returning again to FIG. 12, the output data 1218 with associated timestamps stored in the historical database 1210 is supplied to the controller 1202. This output data 1218 changes the setpoint 1404 of the controller 1202, which generates controller output data 1208 sent to an actuator(s) 1228 used to control a controllable process state 2002 of the process 1212. Representative examples of controller 1202 are discussed below. Setpoint changes made by a human operator 1219 may also be provided to the setpoint.

The shaded box shown in FIG. 12 indicates that the neural network 1206 and the historical database 1210 may, in a variant of the present invention, be implemented as a single software system. This single software system could be delivered to a computer installation in which no historical database previously existed, to provide the functions of the present invention. Alternately, a neural network configuration function (or program) 1204 could also be included in this software system.

Two additional aspects of the architecture and structure shown in FIG. 12 are as follows. First, it should be noted that the controller 1202 may also be provided with input data 1221 from sensors 1226. This input data is provided directly to controller 1202 from these sensor(s).

Second, the neural network configuration module 1204 is connected in a bi-directional path configuration with the neural network 1206. The neural network configuration module 1204 is used by the user (developer) to configure and control the neural network 1206 in a fashion as discussed above in connection with the step and module 104 (FIG. 1), or in connection with the user interface discussion contained below.

Figure 13:
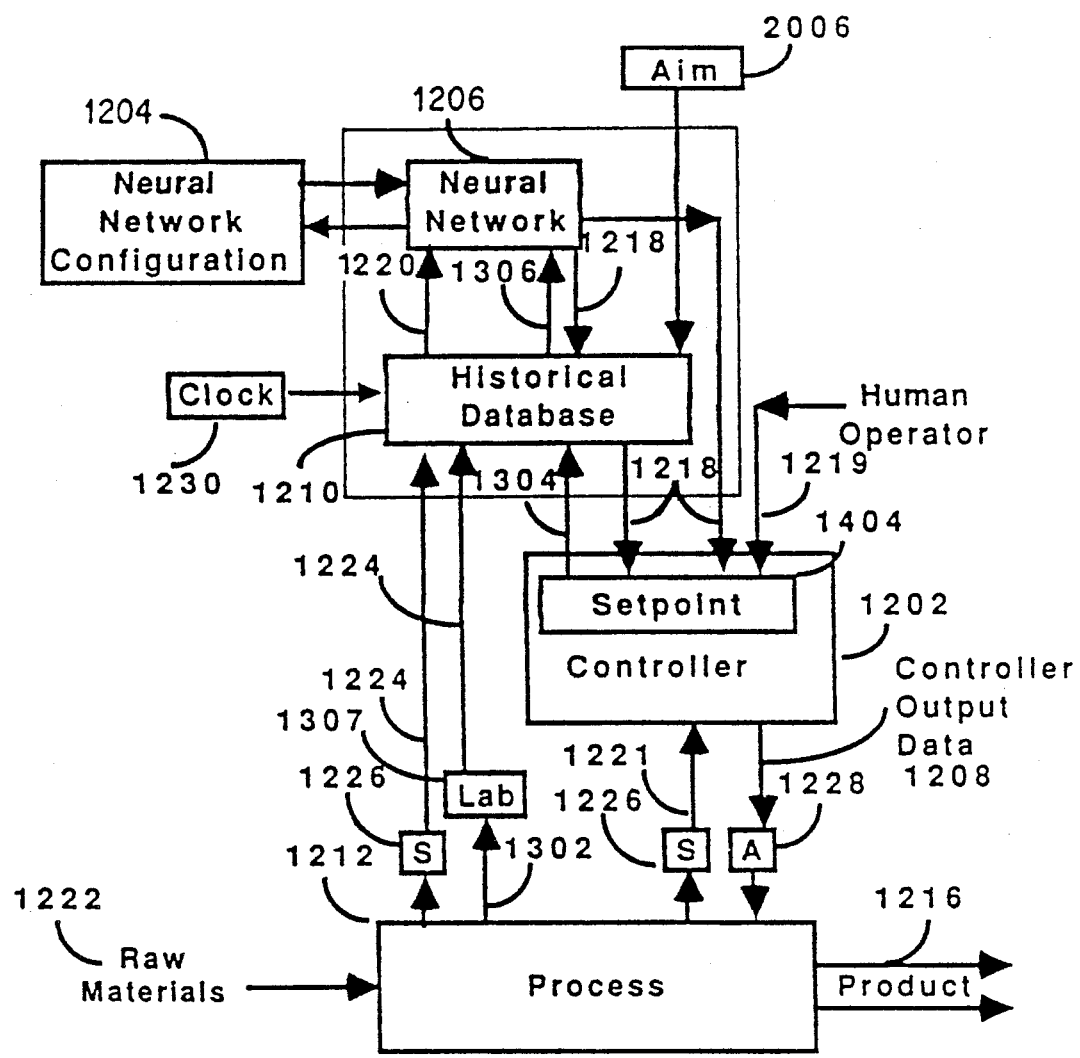
FIG. 13 is a representation of the architecture of an embodiment of the present invention having the additional capability of using laboratory values from the historical database 1210 and setpoint values from the controller 1202.

Turning now to FIG. 13, an alternate preferred embodiment of the structure and architecture of the present invention is shown. Only differences between the embodiment of FIG. 12 and that of FIG. 13 are discussed here. These differences are as follows.

A laboratory ("lab") 1307 is supplied with samples 1302. These samples 1302 could be physical specimens or some type of data from an analytical test or reading. Regardless of the form, the lab takes this material/data and utilizes it to produce actual measurements 1224, which are supplied to the historical database 1210 with associated timestamps. The values 1224 are stored in the historical database 1210 with their associated timestamps.

Thus, the historical database 1210 also now contains actual test results or actual lab results in addition to sensor input data. It should be understood that a laboratory is illustrative of a source of actual measurements 1304. Other sources are encompassed by the present invention.

Another difference in this embodiment is that the neural network 1206 is supplied with the lab data 1306 and associated timestamps stored in the historical database 1210.

Laboratory measurements 1224 are supplied to the historical database and stored with associated timestamps. These values 1306 are retrieved from the historical database by the neural network. The neural network can use these values as raw training input data or as input data.

Another addition to the architecture of FIG. 12 is error data 1504 (FIG. 15) supplied by the neural network 1206 with associated timestamps to the historical database 1210 for storage.

Thus, it can be appreciated that the embodiment of FIG. 13 allows the present invention to utilize lab data 1304 as input data 1306 to the neural network, and setpoint values as raw training input data values.

Figure 14:
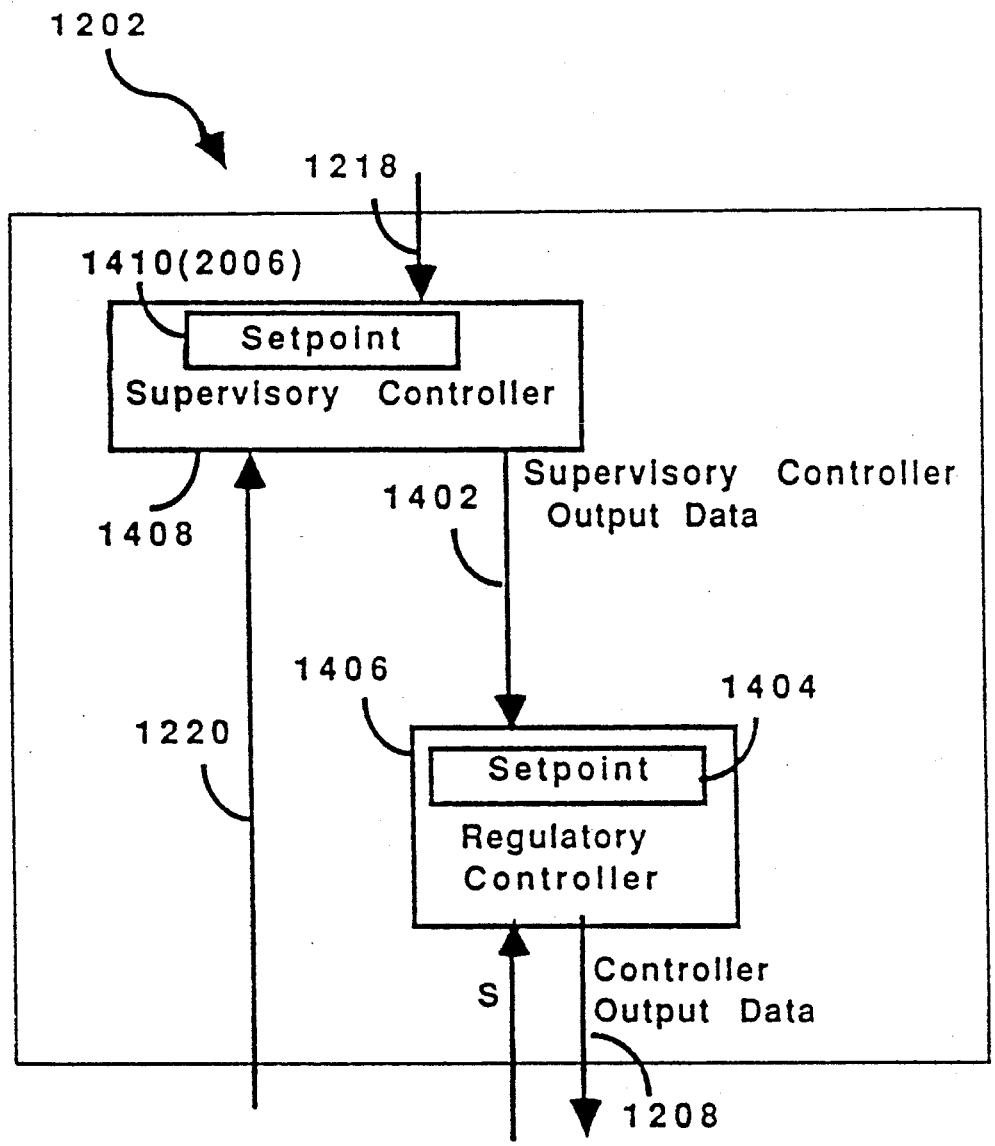
FIG. 14 is an embodiment of controller 1202 of FIGS. 12 and 13 having a supervisory controller 1408 and a regulatory controller 1406.

Turning now to FIG. 14, a representative embodiment of the controller 1202 is shown. The embodiment utilizes a regulatory controller 1406 for regulatory control of the process 1212. Any type of regulatory controller is contemplated which provides such regulatory control. There are many commercially available embodiments for such a regulatory controller. Typically, the present invention would be implemented using regulatory controllers already in place. In other words, the present invention can be integrated into existing process control systems.

In addition to the regulatory controller 1406, the embodiment shown in FIG. 14 also includes a supervisory controller 1408. The supervisory controller 1408 computes supervisory controller output data, computed in accordance with sensor data 1221 or lab data 1224.

The supervisory controller output data 1402 is supplied to the regulatory controller 1406 for changing the regulatory controller setpoint 1404 (or other parameter of regulatory controller 1406). In other words, the supervisory controller output data 1402 is used for changing the regulatory controller setpoint 1404 so as to change the regulatory control provided by the regulatory controller 1406. The output data 1218 of the neural network is used to change the setpoint 1410, 2006 of the supervisory controller.

Any suitable type of supervisory controller 1408 can be employed by the present invention, including commercially available embodiments. The only limitation is that the supervisory controller 1408 be able to use the output data 1218 to change the supervisory controller setpoint (parameter) 1410, 2006.

The present invention contemplates the supervisory controller 1408 being in a software and hardware system which is physically separate from the regulatory controller 1406. For example, in many chemical processes, the regulatory controller 1406 is implemented as a digital distributed control system (DCS). These digital distributed control systems provide a very high level of robustness and reliability for regulating the process 1212. The supervisory controller 1408, in contrast, may be implemented on a host-based computer, such as a VAX (VAX is a trademark of DIGITAL EQUIPMENT CORPORATION, Maynard, Mass.).

Figure 15:
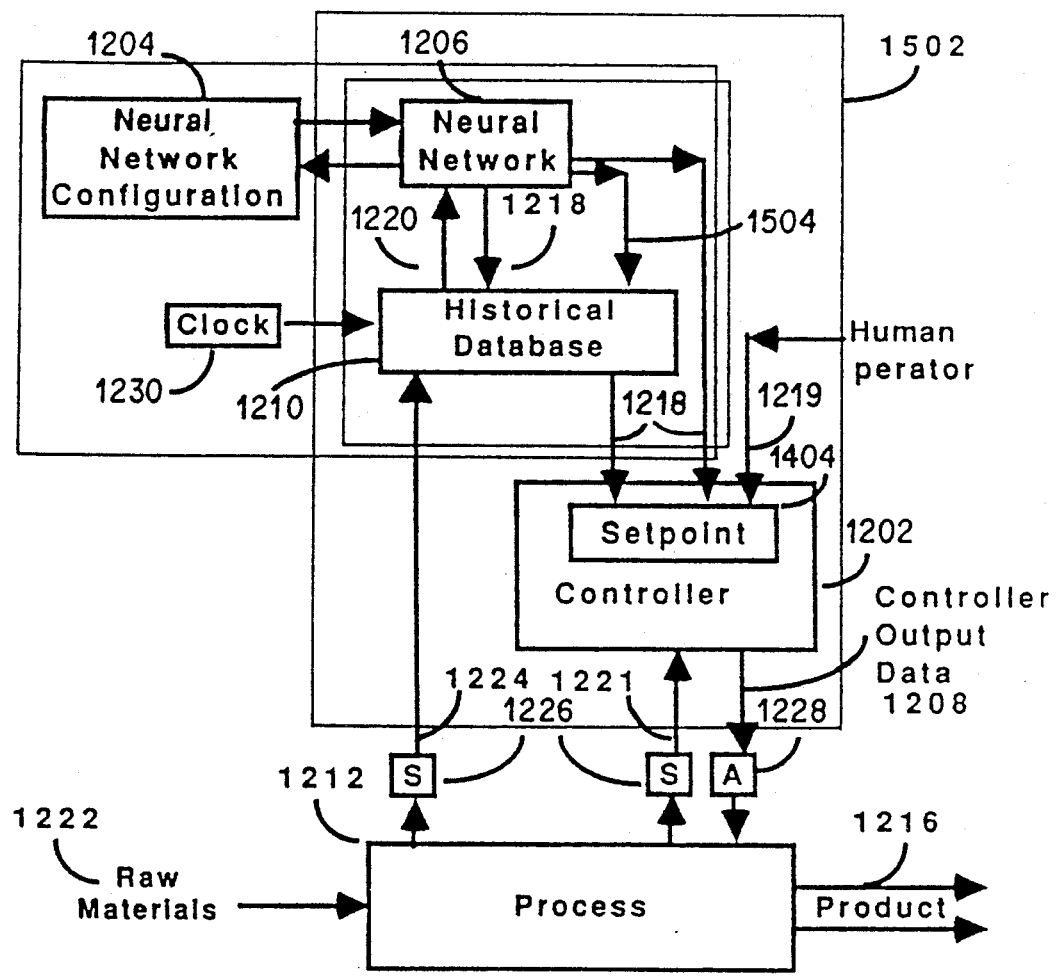
FIG. 15 shows various software system embodiments of the architecture of FIG. 12.

Referring now to FIG. 15, several alternate embodiments of the present invention are shown. The three shaded boxes shown in FIG. 15 suggest various ways in which the functions of the controller 1202, the neural network configuration program 1204, the neural network 1206 and the historical database 1210 can be implemented. For example, the box labeled 1502 shows how the controller 1202, the neural network 1206 and the historical database 1210 can be implemented together in a single software system. This software system may take the form of a modular system as described below in FIG. 16. Alternately, the neural network configuration program 1204 may be included as part of the software system. These various software system groupings are indicative of various ways in which the present invention can be implemented. However, it should be understood that any combination of functions into various software systems can be used to implement the present invention.

Figure 35:
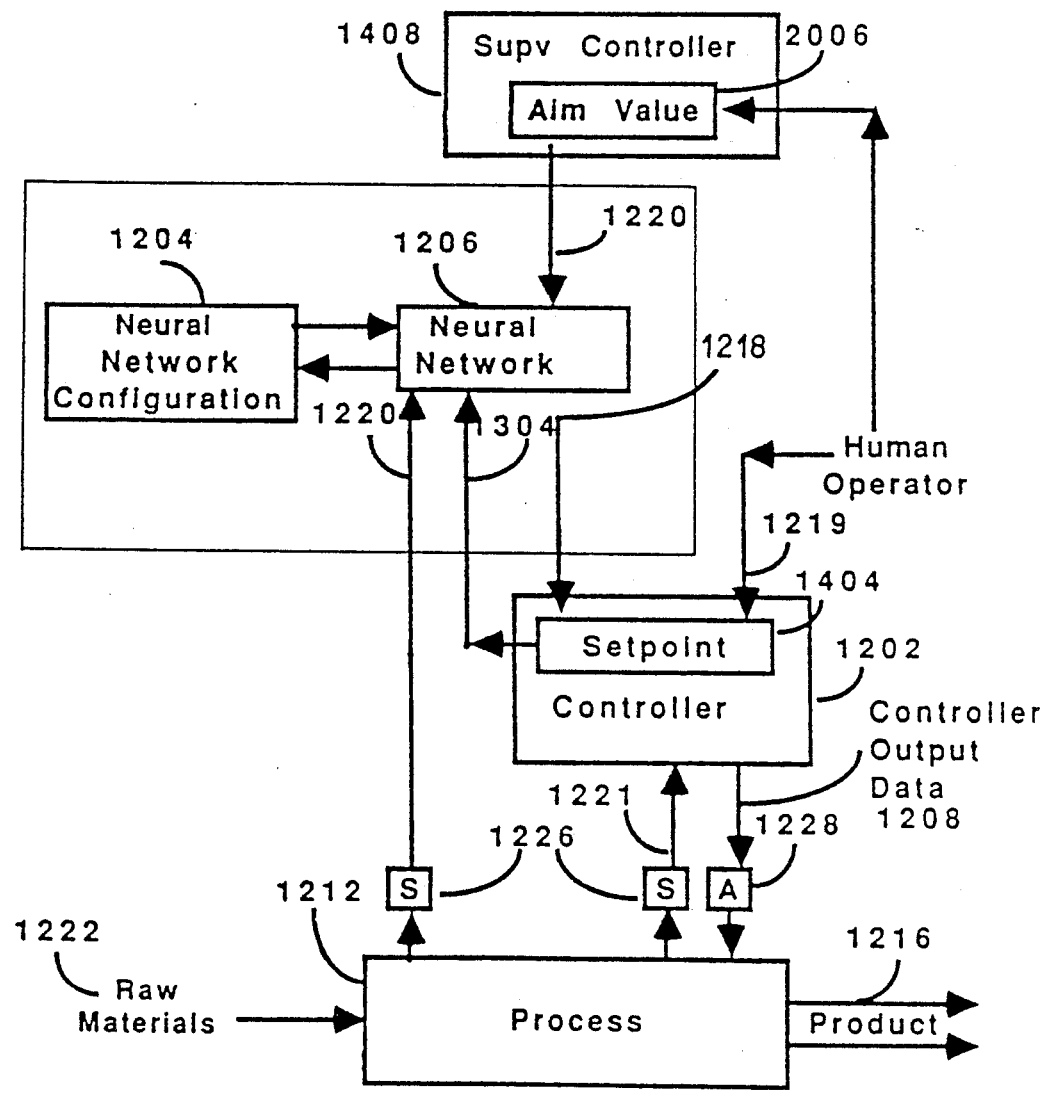
FIG. 35 is a representation of the architecture of an embodiment of the present invention adapted to learn and predict initial setpoints to make a product having product property aim values.

Referring now to FIG. 35, an alternate representative architecture for the present invention is shown. This configuration is useful when it is desirable to use neural networks to predict the initial setpoint settings which are needed to produce product properties of a given aim value 2006. This architecture can use the setpoint settings 1219 input by a human operator in response to new product property aim values 2006 to learn the proper setpoint settings for a new and previously unused set of product property aim values 2006.

Referring now to FIG. 35, the differences between the architecture of FIG. 12 will be explained. First of all this embodiment depends on the presence of a source (supervisory controller 1408) which contains an aim value(s) 2006 for product properties 1904. The aim value(s) 1220 from the supervisory controller is provided 1220 to the neural network 1206 as input data. The regulatory controller setpoint 1404 is adjusted 1219 by a human operator or a computer system to the proper or best known setting or value for a given aim value 2006. These human operator settings provide the training input data 1304 used to train the neural network. The trained neural network uses aim values 2006 as input data 1220 to generate predicted output data 1218 which is the setpoint value or setting needed to produce the aim value 2006.

It should be understood that the neural network 1206 may optionally use other sensor data 1220 or setpoint values 1404 from setpoints other than the setpoint being predicted by the outputs 1218. This sensor data and other setpoint data may serve to define the operating rate and/or conditions of the process which may effect the resulting output data 1218 producing the desired unknown setpoint value. It should also be understood that the neural network 1206 is not limited to sensor data 1224 and setpoint data 1304. For example laboratory data may optionally be used as input data to the neural network.

Figure 36:
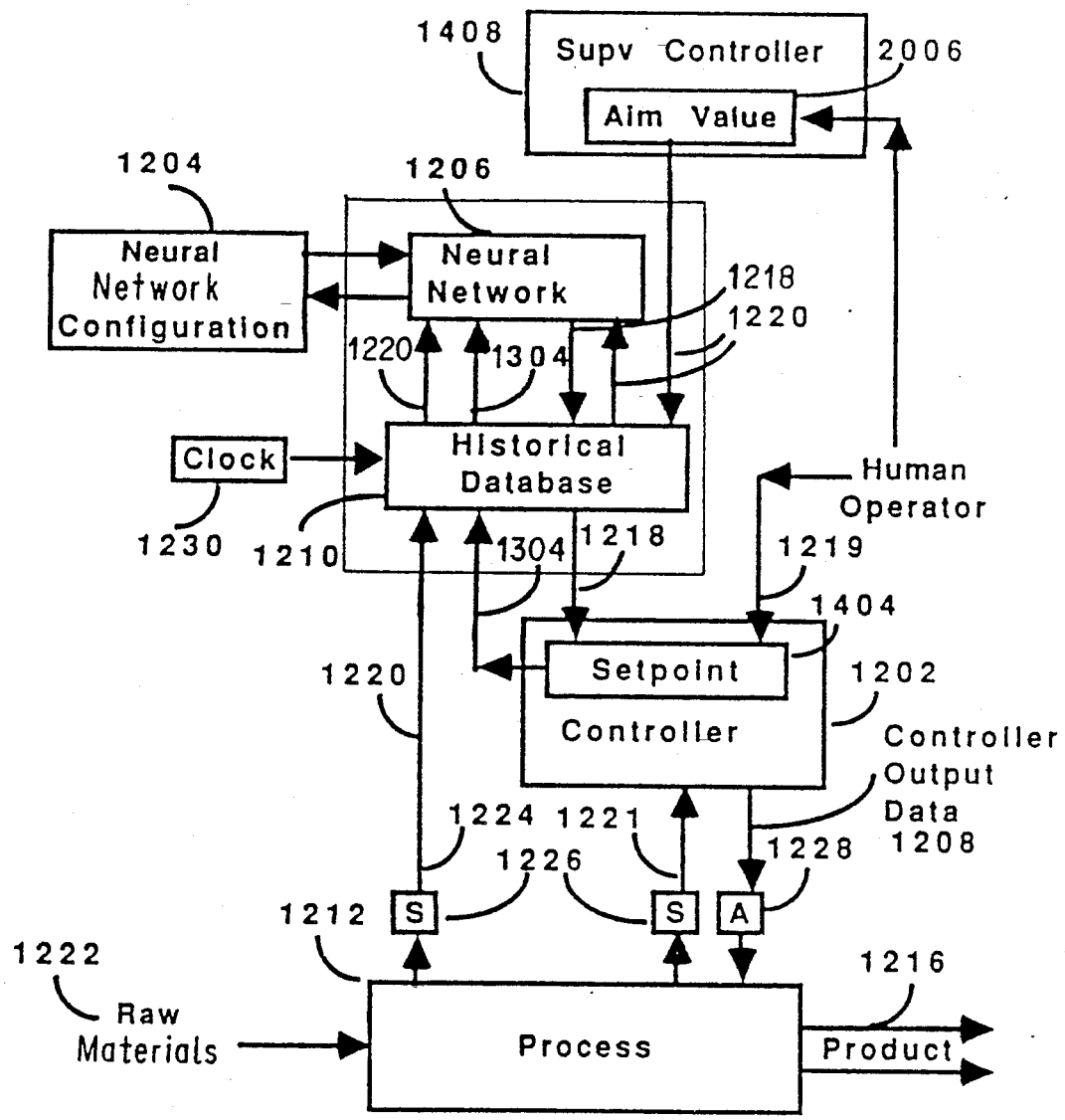
FIG. 36 is a representation of the architecture of an embodiment of the present invention adapted to learn and predict initial setpoints to make a product having product property aim values using an historical database.

Referring now to FIG. 36, an alternate embodiment of the invention as used for predicting setpoint values for new aim values is shown. This embodiment uses a historical data base 1210 to store the input, output and training input data used by the neural network, and also optionally to store the supervisory controller output data as to be provided to the controller setpoint 1404. Referring now to FIG. 36, it can be seen that the controller setpoint 1304, the neural network output 1218, the supervisory controller aim value 1220 and sensor data 1220 are all provided to the historical database where they are stored with associated timestamps. The setpoint value 1304 is retrieved from historical database by the neural network. The aim value 1220 is also retrieved from the historical database for use by the neural network. The output data of the neural network 1218 is retrieved (or passed or sent) from the historical database to the controller setpoint 1404.

The embodiment shown in FIGS. 35 and 36 is representative of the structures which can be used to implement the present invention for predicting setpoint values for new aim values. It should be understood that various connections between the supervisory controller and the regulatory controller 1406 may also be used in the present invention. Also it should be understood that the aim value 2006, although shown coming from a supervisory controller 1408, could be provided from any source including the historical database. The aim values could be entered either by a human operator or could be passed from another computer system.

Referring now to FIG. 16, a representative embodiment 1502 of the neural network 1206 combined with the supervisory controller 1408 is shown. This embodiment is called a modular supervisory controller approach. The modular architecture that is shown illustrates that the present invention contemplates the use of various types of modules which can be implemented by the user (developer) in configuring neural network(s) 1206 in combination with supervisory control functions so as to achieve superior process control operation.

Several modules that can be implemented by the user of the present invention are shown in the embodiment of FIG. 16. Specifically, in addition to the neural network module 1206, the modular embodiment of FIG. 16 also includes a feedback control module 1602, a feedforward control module 1604, an expert system module 1606, a cusum (cumulative summation) module 1608, a Shewhart module 1610, a user program module 1612, and a batch event module 1614. Each of these can be selected by the user. The user can implement more than one of each of these in configuring the present invention. Moreover, additional types of modules can be utilized.

The intent of the embodiment shown in FIG. 16 is to illustrate three concepts. First, the present invention can utilize a modular approach which will ease user configuration of application of the present invention. Second, the modular approach allows for much more complicated systems to be configured since the modules act as basic building blocks which can be manipulated and used independently of each other.

Third, the modular approach shows that the present invention can be integrated into other process control systems. In other words, the present invention can be implemented into the system and method of the United States patents and patent applications which are incorporated herein by reference as noted above.

The modular approach to building neutral networks gives two principal benefits. First, the specification needed from the user is greatly simplified so that only data is required to specify the configuration and function of the neutral network. Secondly, the modular approach allows for much easier integration of neutral network function with other related control functions, such as feedback control, feedforward control, etc.

In contrast to a programming approach to building a neutral network, a modular approach provides some definition beforehand of the function to be provided by the neutral network module. The predefined function for the module determines the procedures that need to be followed to carry out the module function, and it determines any procedures that need to be followed to verify the proper configuration of the module. The particular function will define the data requirements to complete the specification of the neutral network module. The specifications for a modular neutral network would be comprised of configuration information which defines the size, connectivity and behavior of the neutral network in general, and the data interactions of the neutral network which define the source and location of data that will be used and created by the network.

Two approaches can be used to simplify the user configuration of neutral networks. First, a limited set of procedures can be prepared and implemented in the modular neutral network software. These predefined functions will by nature define the specifications needed to make these procedures work as a neutral network module. For example, the creation of a neutral network module which is fully connected, has one hidden or middle layer, and has no feedback would require the specification of the number of inputs, the number of middle error elements, and number of outputs. It would not require the specification for the connections between the inputs, the outputs and elements. Thus, the user input required to specify such a module is greatly simplified. This predefined procedure approach is the preferred method of implementing the modular neutral network.

A second approach could be used to provide modular neutral network function is to allow a limited set of natural language expressions to be used to define the neutral network. In such an implementation, the user or developer would be permitted to enter, through typing or other means, natural language definitions for the neutral network. For example, the user may enter the text which might read, for example, "I want a fully connected feedforward neutral network." These user inputs can be parsed searching for specification combinations of terms, or their equivalents, which would allow the specific configuration information to be extracted from the restricted natural language input.

By parsing the total user input provided in this method, the complete specification for a neutral network module could be obtained. Once this information is known, two approaches could be used to generate a runnable module.

The first approach would be to search for a predefined procedure matching the configuration information provided by the restricted natural language input. This would be useful where users tend to specify the same basic neutral network functions for many problems.

A second approach could provide for much more flexible creation of neutral network function. In this approach, the specifications obtained by parsing the natural language input could be used to generate a neutral network procedure by actually generating runnable or compilable code. In this approach, the neutral network functions would be defined in relatively small increments as opposed to the approach of providing a complete predefined neutral network function. This approach may combine, for example, a small function which is able to obtain input data and populate a set of inputs. By combining a number of such small functional pieces and generating code which reflects and incorporates the user specifications, a complete neutral network procedure could be generated.

This approach could optionally include the ability to query the user for specifications which have been neglected or omitted in the restricted natural language input. Thus, for example, if the user neglected to specify the number of outputs in the network, the user could be prompted for this information and the system could generate an additional line of user specification reflecting the answer to the query.

The other major advantage of a modular approach is the ease of integration with other functions in the application (problem) domain. For example, in the process control domain, it may be desirable or productive to combine the functions of a neutral network with other more standard control functions such as statistical tests, feedback control, etc. The implementation of neutral networks as modular neutral networks in a larger control system can greatly simplify this kind of implementation.

The incorporation of modular neutral networks into a modular control system is beneficial because it makes it easy to create and use neutral network predictions in a control application. However, the application of modular neutral networks in a control system is different from the control functions that are typically found in a control system. For example, the control functions described in some of the United States patents or patent applications incorporated by reference above all generally rely on the current information for their actions, and they do not generally define their function in terms of past data. In order to make a neutral network function effectively in a modular control system, some means is needed to train and operate the neutral network using the data which is not generally available by retrieving current data values. The systems and methods of the present invention, as described above, provide this essential capability which allow a modular neutral network function to be implemented in a modular control system.

A modular neutral network has several characteristics which significantly ease its integration with other control functions. First, the execution of neutral network functions, prediction and/or training are easily coordinated in time with other control functions. The timing and sequencing capabilities of a modular implementation of a neutral network provide this capability. Also, when implemented as a modular function, neutral networks can make their results readily accessible to other control functions that may need them. This can be done, for example, without needing to store the neutral network outputs in an external system such as a historical database.

Modular neutral networks can run either synchronized or unsynchronized with other functions in the control system. Any number of neutral networks can be created within the same control application, or in different control applications, within the control system. This may significantly facilitate the use of neutral networks to make predictions of output data where several small neutral networks may be more easily or rapidly trained than a single large neutral network. Modular neutral networks also provide a consistent specification and user interface so that a user trained to use the modular neutral network control system can address many control problems without learning new software.

An extension of the modular concept is the specification of data using pointers. Here again, the user (developer) is offered the easy specification of a number of data retrieval or data storage functions by simply selecting the function desired and specifying the data needed to implement the function. For example, the retrieval of a time-weighted average from the historical database is one such predefined function. By selecting a data type such as a time-weighted average, the user (developer) need only specify the specific measurement desired, and the starting and ending time boundaries and the predefined retrieval function will use the appropriate code or function to retrieve the data. This significantly simplifies the user's access to data which may reside in a number of different process data systems. By contrast, without the modular approach, the user would have to be skilled in the programming techniques needed to write the calls to retrieve the data from the state assistance.

Figure 17:
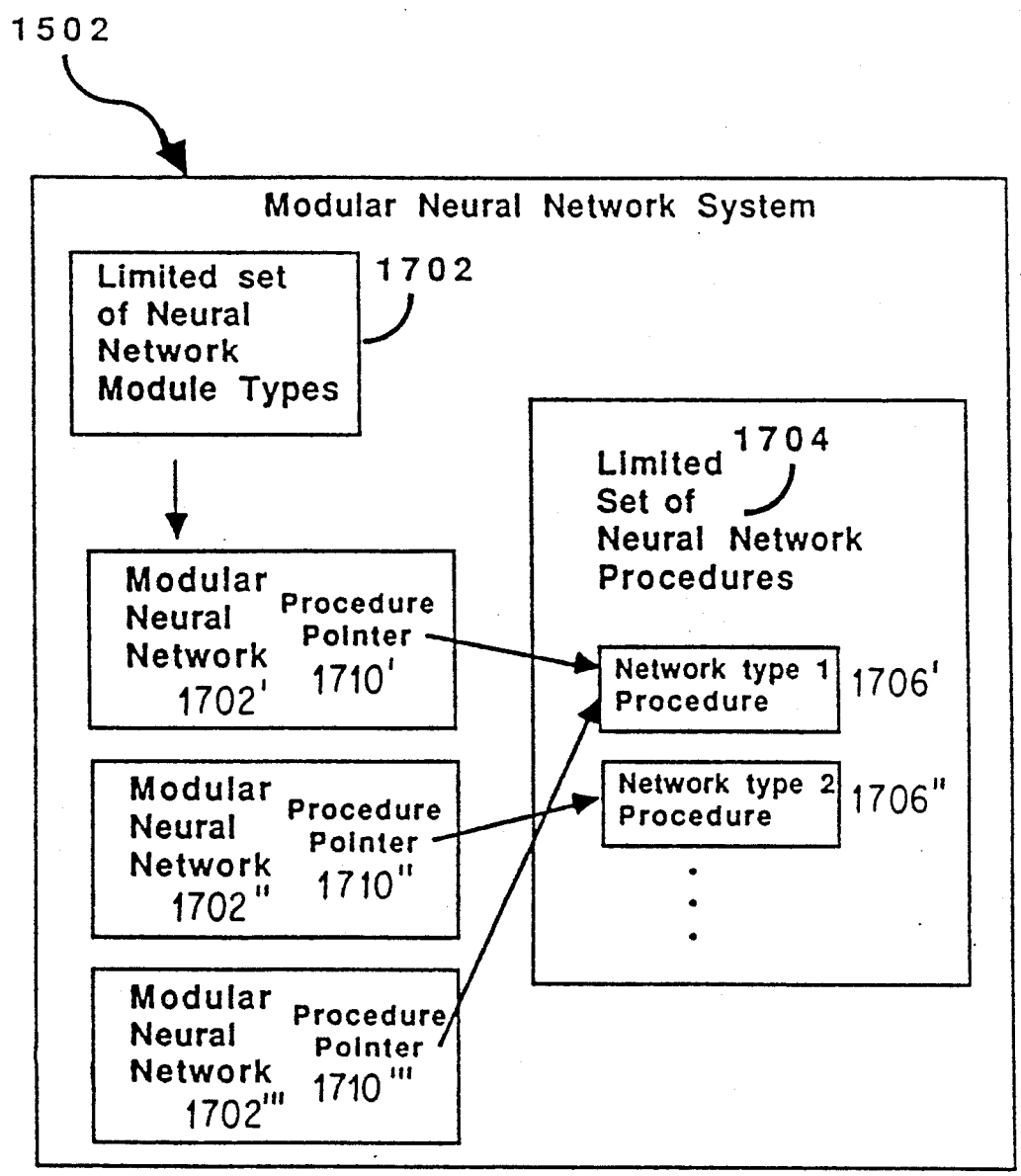
FIG. 17 shows an architecture for block 1502 having a plurality of modular neural networks 1702-1702$^n$ with pointers 1710-1710$^n$ pointing to a limited set of neural network procedures 1704-1704$^m$.

A further development of the modular approach of the present invention is shown in FIG. 17. FIG. 17 shows the neural network 1206 in a modular form.

Referring now to FIG. 17, a specific software embodiment of the modular form of the present invention is shown. In this modular embodiment, a limited set of neural network module types 1702 is provided. Each neural network module type 1702 allows the user to create and configure a neural network module implementing a specific type of neural network. Different types of neural networks may have different connectivity, different numbers of layers of elements, different training methods and so forth. For each neural network module type, the user may create and configure neural network modules. Three specific instances of neural network modules are shown as 1702', 1702'', and 1702'''.

In this modular software embodiment, neural network modules are implemented as data storage areas which contain a procedure pointer 1710', 1710'', 1710''' to procedures which carry out the functions of the neural network type used for that module. The neural network procedures 1706' and 1706'' are contained in a limited set of neural network procedures 1704. The procedures 1706', 1706'' correspond one to one with the neural network types contained in the limited set of neural network types 1702.

In this modular software embodiment, many neural network modules may be created which use the same neural network procedure. In this case, the multiple modules each contain a procedure pointer to the same neural network procedure 1706' or 1706''. In this way, many modular neural networks can be implemented without duplicating the procedure or code needed to execute or carry out the neural network functions.

Figure 18:
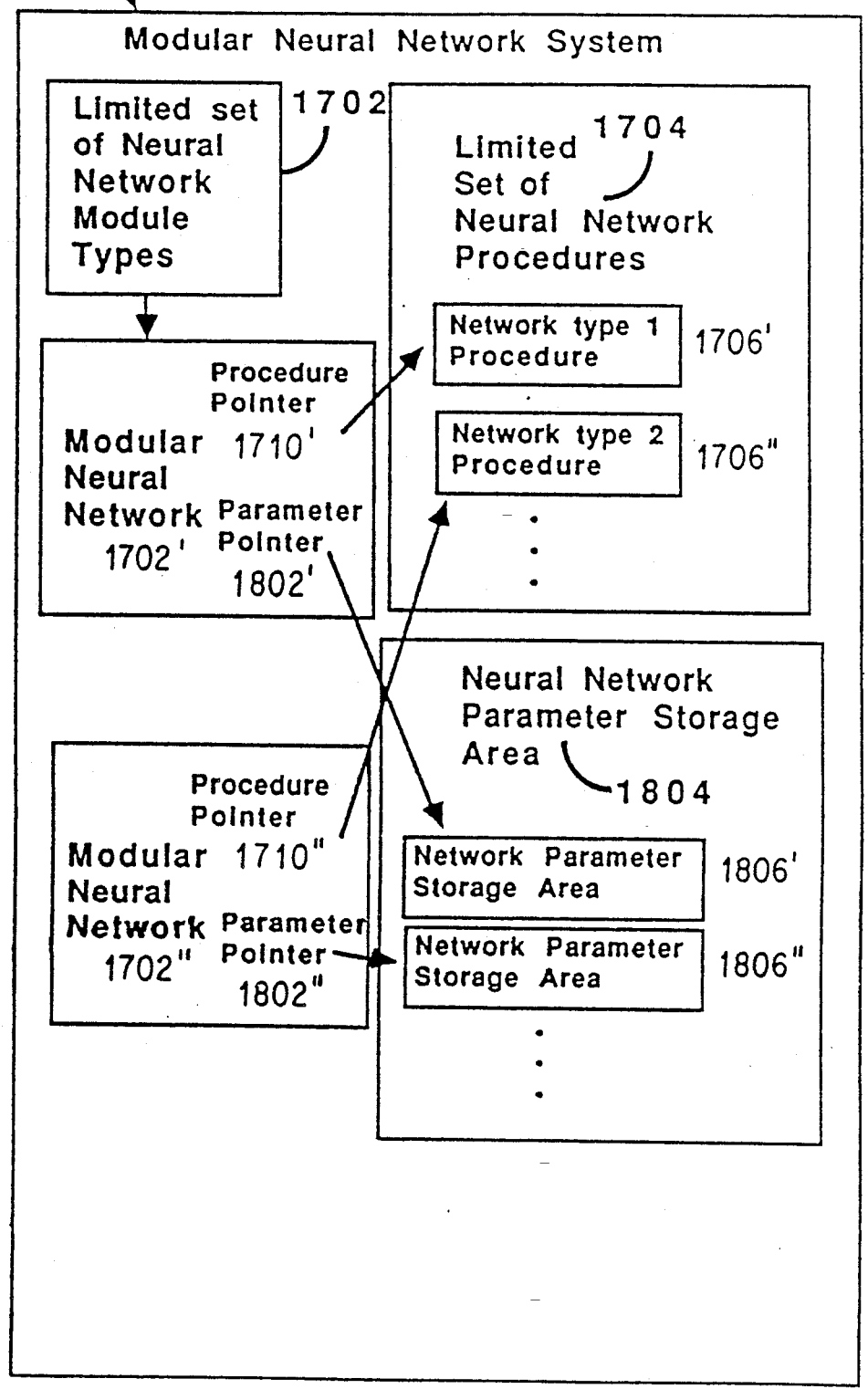
FIG. 18 shows an alternate architecture for block 1502 having a plurality of modular neural networks 1702-1702$^n$ with pointers 1710-1710$^m$ to a limited set of neural network procedures 1704-1704$^n$, and with parameter pointers 1802-1802" to a limited set of network parameter storage areas 1806-1806$^n$.

Referring now to FIG. 18, a more specific software embodiment of the modular neural network is shown. This embodiment is of particular value when the neural network modules are implemented in the same modular software system as modules performing other functions such as statistical tests or feedback control.

Because neural networks can use a large number of inputs and outputs with associated error values and training input data values, and also because neural networks can require a large number of weight values which need to be stored, neural network modules may have significantly greater storage requirements than other module types in the control system. In this case, it is advantageous to store neural network parameters in a separate neural network parameter storage area 1806. This structure means that modules implementing functions other than neural network functions need not reserve unused storage sufficient for neural networks.

In this modular software embodiment, each instance of a modular neural network 1702' and 1702'' contains two pointers. The first pointers 1710' and 1710'' are the procedure pointer described above in reference to FIG. 17. Each neural network module also contains a second pointer, parameter pointers 1802' and 1802'' which point to a storage area 1806', 1806'' for network parameters in a neural network parameter storage area 1804. Only neural network modules need contain the parameter pointers 1802', 1802'' to the neural network parameter storage area 1804. Other module types such as control modules which do not require such extensive storage need not have the storage allocated via the parameter pointer 1802.

FIG. 22 shows representative aspects of the architecture of the neural network 1206. The representation in FIG. 22 is particularly relevant in connection with the modular neural network approach shown in FIGS. 16, 17 and 18 discussed above.

Referring now to FIG. 22, the components to make and use a representative embodiment of the neural network 1206 are shown in an exploded format.

The neural network 1206 must contain a neural network model. As stated above, the present invention contemplates all presently available and future developed neural network models and architectures. As shown in FIG. 22, the neural network model 2202 can have a fully connected 2220 aspect, or a no feedback 2222 aspect. These are just examples. Other aspects or architectures for the neural network model 2202 are contemplated.

The neural network 1206 must have access to input data and training input data and access to locations in which it can store output data and error data. The preferred embodiment of the present invention uses an on-line approach. In this approach, the data is not kept in the neural network 1206. Instead, data pointers are kept in the neural network which point to data storage locations in a separate software system. These data pointers, also called data specifications, can take a number of forms and can be used to point to data used for a number of purposes.

For example, input data pointer 2204 and output data pointer 2206 must be specified. As shown in the exploded view, the pointer can point to or use a particular data source system 2224 for the data, a data type 2226, and a data item pointer 2228.

Neural network 1206 must also have a data retrieval function 2208 and a data storage function 2210. Examples of these functions are callable routines 2230, disk access 2232, and network access 2234. These are merely examples of the aspects of retrieval and storage functions.

Figure 24:
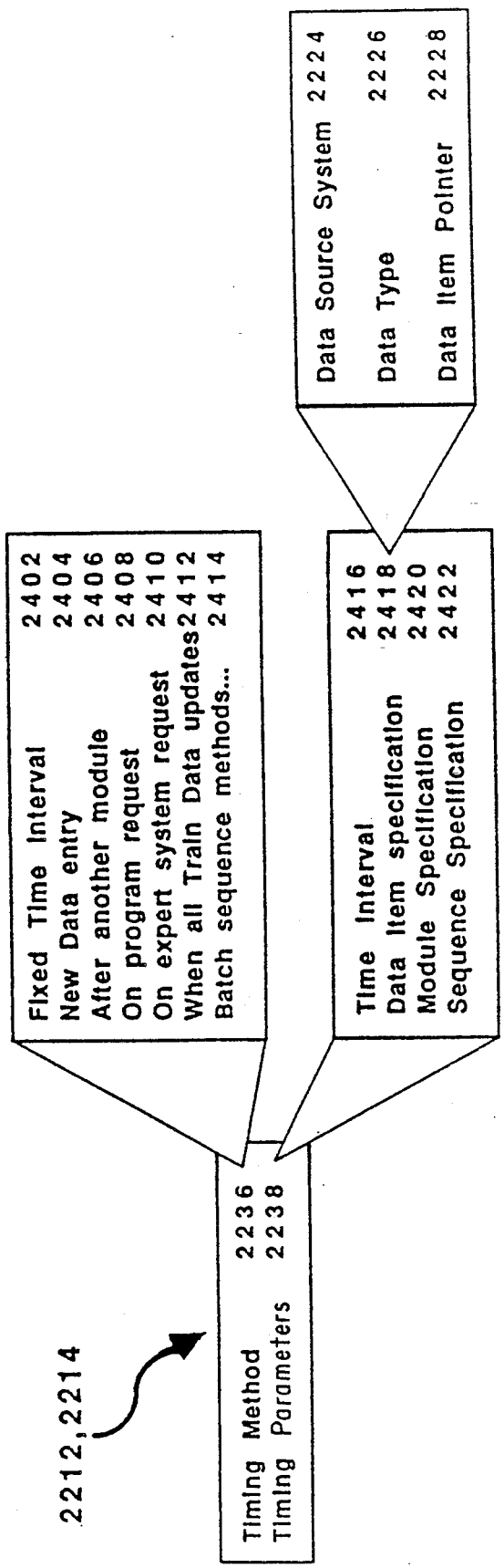
FIG. 24 is an exploded block diagram of the prediction timing control 2212 and the training timing control 2214 of the neural network 1206 of FIG. 22.

Neural network 1206 must also have prediction timing and training timing. These are specified by prediction timing control 2212 and training timing control 2214. One way to implement this is to use a timing method 2236 and its associated timing parameters 2238. Referring now to FIG. 24, examples of timing method 2236 include a fixed time interval 2402, new data entry 2404, after another module 2406, on program request 2408, on expert system request 2410, when all training data updates 2412, and batch sequence methods 2414. These are designed to allow the training and function of the neural network 1206 to be controlled by time, data, completion of modules, or other methods or procedures. The examples are merely illustrative in this regard.

FIG. 24 also shows examples of the timing parameters 2238. Such examples include the time interval 2416, the module specification 2420, and the sequence specification 2422. Another example is the data item specification (pointer) 2418. As is shown in FIG. 24, examples of the data items specification include specifying the data source system 2224, the data type 2226, and the data item pointer 2228 which have been described above.

Referring again to FIG. 22, training data coordination, as discussed previously, may also be required in many applications. Examples of approaches that can be used for such coordination are shown. One is to use all current values as representative by reference numeral 2240. Another is to use current training input data values and the input data at the earliest training input data time, as indicated by reference numeral 222. Another approach is to use the current training input data values with the input data from the latest train time, as indicated by reference numeral 2244. Again, these are merely examples, and should not be construed as limiting in terms of the type of coordination of training data that can be utilized by the present invention.

The neural network 1206 also needs to be trained, as discussed above. As stated previously, any presently available or future developed training method is contemplated by the present invention. The training method also may be somewhat dictated by the architecture of the neural network model that is used. Examples of aspects of training methods include back propagation 2246, generalized delta 2248, and gradient descent 2250, all of which are well known in the art. In this regard, reference is made to the article series entitled "Neural Networks Primer," by Maureen Caudill, *AI Expert*, December 1987 (Part I), February 1988 (Part II), June 1988 (Part III), August 1988 (Part IV), and November 1988 (Part V), all of which are incorporated by reference.

Figure 23:
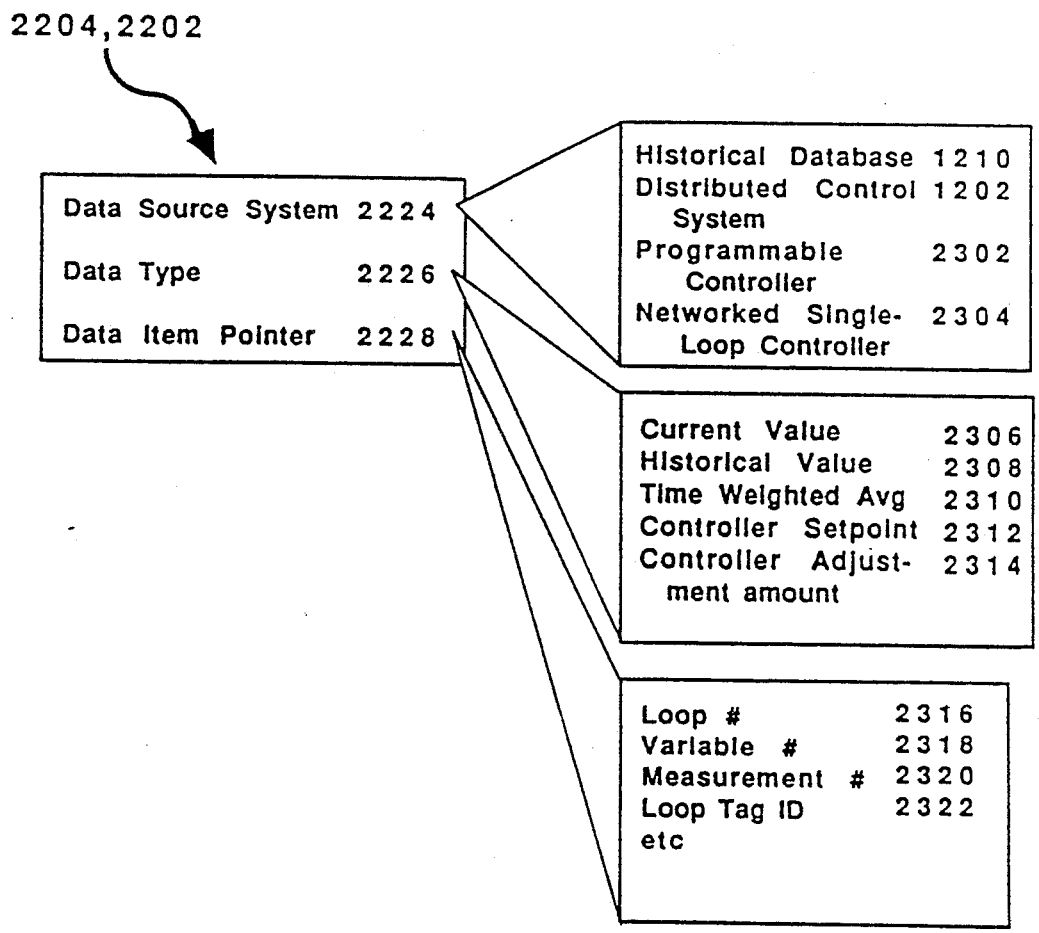
FIG. 23 is an exploded block diagram of the input data specification 2204 and the output data specification 2206 of the neural network 1206 of FIG. 22.

Referring now to FIG. 23, examples of the data source system 2224, the data type 2226, and the data item pointer 2228 are shown for purposes of illustration.

With respect to data source system 2224, examples are an historical database 1210, a distributed control system 1202, a programmable controller 2302, and a networked single loop controller 2304. These are merely illustrative.

Any data source system can be utilized by the present invention. It should also be understood that such source system could either be a storage device or an actual measuring or calculating device. All that is required is that a source of data be specified to provide the neural network 1206 with the input data 1220 that is needed to produce the output data 1218. The present invention contemplates more than one data source system used by the same neural network 1206.

The neural network 1206 needs to know the data type that is being specified. This is particularly important in an historical database 1210 since it can provide more than one type of data. Several examples are shown in FIG. 23 as follows: current value 2306, historical value 2308, time weighted average 2310, controller setpoint 2312, and controller adjustment amount 2314. Other types are contemplated.

Finally, the data item pointer 2228 must be specified. The examples shown are a loop number 2316, a variable number 2318, a measurement number 2320, and a loop tag I.D. 2322. Again, these are merely examples for illustration purposes, since the present invention contemplates any type of data item pointer 2228.

It is thus seen that neural network 1206 can be constructed so as to obtain desired input data 1220 or to provide output data 1218 in any intended fashion. In the preferred embodiment of the present invention, this is all done through menu selection by the user (developer) using a software based system on a computer platform.

Figure 25:
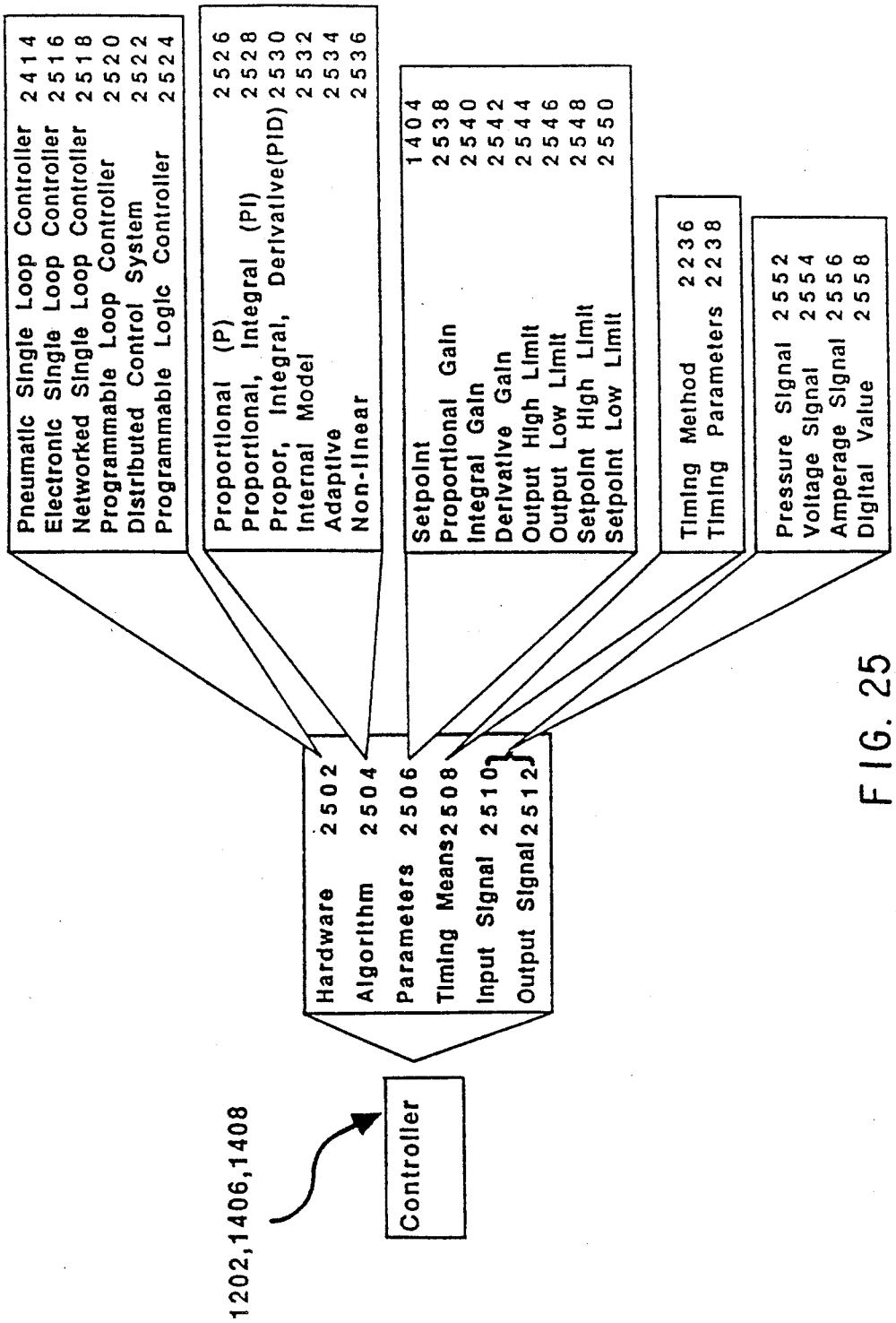
FIG. 25 is an exploded block diagram of various examples and aspects of controller 1202 of FIG. 12.

The construction of the controller 1202 is shown in FIG. 25 in an exploded format. Again, this is merely for purposes of illustration. First, the controller 1202 must be implemented on some hardware platform 2502. Examples of hardware platforms 2502 include pneumatic single loop controller 2414, electronic single loop controller 2516, networked single looped controller 2518, programmable loop controller 2520, distributed control system 2522, and programmable logic controller 2524. Again, these are merely examples for illustration. Any type of hardware platform 2502 is contemplated by the present invention.

In addition to the hardware platform 2502, the controller 1202, 1406, 1408 needs to implement or utilize an algorithm 2504. Any type of algorithm 2504 can be used. Examples shown include: proportional (P) 2526; proportional, integral (PI) 2528; proportional, integral, derivative (PID) 2530; internal model 2532; adaptive 2534; and, non-linear 2536. These are merely illustrative of feedback algorithms. However, the present invention also contemplates feedforward or other algorithm approaches.

The controller 1202 also inherently includes parameters 2506. These are utilized by the algorithm 2504. Examples shown include setpoint 1404, proportional gain 2538, integral gain 2540, derivative gain 2542, output high limit 2544, output low limit 2546, setpoint high limit 2548, and setpoint low limit 2550.

The controller 1202 also needs some means for timing its operation. One way to do this is to use a timing means 2508. Timing means 2508, for example, can use a timing method 2236 with associated timing parameters 2238, as previously described. Again, these are merely illustrative.

The controller 1202 also needs to utilize one or more input signals 2510, and to provide one or more output signals 2512. These can take the form of pressure signals 2552, voltage signals 2554, amperage (current) signals 2556, or digital values 2558. In other words, input and output signals can be in either analog or digital format.

VI. User Interface

The present invention utilizes a template and menu driven user interface 2600, 2700 which allows the user to configure, reconfigure and operate the present invention. This approach makes the present invention very user friendly. It also eliminates the need for the user to perform any computer programming, since the configuration, reconfiguration and operation of the present invention is carried out in a template and menu format not requiring any actual computer programming expertise or knowledge.

The system and method of the present invention utilizes templates. These templates define certain specified fields that must be addressed by the user in order to configure, reconfigure and operate the present invention. The templates tend to guide the user in using the present invention.

Representative examples of templates for the menu driven system of the present invention are shown in FIGS. 26-29. These are merely for purposes of illustration.

The preferred embodiment of the present invention uses a two-template specification 2600, 2700 for a neural network module. Referring now to FIG. 26, the first template 2600 in this set of two templates is shown. This template 2600 specifies general characteristics of how the neural network 1206 will operate. The portion of the screen within a box labeled 2620, for example, shows how timing options are specified for the neural network module 1206. As previously described, more than one timing option may be provided. This template 2600 provides a training timing option under the label "train" and a prediction timing control specification under the "label run." The timing methods shown in boldface type are chosen from a pop-up menu of various timing methods that are implemented in the preferred embodiment. The parameters needed for the timing method which is chosen are entered in the shaded blocks under heading "Time Interval and Key Block." These parameters are specified only for timing methods for which they are required. Not all timing methods require parameters, and not all timing methods that require parameters require all the parameters.

In a box labeled 2606 bearing the heading "Mode and Store Predicted Outputs," the prediction and training functions of the neural network module can be controlled. By putting a check in the box next to either the train or the run designation under "Mode," the training and/or prediction functions of the neural network module 1206 are enabled. By putting a check in the box next to the "when training" and "when running" labels, the storage of predicted output data 1218 can be enabled when the neural network 1206 is training and when the neural network 1206 is predicting (running), respectively.

The size of the neural network 1206 is specified in a box labeled 2622 bearing the heading "network size." In this embodiment of a neural network module 1206, there are three layers only, and the user may specify how many elements or nodes are to be used in each layer. In the preferred embodiment, the number of inputs, outputs and middle nodes is limited to some predefined value.

The coordination of input data with training data is controlled using a checkbox labeled 2608. By checking this box, the user can specify that input data 1220 is to be retrieved such that the timestamps on the input data 1220 correspond with the timestamps on the training input data 1306. The training or learning constant can be entered in a field 2610. This constant determines how aggressively the weights in the neural network 1206 are adjusted when there is an error 1504 between the output data 1218 and the training input data 1306.

The user, by pressing a keypad softkey labeled "data-spec page" 2624, may call up the second template 2700 in the neural network module specification. This template 2700 is shown in FIG. 27. This template 2700 allows the user to specify (1) the data inputs 1220, 1306, and (2) the outputs 1218, 1504 that are to be used by the neural network module. A data specification box 2702, 2704, 2706, and 2708 is provided for each of the network inputs 1220, network training inputs 1306, the network outputs 1218, and the summed error output, respectively. These correspond to the input data, the training input data, the output data, and the error data. These four boxes use the same data specification methods.

Within each data specification box, the data pointers and parameters are specified. In the preferred embodiment, the data specification comprises a three-part data pointer as described above. In addition, various time boundaries and constraint limits can be specified depending on the data type specified.

Figure 28:
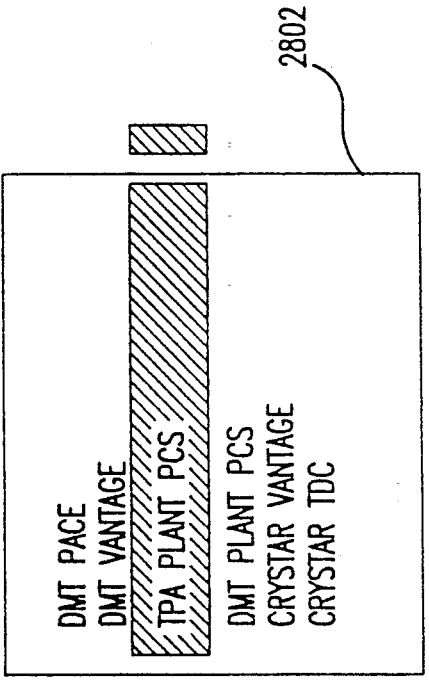
FIG. 28 is a computer screen which shows a pop-up menu for specifying the data system element of the data specification.

In FIG. 28, an example of a pop-up menu is shown. In this figure, the specification for the data system for the network input number 1 is being specified as shown by the highlighted field reading "DMT PACE." The box in the center of the screen is a pop-up menu 2802 of choices which may be selected to complete the data system specification. The templates in the preferred embodiment of the present invention utilize such pop-up menus 2802 wherever applicable.

Figure 29:
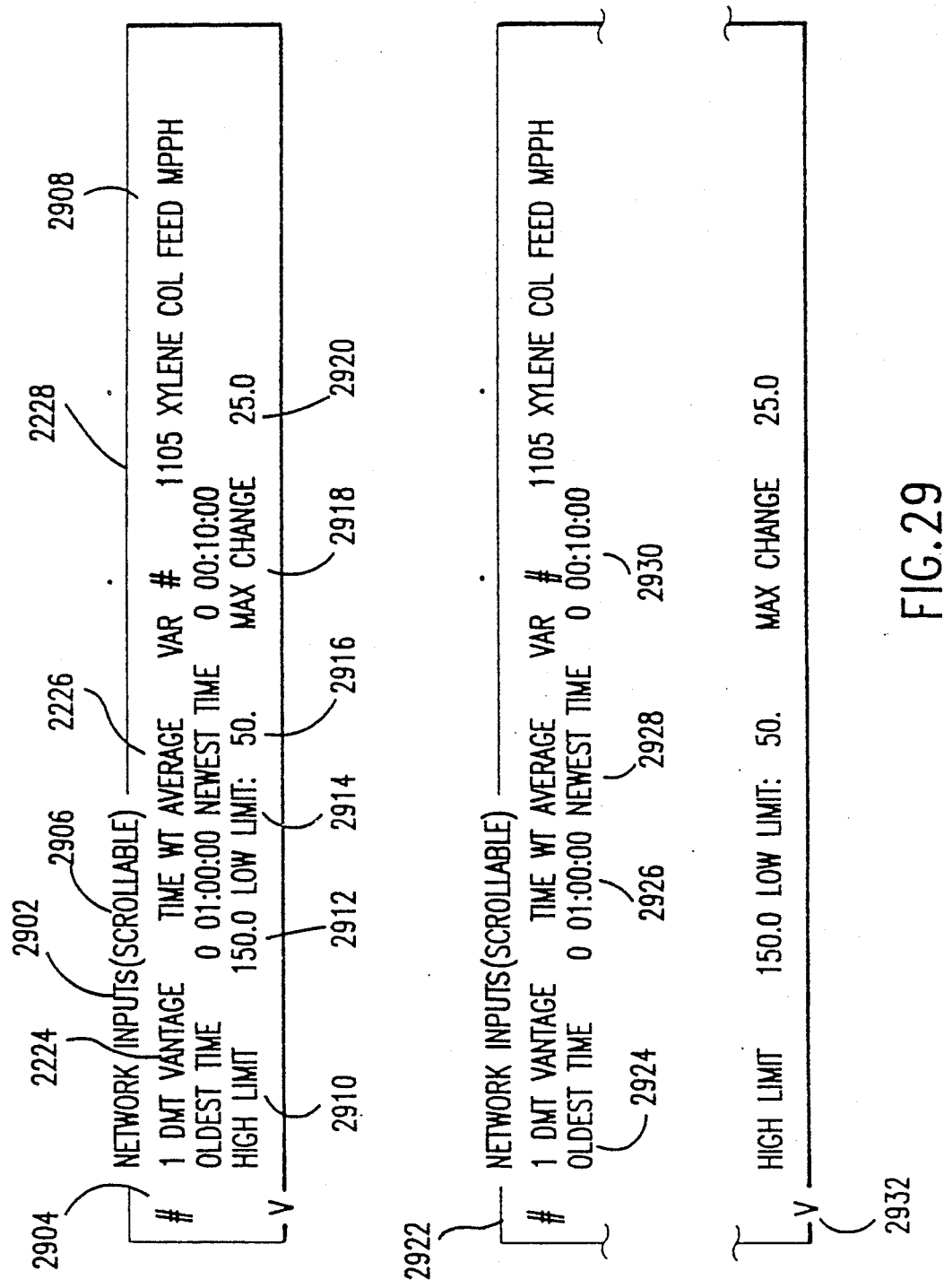
FIG. 29 is a computer screen of the preferred embodiment showing in detail the individual items making up the data specification display of FIG. 27.

FIG. 29 shows the various elements which make up the data specification block. These include a data title 2902, an indication as to whether the block is scrollable 2906, and an indication of the number of the specification in a scrollable region 2904. The box also contains arrow pointers indicating that additional data specifications exist in the list either above or below the displayed specification. These pointers 2922 and 2932 are displayed as a small arrow when other data is present. Otherwise, they are blank.

The items making up the actual data specification are: a data system 2224, a data type 2226, a data item pointer or number 2228, a name and units label for the data specification 2908, a label 2924, a time boundary 2926 for the oldest time interval boundary, a label 2928, a time specification 2930 for the newest time interval boundary, a label 2910, a high limit 2912 for the data value, a label 2914, a low limit value 2916 for the low limit on the data value, a label 2918, and a value 2920 for the maximum allowed change in the data value.

The data specification shown in FIG. 29 is representative of the preferred mode of implementing the present invention. However, it should be understood that various other modifications of the data specification could be used to give more or less flexibility depending on the complexity needed to address the various data sources which may be present. The present invention contemplates any variation on this data specification method.

Although the foregoing refers to particular preferred embodiments, it will be understood that the present invention is not so limited. It will occur to those of ordinary skill in the art that various modifications may be made to the disclosed embodiments, and such modifications are intended to be within the scope of the present invention.

I claim:

1. A computer neural network process control method adapted for predicting output data provided to a controller used to control a process for producing a product having at least one product property, said method allowing a control aim to be set without a human operator, the computer neural network process control method comprising the steps of:

(1) operating the process with one or more sensors connected to sense process conditions and produce process condition measurements, and changing a controllable process state with an actuator, (2) controlling said actuator with a process controller in accordance with a process condition measurement from one or more of said sensors and in accordance with a setpoint;

(3) configuring the neural network by specifying at least one input, at least one output, at least one training input, and at least one specified interval;

(4) training the neural network to produce a trained neural network comprising the substeps of:

(a) retrieving a first raw training input data;

(b) retrieving a second raw training input data;

(c) computing a corresponding first training input data based on said first raw training input data and said second raw training input data, said first training input data indicative of the action of a human operator of the process;

(d) retrieving a first input data, (e) predicting a first output data using said first input data, (f) computing a first error data in accordance with said first training input data and said first output data, and (g) training the neural network to produce said trained neural network in accordance with said first error data;

(5) at said at least one specified interval, retrieving a second input data and predicting, with said trained neural network, second output data using said second input data; and (6) retrieving said second output data for changing a setpoint of the controller for controlling the process.

2. The computer neural network process control method of claim 1, wherein step (3) comprises configuring the neural network by having at least two layers and/or up to full connectivity and/or at least one weight.

3. The computer neural network process control method of claim 1, wherein step (3) comprises configuring the neural network to have feedback and/or feedforward connectivity.

4. The computer neural network process control method of claim 1, wherein said step (4)(e) predicts said first output data using said first input data and a transfer function of said configured neural network of step (1).

5. The computer neural network process control method of claim 1, wherein said step (4)(f) comprises computing said first error data by subtracting said first training input data from said first output data.

6. The computer neural network process control method of claim 1, wherein said step (4)(g) comprises training said neural network by using said first error data to adjust a first weight data.

7. The computer neural network process control method of claim 6, wherein said training utilizes a back propagation method.

8. The computer neural network process control method of claim 1, wherein said step (5) comprises a step of using said at least one specified interval selected in accordance with a time constant for control of the process.

9. The computer neural network process control method of claim 1, wherein step (2) further comprises a step of computing, using the controller, controller output data in accordance with said process condition measurement and said setpoint.

10. The computer neural network process control method of claim 1, wherein step (6) of retrieving further comprises a step of changing said setpoint directly in accordance with said second output data.

11. The computer neural network process control method of claim 1, further comprising a step of using said setpoint for said first raw training input data used in step (4) (a) and/or said second raw training input data used in step (4) (b).

12. The computer neural network process control method of claim 11, wherein step (4) further comprises a step (a) (i) of using a human operator to make an adjustment to said controller setpoint, wherein said first training input data is indicative of said adjustment.

13. The computer neural network process control method of claim 1, wherein said retrieving steps (4) (a), (4) (b) and/or (4) (d) further comprises the step of retrieving from an historical database.

14. The computer neural network process control method of claim 13, wherein step (4) (b) comprises the step of retrieving said second raw training input data from said historical database with an associated first timestamp.

15. The computer neural network process control method of claim 14, wherein step (4) (d) retrieves said first input data from said historical database using said associated first timestamp.

16. The computer neural network process control method of claim 14, further comprising a step of using a clock for producing said associated first timestamp of step (4) (b).

17. The computer neural network process control method of claim 14, wherein step (4) (d) further comprises a step of retrieving said first input data with an associated second timestamp selected in accordance with said associated first timestamp.

18. The computer neural network process control method of claim 1, further comprising the steps of:

(7) retrieving a second raw training input data with a corresponding second input data; and (8) retraining said trained neural network in accordance with a second training input data computed using said second raw training input data, a second error data computed using said second training input data and a second input data predicted using said corresponding second input data.

19. The computer neural network process control method of claim 18, wherein said step (8) further comprises a step of stopping the use of step (6) for changing said setpoint when said second error data exceeds a metric.

20. The computer neural network process control method of claim 18, wherein step (7) of retrieving further comprises the step of retrieving past output data.

21. The computer neural network process control method of claim 1, wherein step (4) (d) comprises a step of using an aim value for a product property value as said first input data.

22. The computer neural network process control method of claim 20, wherein step (3) of configuring further comprises a step of specifying said at least one specified interval to expire whenever a change in said aim value occurs.

23. The computer neural network process control method of claim 1, wherein step (4) (d) comprises a step of using an aim value for a process condition as said first input data.

24. The computer neural network process control method of claim 20, wherein step (3) of configuring further comprises a step of specifying said at least one specified interval to expire whenever a change in said aim value occurs.

25. The computer neural network process control method of claim 1, wherein said first input data of step (4) (d) comprises the step of retrieving an associated second timestamp.

26. The computer neural network process control method of claim 25, further comprising a step of using a lab to provide said first input data and to provide said associated second timestamp indicating the time at which a lab sample was taken from the process and was used to produce said first input data.

27. The computer neural network process control method of claim 1, further comprising the steps:
  (5) saving said first output data;
  (6) retrieving a second raw training input data;
  (7) computing a second training input data using said second raw training input data;
  (8) retraining the neural network when said second training input data is different from said saved first output data.

28. The computer neural network process control method of claim 1, further comprising a step of using said setpoint for said first input data used in step (4) (d) and/or said second input data used in step (5).

29. A computer neural network process control system adapted for predicting output data provided to control a setpoint of a controller used to control a process for producing a product having at least one product property, the computer neural network process control system comprising:
  (a) a neural network, responsive to a first input data indicative of sensor or aim or lab data, comprising,
    (1) training means, responsive to a first training input data indicative of the action of a human operator of the process, for training said neural network in accordance with a training set having said first input data and said first training input data to produce trained neural network weights, and
    (2) predicting means using said trained neural network weights for predicting the output data in accordance with a second input data indicative of sensor or aim or lab data; and
  (b) said controller, responsive to said predicting means, comprising,
    (1) sending means for adjusting said setpoint in accordance with the output data, and
    (2) setpoint adjustment means for accepting a change to said setpoint made by said human operator.

30. The computer neural network process control system of claim 29, further comprising storage means for storing said first training input data as a past operator action value, and
  wherein said training means is connected to retrieve said past operator action value as said first input data.

31. The computer neural network process control system of claim 29, wherein said neural network further comprises (3) computing means for computing error data in accordance with said first training input data and said first input data,, said error data used by said training means to train said neural network.

32. The computer neural network process control system of claim 31, wherein said predicting means is connected to retrieve said weights for predicting the output data, and wherein said training means is connected to modify said weights in accordance with said error data of said computing means.

33. The computer neural network process control system of claim 29, wherein said controller further comprises
  (3) input means for receiving controller input data indicative of sensor or aim or lab data; and
  (4) computing means for computing controller output data in accordance with controller input data and said setpoint, and
  (5) sending means for sending said controller output data to an actuator for changing a controllable process state.

34. The computer neural network process control system of claim 33, further comprising:
  (c) one or more sensors for sensing process conditions and for producing process condition measurements, and
  wherein said controller is connected to use one or more of said process condition measurements as said controller input data.

35. The computer neural network process control system of claim 33, wherein said predicting means further comprises:
  (a) output data storage means for storing an output data value;
  wherein said predicting means is connected to store the output data in said output data storage means; and
  wherein said training means further comprises,
    (v) comparing means for retrieving the output data in said output data storage means, and connected to execute said weight adjusting means when said first training input data is different from the output data.

36. The computer neural network process control system of claim 29, wherein said controller comprises a hardware system, and said neural network comprises a separate hardware system.

37. The computer neural network process control system of claim 29, wherein said neural network comprises a software system adapted to run on a computer platform.

38. The computer neural network process control system of claim 29, wherein said training means is connected to retrieve the setpoint of the controller to compute said first training input data.

39. The computer neural network process control system of claim 29, wherein said training means further comprises:
  (i) storage means for saving a past raw training input data value indicative of a past value of said setpoint;
  (ii) retrieving means for retrieving a current raw training input value indicative of a current value of said setpoint;
  (iii) computing means for computing a first training input data indicative of a change between said current raw training input value and said past raw training input data value and for saving said current raw training input value in said storage means; and (iv) weight adjusting means, responsive to said first training input data, for training said neural network weights in accordance with a training set having said first input data and said first training input data.

40. The computer neural network process control system of claim 29, further comprising storage means for storing the output data as a control action value, and wherein said training means is connected to retrieve said control action value as said first input data.

41. The computer neural network process control system of claim 29, further comprising lab means for receiving a sample from the process, which said lab means provides said first input data based on said sample.

42. The computer neural network process control system of claim 29, further comprising sensor means, responsive to said neural network means, for providing said first input data.

43. A computer neural network process control system adapted for predicting output data provided to control a setpoint of a controller used to control a process for producing a product having at least one product property, the computer neural network process control system comprising:
   (a) a neural network, responsive to a first input data indicative of sensor or aim or lab data, comprising,
      (1) training means, responsive to a first training input data indicative of the action of a human operator of the process, for training said neural network in accordance with a first training set having said first input data and said first training input data to produce trained neural network weights, and
      (2) predicting means using said trained neural network weights for predicting the output data in accordance with a second input data indicative of sensor or aim or lab data;
   (b) said controller, responsive to said predicting means, comprising,
      (1) sending means for adjusting said setpoint in accordance with the output data; and
      (2) setpoint adjustment means for accepting a change to said setpoint made by said human operator; and
   (c) an historical database comprising,
      (1) storing means for storing said first training input data with an associated first timestamp, and for storing said first input data indicated by said associated first timestamp, and
      (2) retrieving means, responsive to said storing means, for retrieving said first training set comprising said first training input data and said first input data indicated by said associated first timestamp, and connected to provide said first training set to said training means.

44. The computer neural network process control system of claim 43, further comprising lab means for receiving a sample from the process, which said lab means provides said first input data based on said sample.

45. The computer neural network process control system of claim 44, further comprising clock means, associated with said lab means, for providing said associated first timestamp to said storing means.

46. The computer neural network process control system of claim 43, further comprising sensor means, responsive to said neural network means, for providing said first input data.

47. The computer neural network process control system of claim 46, further comprising clock means for providing an associated second timestamp of said first input data to said historical database, and
   wherein said retrieving means selects said first input data indicated by said associated first timestamps using said associated second timestamp.

48. The computer neural network process control system of claim 43, further comprising output means for storing the output data in said historical database.

49. A computer neural network process control system adapted for predicting output data provided to control a setpoint of a controller used to control a process for producing a product having at least one product property, the computer neural network process control system comprising:
   (a) a neural network, responsive to a first input data indicative of sensor or aim or lab data, comprising,
      (1) predicting means using said trained neural network weights for predicting the output data in accordance with a second input data indicative of sensor or aim or lab data; and
   (b) said controller, responsive to said predicting means, comprising,
      (1) sending means for adjusting said setpoint in accordance with the output data, and
      (2) setpoint adjustment means for accepting a change to said setpoint made by aid human operator.

50. A computer neural network process control system adapted for predicting output data provided to control a setpoint of a controller used to control a process for producing a product having at least one product property, the computer neural network process control system comprising:
   (a) a neural network, responsive to a first input data indicative of sensor or aim or lab data, comprising,
      (1) training means, responsive to a first training input data indicative of the action of a human operator of the process, for training said neural network in accordance with a training set having said first input data and said first training input data to produce trained neural network weights, and
      (2) predicting means using said trained neural network weights for predicting the output data in accordance with a second input data indicative of sensor or aim or lab data; and
   (b) a controller, responsive to said predicting means, comprising,
      (1) setpoint adjustment means for accepting a change to said setpoint made by said human operator.

* * * * *